US012446092B2

(12) United States Patent
Futaki et al.

(10) Patent No.: US 12,446,092 B2
(45) Date of Patent: Oct. 14, 2025

(54) MASTER NODE, SECONDARY NODE, AND METHODS THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 574 days.

(21) Appl. No.: 17/630,003

(22) PCT Filed: Jun. 17, 2020

(86) PCT No.: PCT/JP2020/023857
§ 371 (c)(1),
(2) Date: Jan. 25, 2022

(87) PCT Pub. No.: WO2021/019940
PCT Pub. Date: Feb. 4, 2021

(65) Prior Publication Data
US 2022/0256637 A1      Aug. 11, 2022

(30) Foreign Application Priority Data

Jul. 29, 2019   (JP) ................................. 2019-139251

(51) Int. Cl.
*H04W 76/19*       (2018.01)
*H04W 76/15*       (2018.01)
(Continued)

(52) U.S. Cl.
CPC ........... *H04W 76/19* (2018.02); *H04W 76/15* (2018.02); *H04W 76/27* (2018.02); *H04W 76/34* (2018.02)

(58) Field of Classification Search
None
See application file for complete search history.

(56) References Cited

U.S. PATENT DOCUMENTS

| 11,785,483 B2 | 10/2023 | Zhang et al. |
| 2019/0182881 A1 | 6/2019 | Teyeb et al. |

(Continued)

FOREIGN PATENT DOCUMENTS

| CN | 108632902 A | 10/2018 |
| CN | 108633018 A | 10/2018 |

(Continued)

OTHER PUBLICATIONS

ETSI TS 138 423 V15.3.0; 5G; NG-RAN; Xn Application Protocol (XnAP); (3GPP TS 38.423 version 15.3.0 Release 15); May 2019 (Year: 2019).*

(Continued)

*Primary Examiner* — Scott M Sciacca

(57) ABSTRACT

A master node (MN) (1) controls the MN (1) to enable, for a radio terminal (3), dual connectivity using a Master Cell Group (MCG) provided by the MN (1) and a Secondary Cell Group (SCG) provided by a secondary node (SN) (2). The MN (1) sends to the SN (2) a first message related to a modification or release of a configuration or resource in the SN (2) regarding the dual connectivity. The first message explicitly or implicitly indicates that the modification or release is related to a failure of the MCG or recovery from the failure of the MCG. This, for example, allows the SN to distinguish a message regarding modification or release of an SN configuration (or resource) sent from an MN to the SN for recovery from an MCG failure from other messages.

12 Claims, 41 Drawing Sheets

(51) Int. Cl.
 *H04W 76/27* (2018.01)
 *H04W 76/34* (2018.01)

(56) References Cited

U.S. PATENT DOCUMENTS

| | | | |
|---|---|---|---|
| 2020/0113008 A1 | 4/2020 | Luo et al. | |
| 2020/0154268 A1 | 5/2020 | Liu et al. | |
| 2020/0162211 A1 | 5/2020 | Wang et al. | |
| 2020/0344719 A1 | 10/2020 | Luo et al. | |
| 2021/0204194 A1 | 7/2021 | Cao et al. | |
| 2021/0204199 A1 | 7/2021 | Yu et al. | |
| 2021/0243613 A1 | 8/2021 | Khanfouci et al. | |
| 2021/0243672 A1 | 8/2021 | Deshmukh et al. | |
| 2021/0385897 A1* | 12/2021 | Purkayastha | H04W 76/18 |
| 2022/0086710 A1* | 3/2022 | Xu | H04W 88/06 |
| 2022/0174771 A1* | 6/2022 | Baek | H04W 76/15 |
| 2023/0354110 A1 | 11/2023 | Wang et al. | |

FOREIGN PATENT DOCUMENTS

| | | | |
|---|---|---|---|
| EP | 3331281 A1 | 6/2018 | |
| JP | 2018-174597 A | 11/2018 | |
| WO | 2018/182231 A1 | 10/2018 | |
| WO | 2018/219039 A1 | 12/2018 | |
| WO | 2019/093940 A1 | 5/2019 | |
| WO | WO-2020135850 A1 * | 7/2020 | H04W 24/04 |

OTHER PUBLICATIONS

JP Office Action for JP Application No. 2021-536652, mailed on April 4. 2023 with English Translation.
Google Inc., Correction to RRC transfer, 3GPP TSG RAN WG3 #103, R3-191154, Feb. 25, 2019.
US Office Action for U.S. Appl. No. 17/628,326, mailed on Feb. 5, 2024.
Chinese Office Action for CN Application No. 202080063213.2, mailed on Oct. 13, 2023 with English Translation.
Extended European Search Report for EP Application No. 20848546. 6, dated Dec. 13, 2022.
Rapporteur (ZTE Corporation), "Agreements for MR-DC with 5GC", 3GPP Draft, R2-1819036, Nov. 12-16, 2018.
OPPO, "Fast MCG recovery for MR-DC enhancement", 3GPP Draft, R2-1905590, Apr. 13-17, 2019.
Apple, "MCG Fast recovery", 3GPP Draft, R2-1907173, May 13-17, 2019.
Indian Office Action for IN Application No. 202217004886, mailed on Jul. 6, 2022.
International Search Report for PCT Application No. PCT/JP2020/ 022864, mailed on Sep. 24, 2020.
International Search Report for PCT Appiication No. PCT/JP2020/ 023857, mailed on Sep. 24, 2020.
R2-1901414, Ericsson, "Fast MCG recovery in MR-DC", BGPP TSG-RAN WG2#105, Feb. 2019, pp. 1-2.
R2-1901416, Ericsson, "Fast MCG recovery in (NG)EN-DC", 3GPP TSG-RAN WG2#105, Feb. 2019, pp. 1-3.
R2-1900113, Qualcomm Incorporated, "Fast Recovery from MCG faiiure", 3GPP TSG-RAN WG2#105, Feb. 2019, pp. 1-3.
R2-1907493, Huawei et al., "MCG faiiure recovery via spiit SRB1", 3GPP TSG-RAN WG2#106, May 2019, pp. 1-5.
R2-1907497, Huawei et al., "Discussion on MCG faiiure recovery via SRB3", 3GPP TSG-RAN WG2#106, May 2019, pp. 1-4.
R2-1907506, Huawei et al., Discussion on PDCP SN issue for MCG faiiure recovery, 3GPP TSG RAN WG2 #106, May 2019, pp. 1-3.
R2-1906921, CATT, "Fallback mechanism for fast recovery", 3GPP TSG-RAN WG2 #106, May 2019, pp.1-3 (Cited in the ISR in the reiated intemational Application No. PCT/JP2020/022864).
R2-1905826, Vivo, "Additional use cases for MCG fast recovery", 3GPP TSG RAN WG2 #106, May 2019, pp. 1-5 (Cited in the ISR in the related International Application No. PCT/JP2020/022864).
Extended European Search Report for EP Application No. 20847082. 3, dated on Sep. 9, 2022.
CATT: "Fallback mechanisum for fast recovery", 3GPP Draft; 3GPP TSG-RAN WG2 Meeting #105bis, R2-1903328, Apr. 6, 2019.

* cited by examiner

9.1.2.20 RRC TRANSFER

| IE/Groupe Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | |
| S-NG-RAN node UE XnAP ID | M | | NG-RAN node UE XnAP ID 9.2.3.16 | |
| Split SRB | | 0..1 | | |
| >RRC Container | O | | OCTET STRING | |
| >SRB Type | M | | ENUMERATED (srb1, srb2, ...) | |
| >Delivery Status | O | | 9.2.3.45 | |
| >Delivery Requirement | O | | ENUMERATED (essential, ...) | If the value is set to essential, the message must be delivered to UE. |
| UE Report | | 0..1 | | |
| >RRC Container | M | | OCTET STRING | |

Fig. 18

9.2.3.2 DL RRC MESSAGE TRANSFER

| IE/Groupe Name | Presence | Range | IE type and reference | Semantics description |
|---|---|---|---|---|
| Message Type | M | | 9.3.1.1 | |
| gNB-CU UE F1AP ID | M | | 9.3.1.4 | |
| gNB-DU UE F1AP ID | M | | 9.3.1.5 | |
| old gNB-DU UE F1AP ID | O | | 9.3.1.5 | |
| SRB ID | M | | 9.3.1.7 | |
| Execute Duplication | O | | ENUMERATED (true, ...) | |
| RRC-Container | M | | 9.3.1.6 | |
| RAT-Frequency Priority Information | O | | 9.3.1.34 | |
| RRC Delivery Status Request | O | | ENUMERATED (true, ...) | |
| RRC Delivery Requirement | O | | ENUMERATED (essential, ...) | If the value is set to essential, the message must be delivered to UE. |

Fig. 20

9.1.2.20 RRC TRANSFER

| IE/Groupe Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | |
| S-NG-RAN node UE XnAP ID | M | | NG-RAN node UE XnAP ID 9.2.3.16 | |
| Split SRB | | 0..1 | | |
| >RRC Container | O | | OCTET STRING | |
| >SRB Type | M | | ENUMERATED (srb1, srb2, ...) | |
| >Delivery Status | O | | 9.2.3.45 | |
| MN SRB | | 0..1 | | |
| >RRC Container | O | | OCTET STRING | Contains the RRCConnection Reconfiguration message as defined in subclause 6.2.1 of TS 36.331 [14]. |
| >SRB Type | M | | ENUMERATED (srb1, srb2, ...) | The SRB type to be used |
| >Delivery Status | O | | 9.2.3.45 | DL RRC delivery status of MN SRB |
| UE Report | | 0..1 | | |
| >RRC Container | M | | OCTET STRING | Contains the MeasurementReport message or the MCGFailureInformation message as defined in subclause 6.2.1 of TS 38.331 [10] or the MeasurementReport message as defined in subclause 6.2.1 of TS 36.331 [14]. |

Fig. 27

9.1.2.x M-NODE MODIFICATION INDICATION

| IE/Groupe Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | |
| S-NG-RAN node UE XnAP ID | O | | NG-RAN node UE XnAP ID 9.2.3.16 | |
| Cause | M | | 9.2.3.2 | |
| M-NG-RAN node to S-NG-RAN node Container | M | | OCTET STRING | Includes the CG-ConfigInfo message as defined in subclause 11.2.2 of TS 38.331 [10]. |

Fig. 29

```
-- ASN1START
-- TAG-CG-CONFIG-INFO-START

CG-ConfigInfo ::=          SEQUENCE {
    criticalExtensions         CHOICE {
        c1                         CHOICE{
            cg-ConfigInfo              CG-ConfigInfo-IEs,
            spare3 NULL, spare2 NULL, spare1 NULL
        },
        criticalExtensionsFuture   SEQUENCE {}
    }
}

CG-ConfigInfo-IEs ::=      SEQUENCE {

CG-ConfigInfo-v15xy-IEs ::=SEQUENCE {
    sourceConfigMCG            CHOICE {
        eutra-MCG                  OCTET STRING,             -- Containing RRCConnectionReconfiguration
        nr-MCG                     OCTET STRING (CONTAINING RRCReconfiguration)          OPTIONAL,
                                                                                         OPTIONAL,
    }
    nonCriticalExtension       SEQUENCE {}
}

-- TAG-CG-CONFIG-INFO-STOP
-- ASN1STOP
```

Fig. 30

MASTER NODE, SECONDARY NODE, AND METHODS THEREFOR

This application is a National Stage Entry of PCT/JP2020/023857 filed on Jun. 17, 2020, which claims priority from Japanese Patent Application 2019-139251 filed on Jul. 29, 2019, the contents of all of which are incorporated herein by reference, in their entirety.

TECHNICAL FIELD

The present disclosure relates to a radio communication system, and particularly to recovery from a master cell group (Master Cell Group (MCG)) failure in multi-connectivity (e.g., Dual Connectivity).

BACKGROUND ART

The 3rd Generation Partnership Project (3GPP) is discussing fast recovery of an MCG failure when Multi-Radio Dual Connectivity (MR-DC) is being performed (see, for example, Non-Patent Literature 1 to 5). The MCG failure is, for example, a disconnection of a radio link (radio link failure (RLF)). In order to recover from an MCG failure when MR-DC is being performed, fast MCG Recovery uses transmission of signalling between the master node (MN) and the User Equipment (UE) via a Secondary Cell Group (SCG) provided by a secondary node (SN). Accordingly, fast MCG Recovery enables quick recovery of an MCG link (or from an MCG failure) using another method than Radio Resource Control (RRC) connection re-establishment, such as an intra-MN handover procedure or inter-MN handover procedure. In 5G NR, a procedure called "Reconfiguration with sync" is defined, which is used in a handover and also in a PSCell (i.e., Primary SCG Cell or Primary Secondary Cell) change and SN change in MR-DC. The intra-MN handover and inter-MN handover in the present specification may involve an SN release of MR-DC within the handover procedure. The inter-MN handover in the present specification may include a role change between the MN and the SN. In the role change, the SN (and the MN) of MR-DC before the handover is changed to the MN (and the SN) of MR-DC in the handover procedure.

The signalling (i.e., MN RRC messages) required for fast MCG recovery is transferred between the MN and the UE via an SCG leg of Split Signalling Bearer 1 (SRB1) or via SRB3. Split SRB1 is an SRB between the MN and the UE for RRC messages, and has a Radio Link Control (RLC) bearer in the MCG and an RLC bearer in the SCG. Split SRB1 supports transmission via the MCG and the SCG and enables duplication of RRC Protocol Data Units (PDUs) generated by the MN. However, since MN RRC messages sent by Split SRB1 are protected by the MN security key, the SN cannot read the contents of the MN RRC messages and thus sends the MN RRC messages transparently to the UE. The RLC bearers in the MCG and SCG of a Split SRB are referred to as an MCG leg (or MCG part) and an SCG leg (or SCG part), respectively. SRB3, on the other hand, is a direct SRB between the SN and the UE, which can be used by the SN to send SN RRC messages via an SCG cell to the UE in DC. Incidentally, Fast MCG recovery may be triggered (or performed) only after the security of the Access Stratum (AS) layer has been activated and SRB2 and at least one DRB have been established.

CITATION LIST

Non Patent Literature

[Non-Patent Literature 1] Ericsson: "Fast MCG recovery in MR-DC", 3GPP TSG-RAN WG2 #105 R2-1901414, February 2019
[Non-Patent Literature 2] Ericsson: "Fast MCG recovery in (NG)EN-DC", 3GPP TSG-RAN WG2 #105 R2-1901416, February 2019
[Non-Patent Literature 3] Qualcomm Incorporated: "Fast Recovery from MCG failure", 3GPP TSG-RAN WG2 #105 R2-1900113, February 2019
[Non-Patent Literature 4] Huawei, HiSilicon: "MCG failure recovery via split SRB1", 3GPP TSG-RAN WG2 #106 R2-1907493, May 2019
[Non-Patent Literature 5] Huawei, HiSilicon: "Discussion on MCG failure recovery via SRB3", 3GPP TSG-RAN WG2 #106 R2-1907497, May 2019

SUMMARY OF INVENTION

Technical Problem

The inventors have studied fast MCG recovery and found various issues. For example, a handover procedure to recover an MCG link may require modification or release of a configuration or resources in the SN. However, as described above, in fast MCG recovery, signalling (MN RRC messages) between the MN and the UE is transferred via the SN. Accordingly, the SN may need to control (or adjust) the timing of modifying or releasing the configuration or resources in the SN so as not to interfere with the transfer of MN RRC messages between the MN and the UE.

One of the objects to be attained by embodiments disclosed herein is to provide apparatuses, methods, and programs that allow an SN to distinguish a message regarding modification or release of an SN configuration (or resource) sent from an MN to the SN for recovery from an MCG failure (or recovery of an MCG link) from other messages. It should be noted that this object is merely one of the objects to be attained by the embodiments disclosed herein. Other objects or problems and novel features will be made apparent from the following description and the accompanying drawings.

Solution to Problem

In a first aspect, a master node includes at least one memory and at least one processor coupled to the at least one memory. The at least one processor is configured to support dual connectivity that allows a radio terminal to use a Master Cell Group (MCG) provided by the master node and a Secondary Cell Group (SCG) provided by a secondary node. The at least one processor is further configured to send to the secondary node a first message related to a modification or release of a configuration or resource in the secondary node regarding the dual connectivity. The first message explicitly or implicitly indicates that the modification or release is related to a failure of the MCG or recovery from the failure of the MCG.

In a second aspect, a secondary node includes at least one memory and at least one processor coupled to the at least one memory. The at least one processor is configured to support dual connectivity that allows a radio terminal to use a Master Cell Group (MCG) provided by a master node and a Secondary Cell Group (SCG) provided by the secondary node. In addition, the at least one processor is configured to receive from the master node a first message related to a modification or release of a configuration or resource in the secondary node regarding the dual connectivity. The first message explicitly or implicitly indicates that the modification or release is related to the failure of the MCG or recovery from the failure of the MCG. The at least one processor is further configured to transmit a Radio Resource Control (RRC) message that is sent from the master node and related to recovery of a failure of the MCG to the radio terminal, via a signalling radio bearer configured directly between the secondary node and the radio terminal.

In a third aspect, a method performed by a master node includes: (a) controlling the master node to enable, for a radio terminal, dual connectivity using a Master Cell Group (MCG) provided by the master node and a Secondary Cell Group (SCG) provided by a secondary node; and (b) sending to the secondary node a first message related to a modification or release of a configuration or resource in the secondary node regarding the dual connectivity. The first message explicitly or implicitly indicates that the modification or release is related to a failure of the MCG or recovery from the failure of the MCG.

In a fourth aspect, a method performed by a secondary node includes: (a) controlling the secondary node to enable, for a radio terminal, dual connectivity using a Master Cell Group (MCG) provided by a master node and a Secondary Cell Group (SCG) provided by the secondary node; (b) receiving from the master node a first message related to a modification or release of a configuration or resource in the secondary node regarding the dual connectivity; and (c) transmitting a Radio Resource Control (RRC) message that is sent from the master node and related to recovery of a failure of the MCG to the radio terminal, via a signalling radio bearer configured directly between the secondary node and the radio terminal. The first message explicitly or implicitly indicates that the modification or release is related to a failure of the MCG or recovery from the failure of the MCG.

In a fifth aspect, a program includes instructions (software codes) that, when loaded into a computer, cause the computer to perform the method according to the above-described third or fourth aspect.

Advantageous Effects of Invention

According to the above-described aspects, it is possible to provide apparatuses, methods, and programs that allow an SN to distinguish a message regarding modification or release of an SN configuration (or resource) sent from an MN to the SN for recovery from an MCG failure (or recovery of an MCG link) from other messages.

BRIEF DESCRIPTION OF DRAWINGS

FIG. 18 is a diagram showing an example of a format of an RRC TRANSFER message;

FIG. 20 is a diagram showing an example of a format of a DL RRC MESSAGE TRANSFER message;

FIG. 27 is a diagram showing an example of a format of an RRC TRANSFER message;

FIG. 29 is a diagram showing an example of a format of an MN MODIFICATION INDICATION message;

FIG. 30 is a diagram showing an example of a format of a CG-ConfigInfo information element;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP Long Term Evolution (LTE) systems and 5G systems. However, these embodiments may be applied to other radio communication systems supporting technologies similar to the 3GPP multi-connectivity (e.g., Dual Connectivity). The term "LTE" used in this specification includes enhancement/evolution of LTE and LTE-Advanced to provide interworking with the 5G System, unless otherwise specified. The 5G system includes not only NR (New Radio) but also a network configuration in which an LTE eNodeB (eNB) is connected to a 5G core network (5GC). This eNB may be referred to as an ng-eNB. The ng-eNB may also be referred to as an eNB/5GC, which means an eNB connected to a 5GC. On the other hand, 5G gNB that performs DC together with an LTE eNB that connects to an Evolved Packet Core (EPC) may be referred to as en-gNB.

First Embodiment

Figure 1:
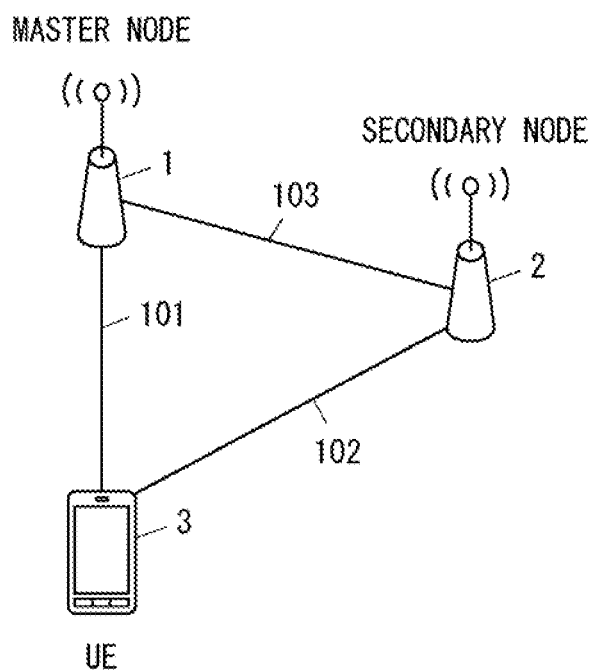
FIG. 1 is a diagram showing a configuration example of a radio communication network according to an embodiment.

FIG. 1 shows a configuration example of a radio communication network according to the present embodiment. The radio communication network according to the present embodiment includes a master node (MN) 1 and a secondary node (SN) 2. The MN 1 and the SN 2 communicate with each other via an internode interface 103. Although not illustrated, at least the MN 1 is connected to a core network and the SN 2 may also be connected to the core network. A UE 3 communicates with the MN 1 and the SN 2 via air interfaces 101 and 102 to perform dual connectivity (DC) between master cell group (MCG) and secondary cell group (SCG). The MCG is a group of serving cells associated with (or provided by) the MN 1, and includes the SpCell (i.e., Primary Cell (PCell)) and optionally one or more Secondary Cells (SCells). Meanwhile, the SCG is a group of serving cells associated with (or provided by) the SN 2 acting as an SN in DC, and includes the primary cell of the SCG and optionally one or more Secondary Cells (SCells). The primary cell of the SCG is referred to as Primary SCG cell (PSCell) or Primary Secondary Cell (PSCell). The PSCell is the Special Cell (SpCell) of the SCG.

Each of the MN 1 and the SN 2 may be an Evolved Universal Mobile Telecommunications System (UMTS) Terrestrial Radio Access Network (EUTRAN) node or a Next generation Radio Access Network (NG-RAN) node. The EUTRAN node may be eNB or en-gNB. The NG-RAN node may be gNB or ng-eNB. The Radio Access Technology (RAT) of the MN 1 may be different from that of the SN 2.

The DC may be a Multi-Radio Dual Connectivity (MR-DC). The MR-DC includes E-UTRA-NR Dual Connectivity (EN-DC), NR-E-UTRA DC (NE-DC), NG-RAN EN-DC (NGEN-DC), and NR-NR DC (NRDC). The EN-DC uses an EPC, while the NE-DC, NGEN-DC, and NR DC use a 5GC.

Figure 2:
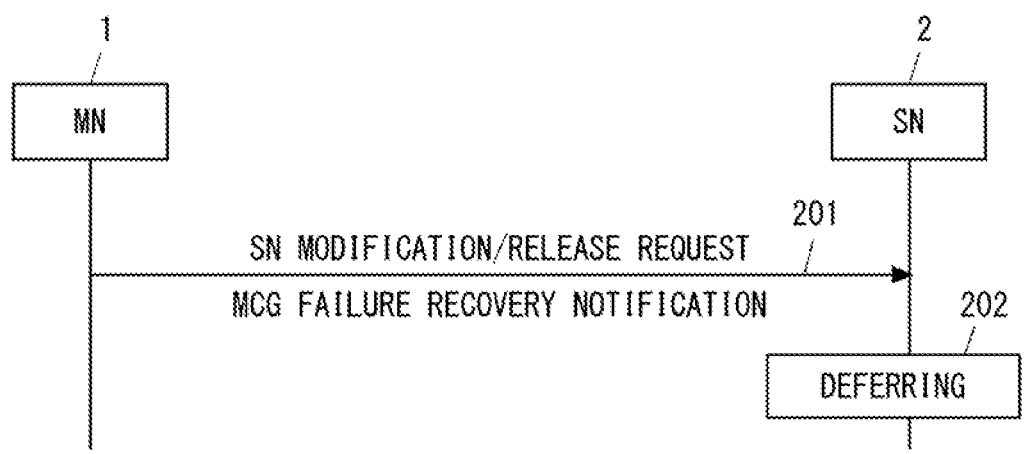
FIG. 2 is a sequence diagram showing an example of operations of an MN and an SN according to an embodiment.

FIG. 2 shows an example of signalling between the MN 1 and the SN 2. In step 201, the MN 1 sends a message to the SN 2 related to a modification or release of a configuration or resources in the SN 2 regarding the DC. That is, the message is a control message of the inter-RAN-node interface (i.e., Xn interface or X2 interface). The message may be a message requesting the SN 2 to modify or release the configuration or resources in the SN 2 with respect to the DC. As shown in FIG. 2, the message in step 201 may be an SN MODIFICATION REQUEST message or an SN RELEASE REQUEST message. The SN MODIFICATION REQUEST message is sent from the MN to the SN to request modification of the configuration or resources in the SN 2 for the DC. On the other hand, the SN RELEASE REQUEST message is sent from the MN to the SN to request release of the configuration or resources in the SN 2. Instead, the message in step 201 may be a new XnAP/X2AP message (e.g., MN MODIFICATION NOTIFICATION message). The configuration in the SN 2 may be, for example, SCG configuration information (e.g., SCG configuration) or bearer configuration information (e.g., Radio bearer configuration) that the SN 2 configures and transmits to the UE 3 and is also held by the SN 2. The resources in the SN 2 may be, for example, resources of a signalling connection associated with the UE 3 between the MN 1 and the SN 2, radio resources in the SCG set by the SN 2 for the UE 3, or terminal information (e.g., UE context) about the UE 3.

In addition, the message in step 201 explicitly or implicitly indicates that the modification or release of the configuration (or resource) in the SN 2 is related to an MCG failure (e.g., MCG RLF) or its recovery. In other words, the message in step 201 explicitly or implicitly indicates that the modification or release of the configuration (or resources) in the SN 2 is due to an MCG failure. For example, the message may include an indication of an MCG failure. This indication may indicate, for example, that an MCG failure has occurred, that an MCG failure has been detected, or the type of an MCG failure (e.g., MCG failure type). Additionally, or alternatively, the message may include an indication of recovery from an MCG failure (or recovery of the MCG link). This indication may indicate, for example, that it intends, aims, or attempts to recovery from an MCG failure (or recovery of an MCG link). Additionally, or alternatively, the message may include an indication of recovery from an MCG failure (or recovery of the MCG link) via the SN (or SCG, or split SRB, or SRB3). The RLF is an example of MCG failures. The MCG failure may be, for example, a handover failure, a reconfiguration failure of the MN (or MCG) (Reconfiguration with sync failure, or Reconfiguration failure), or an integrity protection check failure (Integrity protection check failure). The MCG failure type may indicate any of these other MCG failures.

This allows the SN 2 to know that the modification or release of the configuration (or resources) requested by the message in step 201 is due to an MCG failure. In other words, the SN 2 can become aware that the message in step 201 is associated with an MCG failure or its recovery. Accordingly, the SN 2 can distinguish the message of step 201 from other SN MODIFICATION and SN RELEASE REQUEST messages that are not related to MCG recoveries. Put another way, the SN 2 can distinguish a message about modification or release of the SN configuration (or resources), sent from the MN 1 to the SN 2 to recover from an MCG failure (or recover the MCG link), from other messages.

In some implementations, the MN 1 may decide to initiate an MCG recovery procedure in response to receiving MCG failure information (or MCG failure indication) from the UE 3 via the SN 2 (i.e., via a split SRB, or SRB3 and Xn/X2). The MCG recovery procedure may be an intra-MN handover or inter-MN handover involving the transfer of MN RRC messages via a split SRB or via SRB3 and Xn/X2. Then, the MN 1 may send the message of step 201 to the SN 2 in the MCG recovery procedure. Furthermore, in the MCG recovery procedure, the MN 1 may send an MN RRC message related to the recovery of the MCG failure to the UE 3 via the SCG (i.e., split SRB or SRB3). In other words, the SN 2 may send an MN RRC messages related to the recovery of MCG failure and sent by MN 1 to the UE 3 via the SCG (i.e., split SRB or SRB3).

Instead, the MN 1 may decide to initiate the MCG recovery procedure and send the message of step 201 to the SN 2 in response to the (autonomous) detection of the MCG failure, independently of the reception of the MCG failure information from the UE 3. Furthermore, in the MCG recovery procedure, the MN 1 may send the MN RRC message related to the recovery of the MCG failure to the UE 3 via the SCG (i.e., split SRB or SRB3). By way of example, and not limitation, the detection of the MCG failure in the MN 1 may be similar to the detection method in the existing LTE or NR radio networks. For example, the MCG failure may be detected based on any one of: the success or failure status of uplink or downlink data transmission (e.g., the number of RLC retransmissions); the status of uplink radio quality (e.g., received power or received quality of a Sounding Reference Signal (SRS)); or the status of downlink radio quality (e.g., a CQI report value, or an RSRP, RSRQ or SINR value of Synchronization Signal/PBCH block (SSB) or CSI-RS RSRP).

In addition, the SN 2 may perform step 202. In step 202, the SN 2 determines whether the modification or release of the configuration (or resources) in the SN 2 requested by the message of step 201 is related to the MCG failure or its recovery. In other words, the SN 2 determines whether the message of step 201 is associated with the MCG failure recovery procedure. In other words, the SN 2 determines whether the message of step 201 is due to the MCG failure. If the SN 2 is determined that the message is due to the MCG failure (or is associated with the MCG failure recovery procedure), then the SN 2 postpone the modification or release of the configuration (or resources) in the SN 2 until a predetermined condition associated with the transmission of an MN RRC message from the MN 1 to the UE 3 via the SN 2 (i.e., split SRB or SRB3) is met. The MN RRC message is sent for the recovery from the MCG failure (or recovery of the MCG link). The MN RRC message may be, for example, an MN RRC (Connection) Reconfiguration message that contains a reconfigurationWithSync information element (IE) or a mobilityControlInfo IE.

The SN 2 may defer only a part of the multiple modifications or releases requested by the message in step 201. Specifically, the SN 2 may defer modifications or releases that may prevent the transmission of RRC messages via the SN 2 (i.e., split SRB or SRB3) from the MN 1 to the UE 3. In some implementations, the SN 2 may postpone an update (modification) of a security key applied to a direct radio bearer (e.g., SRB3, DRB) between the SN 2 and the UE 3. Additionally, or alternatively, the SN 2 may postpone Layer-2 reconfiguration (e.g., any one or combination of PDCP re-establishment, PDCP data recovery, RLC re-establishment, and MAC reset). In some implementations, the SN 2 may postpone the release of resources for a signalling connection associated with the UE 3 between the MN 1 and the SN 2. Additionally, or alternatively, the SN 2 may defer releasing radio resources (e.g., SCG configuration) that have been allocated to the UE 3. Additionally, or alternatively, the SN 2 may postpone the release of the terminal information (e.g., UE context) associated with the UE 3. Such an operation allows the SN 2 to control (or adjust) when to modify or release the configuration or resources in the SN 2 so as not to interfere with the transfer of MN RRC messages through the SN 2 between the MN 1 and the UE 3.

The predetermined condition associated with the transmission of an MN RRC message via the SN 2 may include, for example, at least one of the following examples. In some implementations, the predetermined condition may include that the SN 2 has completed transmission of the MN RRC message to the UE 3. In some implementations, the predetermined condition may include that the SN 2 has received a response sent by the UE 3 in response to the reception of the MN RRC message. In the case where the MN RRC is forwarded via a split SRB, the response from the UE 3 may be one or both of a hybrid automatic repeat request (HARQ) one or both of hybrid automatic repeat request (HARQ) Acknowledgement (ACK) and RLC ARQ ACK. On the other hand, in the case where the MN RRC is forwarded via SRB3, the response may be an SN RRC (Connection) Reconfiguration Complete message from the UE 3. Furthermore, in some implementations, the predetermined condition may include that the SN 2 has received an SN Reconfiguration Complete message from the MN 1 (in case of intra-MN handover) or a target MN (in case of inter-MN handover).

Figure 3:
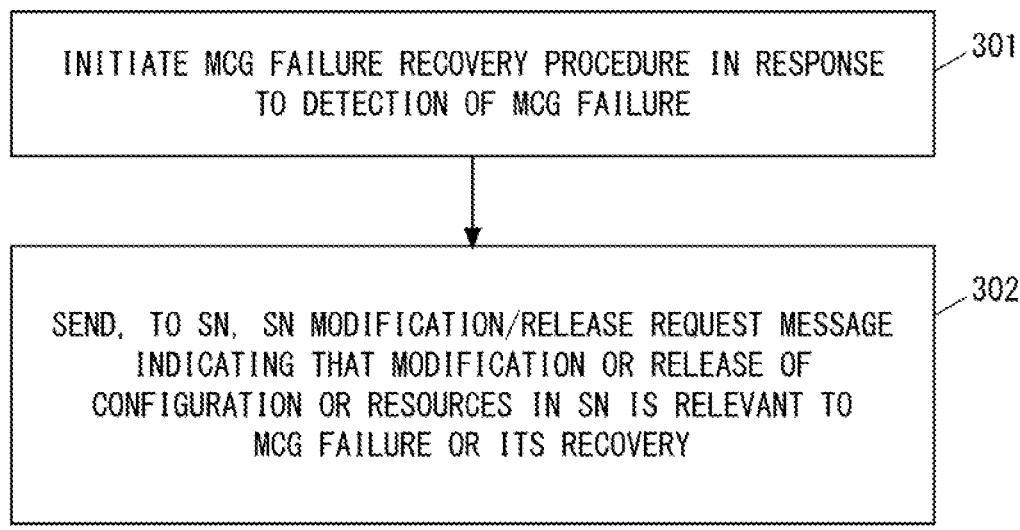
FIG. 3 is a flowchart showing an example of operation of an MN according to an embodiment.

FIG. 3 is a flowchart showing an example of the operation of the MN 1. In step 301, the MN 1 initiates an MCG failure recovery procedure in response to the detection of an MCG failure. As described above, the MN 1 may detect the MCG failure based on the reception of MCG failure information from the UE 3, or it may detect the MCG failure autonomously without relying on the reception of the MCG failure information.

In step 302, the MN 1 sends to the SN 2 an SN MODIFICATION REQUEST or SN RELEASE REQUEST message explicitly or implicitly indicating that the modification or release of configuration (or resources) in the SN 2 is relevant to the MCG failure or its recovery, in the MCG recovery procedure. As described above, the MN 1 may send to the SN 2 another XnAP/X2AP message different from the SN MODIFICATION/RELEASE REQUEST message. The message of step 302 causes the SN 2 to defer modifying or releasing the configuration (or resources) in the SN 2 until a predetermined condition associated with sending an MN RRC message through the SN 2 is met.

Figure 4:
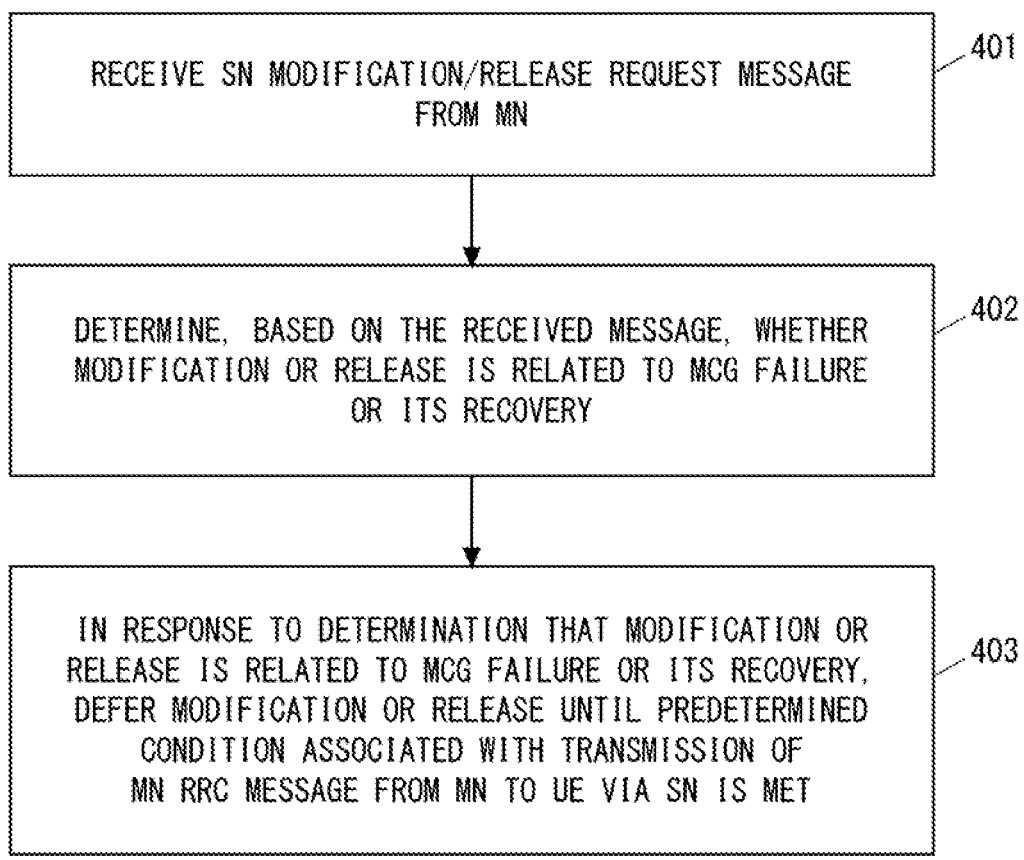
FIG. 4 is a flowchart showing an example of operation of an SN according to an embodiment.

FIG. 4 is a flowchart showing an example of the operation of the SN 2. In step 401, the SN 2 receives an SN MODIFICATION REQUEST or SN RELEASE REQUEST message from the MN 1. In step 402, the SN 2 determines whether the modification or release of configuration (or resources) in the SN 2 requested by the message in step 401 is related to an MCG failure or its recovery, based on the message in step 401. In other words, the SN 2 determines whether the message of step 401 is associated with an MCG failure recovery procedure. In other words, the SN 2 determines whether the message of step 401 is due to an MCG failure. If the message is related to an MCG failure or its recovery, the SN 2 defers modifying or releasing the configuration (or resources) in the SN 2 until a predetermined condition associated with the transmission of an MN RRC message from the MN 1 to the UE 3 via the SN 2 (i.e., split SRB or SRB3) is satisfied (Step 403).

Second Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a split SRB (e.g., split SRB1) has been configured between the MN 1 and the UE 3, the MN 1 performs an intra-MN handover without SN change to recover from the MCG failure.

Figure 5:
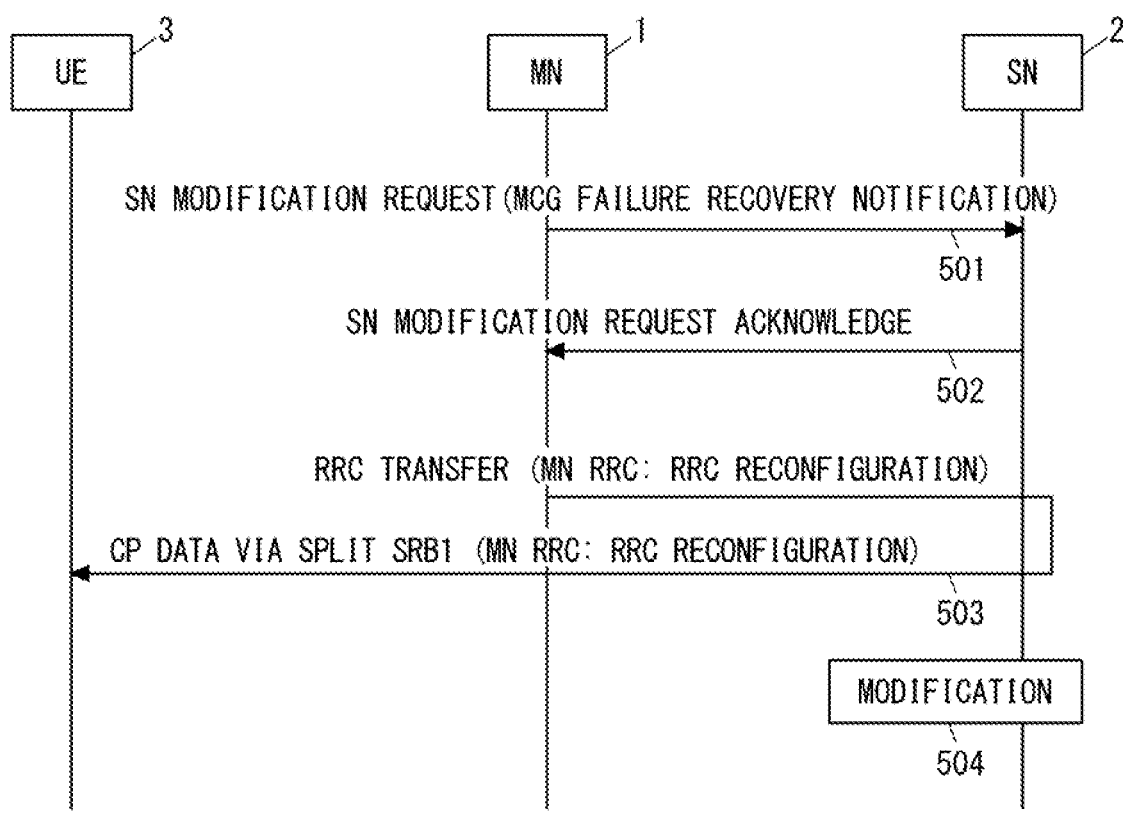
FIG. 5 is a sequence diagram showing an example of operations of an MN and an SN according to an embodiment.

FIG. 5 shows an example of signalling of the MN 1 and the SN 2 performed in an intra-MN handover procedure without SN change. In step 501, the MN 1 sends an SN MODIFICATION REQUEST message to the SN 2. The SN MODIFICATION REQUEST message requests the SN 2 to modify (or update) a configuration or resources associated with the UE 3 in the SN 2. For example, the message may indicate information on a new security key in order to request modification (or update) of a security key (e.g., SgNB Security Key) applied to a bearer (SN terminated bearer) terminated in the SN 2.

The SN MODIFICATION REQUEST message of step 501 further includes an indication to the SN 2 that the message is associated with an MCG failure or its recovery. This indication may be referred to as, for example, MCG failure recovery notification, MCG link recovery notification, or MCG failure notification. The indication may be an IE or Cause value that is contained in the message. Alternatively, the Cause value may be, for example, MCG Radio Connection With UE Lost, or MCG RLF. In response to the receipt of the indication, the SN 2 postpones the modification of the configuration (or resources) in the SN 2.

In step 502, the SN 2 sends an SN MODIFICATION REQUEST ACKNOWLEDGE message to the MN 1 to confirm the request from the MN 1 for the SN (or SCG) resource modification for the UE 3. The message may contain a CG-Config message generated by the SN 2. The CG-Config message contains the SCG radio configuration (e.g., one or both of scg-CellGroupConfig and scg-RB-Config) generated by the SN 2 based on the SN MODIFICATION REQUEST message of step 501.

In step 503, the MN 1 transmits an MN RRC message (e.g., RRC Reconfiguration including reconfigurationWithSync) to the UE 3 via the SCG leg of split SRB1. Specifically, the MN 1 sends to the SN 2 an RRC TRANSFER message that contains a Packet Data Convergence Protocol (PDCP) Protocol Data Unit (PDU) encapsulating this MN RRC message. The SN 2 receives the RRC TRANSFER message and sends the PDCP PDU (encapsulating the MN RRC message) to the UE 3 via the SCG leg of Split SRB1. In the 5G terminology, the PDCP PDU is also referred to as PDCP-C PDU because the PDCP PDU contains an RRC message of Control Plane (CP). The PDCP PDU of the PDCP hosted by the gNB Central Unit (CU) Control Plane (CP) is also called PDCP-C PDU in the same manner.

Upon receiving the MN RRC message in step 503, the UE 3 performs intra-MN handover without SN change according to the RRC configuration information (e.g., one or both of securityConfig (HO) and sk-Counter) contained in the MN RRC message. The RRC message may contain an SN RRC message (or SN RRC configuration) for the intra-MN handover without SN change. In this case, the MCG RRC entity of the UE 3 passes the SN RRC message to the SCG RRC entity of the UE 3. The UE 3 performs the intra-MN handover without SN change according to the MN RRC message and the SN RRC message.

In step 504, after sending the PDCP PDU (encapsulating the MN RRC message) to the UE 3, the SN 2 modifies (or updates) the SN (SCG) resources (e.g., the configuration or resources in SN 2) for the UE 3 that was requested by the SN MODIFICATION REQUEST message in step 501. The SN 2 may modify (update) the SN (SCG) resource in response to the transmission of the PDCP PDU to the UE 3. That is, in the example of FIG. 5, the MN-initiated SN Modification Preparation procedure interacts with the RRC Transfer procedure (or the MN RRC reconfiguration procedure). In other words, the MN-initiated SN Modification Preparation procedure is associated with the RRC Transfer procedure (or the MN RRC reconfiguration procedure). In some implementations, if the SN 2 further receives an RRC TRANSFER message after (e.g., right after) receiving an SN MODIFICATION REQUEST message from the MN 1, and if it contains an SN RRC container (e.g., PDCP-C PDU) to be sent in a Split SRB, the SN 2 performs the transmission of the SN RRC container to the UE 3 in priority to the SN Modification Preparation procedure.

Figure 6:
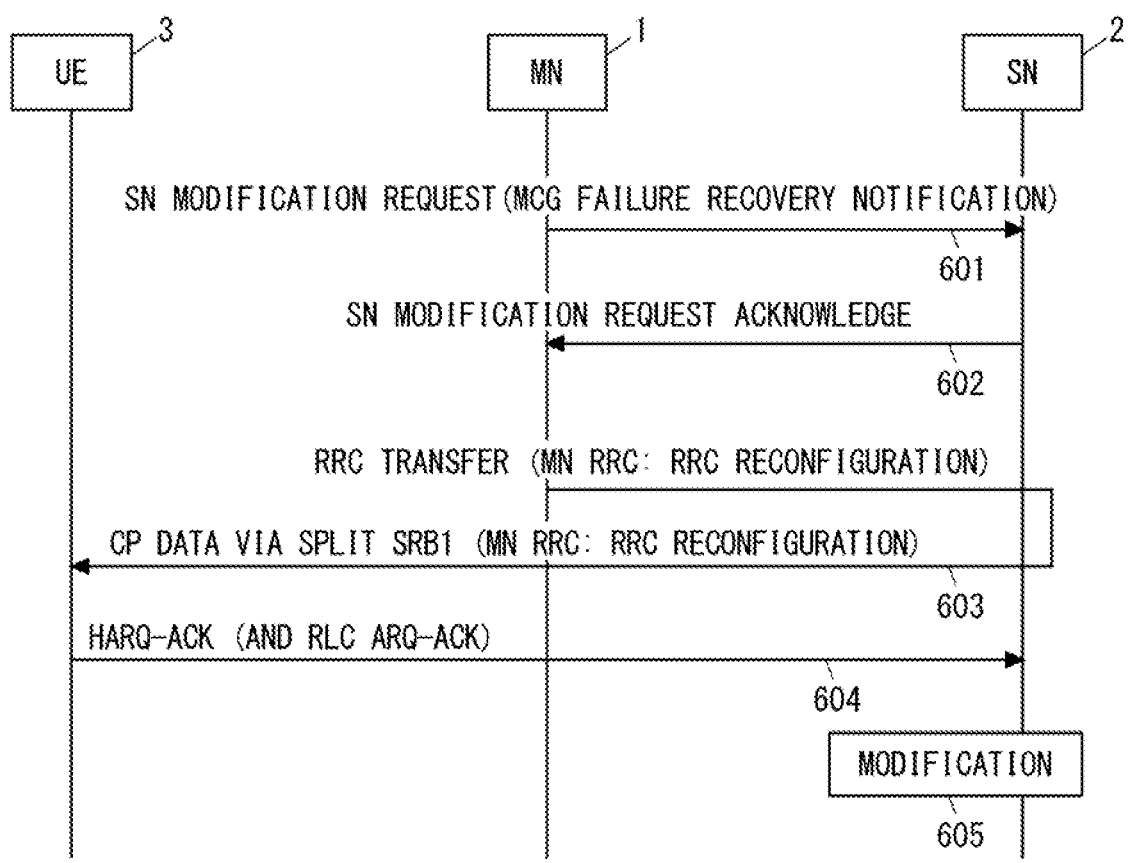
FIG. 6 is a sequence diagram showing an example of operations of an MN and an SN according to an embodiment.

FIG. 6 shows a modified example of the procedure shown in FIG. 5. The behavior of the MN 1 and SN 2 in steps 601-603 is similar to that in steps 501-503. In step 604, the SN 2 receives a HARQ-ACK (and RLC ARQ-ACK) from the UE 3. The HARQ-ACK (and RLC ARQ-ACK) is transmitted by the UE 3 to the Medium Access Control (MAC) sublayer (and RLC sublayer) of the SN 2 in response to the reception of the MN RRC message via the SCG leg (i.e., SCG RLC bearer) in step 603.

In step 605, after receiving the HARQ-ACK (and RLC ARQ-ACK) from the UE 3, the SN 2 performs the modification (or update) of the SN (SCG) resource for the UE 3 that was requested by the SN MODIFICATION REQUEST message in step 601. The SN 2 may modify (update) the SN (SCG) resources in response to receiving the HARQ-ACK (and RLC ARQ-ACK) from the UE 3. That is, in the example in FIG. 6, the MN-initiated SN Modification Preparation procedure interacts with the RRC Transfer procedure (or MN RRC reconfiguration procedure). In other words, the MN-initiated SN Modification Preparation procedure is associated with the RRC Transfer procedure (or MN RRC reconfiguration procedure). In some implementations, if the SN 2 further receives an RRC TRANSFER message after (e.g., right after) receiving an SN MODIFICATION REQUEST message from the MN 1, and if it contains an SN RRC container (e.g., PDCP-C PDU) to be sent in a Split SRB, the SN 2 transmits the SN RRC container to the UE 3 in priority to the SN Modification Preparation procedure.

Note that in a normal handover, a UE is allowed to omit sending an HARQ-ACK (and RLC ARQ-ACK) on reception of an RRC (Connection) Reconfiguration message that contains a reconfigurationWithSync IE (or mobilityControlInfo IE). However, if the UE 3 receives a reconfigurationWith-Sync IE (or mobilityControlInfo IE) via the SCG leg of a Split SRB as shown in FIG. 6, the UE 3 may operate to always send an HARQ-ACK (and RLC ARQ-ACK) to the SN 2. The UE 3 may operate to always send an HARQ-ACK (and RLC ARQ-ACK) to the SN 2 only if the UE 3 has reported the detection of an MCG failure to the MN 1 via the SCG and the SN 2. Specifically, for example, the UE 3 may operate in this way if the UE 3 sent MCG Failure Information. Alternatively, the UE 3 may operate in this manner if a predetermined time has not elapsed since the UE 3 transmitted the MCG Failure Information. Alternatively, the UE 3 may operate in this way if the UE 3 has been permitted to transmit the MCG Failure Information. Alternatively, the UE 3 may operate in this way if the UE 3 has received from the MN a configuration information for sending the MCG Failure Information.

Figure 7:
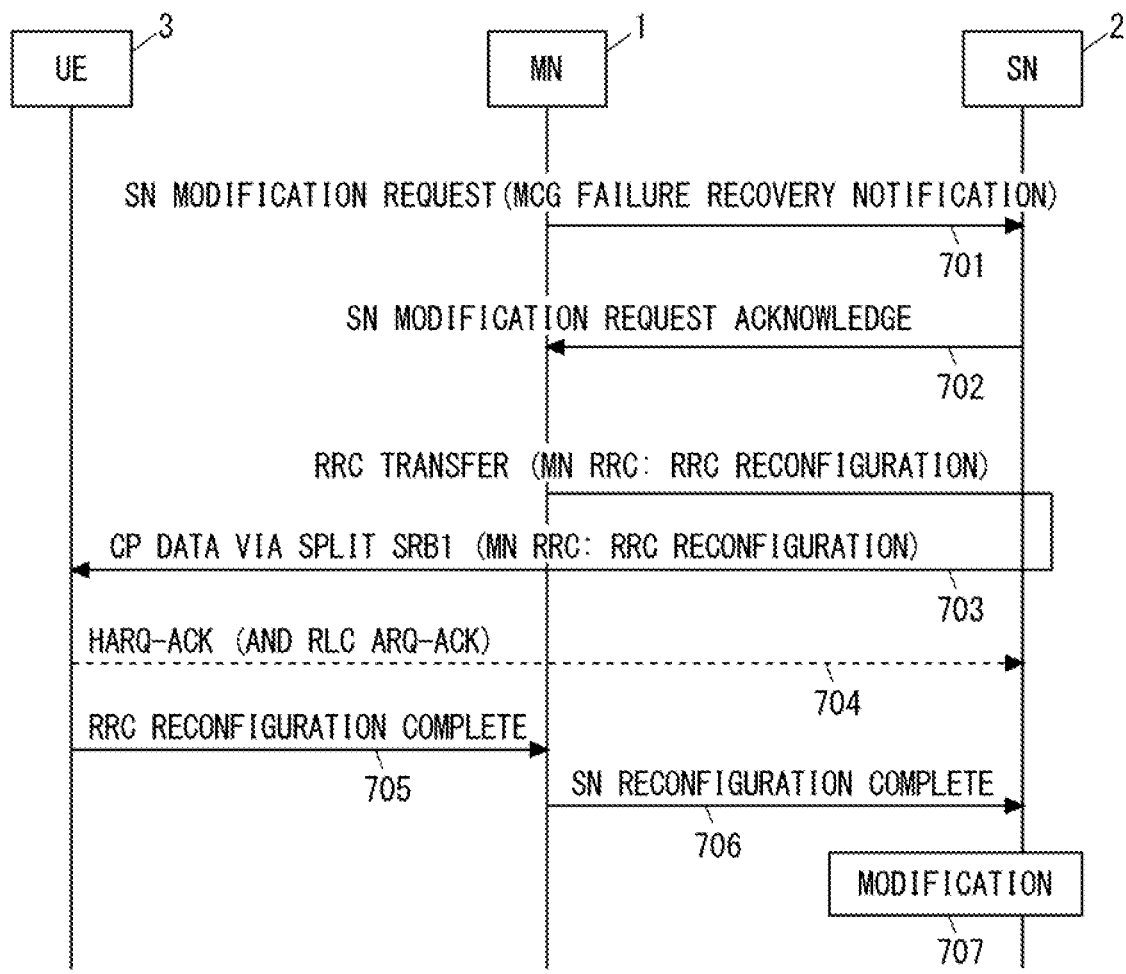
FIG. 7 is a sequence diagram showing an example of operations of an MN and an SN according to an embodiment.

FIG. 7 shows another modified example of the procedure shown in FIG. 5. Steps 701 to 704 are similar to steps 601 to 604 in FIG. 6. However, the HARQ-ACK (and RLC ARQ-ACK) transmission in step 704 may be omitted. In step 705, the UE 3 transmits an RRC Reconfiguration Complete message to the MN 1 via a new PCell indicated by an SpCellConfig IE (servCellIndex of the SpCellConfig IE) that contains a ReconfigurationWithSync IE. If a Mobility-ControlInfo IE is used instead of the ReconfigurationWith-Sync IE, the new PCell may be specified by a targetPhys-CellId that is contained in this IE. In step 706, the MN 1 sends an SN RECONFIGURATION COMPLETE message to the SN 2. The SN RECONFIGURATION COMPLETE message indicates that the UE 3 has successfully applied the SCG radio configuration (e.g., one or both of scg-Cell-GroupConfig and scg-RB-Config) that was included in the SN MODIFICATION REQUEST ACKNOWLEDGE message in step 702.

In step 707, after receiving the SN RECONFIGURATION COMPLETE message from the MN 1, the SN 2 performs the modification (or update) of the SN (SCG) resources for the UE 3 requested by the SN MODIFICATION REQUEST message in step 701. The SN 2 may modify (or update) its SN (SCG) resources in response to receiving the SN RECONFIGURATION COMPLETE message. That is, in the example of FIG. 7, the MN-initiated SN Modification Preparation procedure interacts with the SN Reconfiguration Complete procedure. In other words, the MN-initiated SN Modification Preparation procedure is associated with the SN Reconfiguration Complete procedure.

In some implementations, if the SN 2 accepts (or admits) a terminal information (e.g., UE context) modification (i.e., SN MODIFICATION REQUEST) for which the MN 1 needs to be reported on the success of an RRC reconfiguration procedure, the SN 2 may start a timer (e.g., $T_{DCoverall}$, $TXn_{DCoverall}$) when it sends the SN MODIFICATION REQUEST ACKNOWLEDGE message to the MN 1. The SN 2 may then stop the timer upon receiving the SN RECONFIGURATION COMPLETE message. Furthermore, if the SN 2 further receives an RRC TRANSFER message after (e.g., right after) receiving the SN MODIFICATION REQUEST message from the MN 1, and if it contains an SN RRC container (e.g., PDCP-C PDU) to be sent in a Split SRB, the SN 2 prioritizes the transmission of the SN RRC container to the UE 3 over the SN Modification Preparation procedure. That is, the SN 2 does not modify (or update) the terminal information (i.e., SN (SCG) resources) at least until it receives the SN RECONFIGURATION COMPLETE message.

Figure 8:
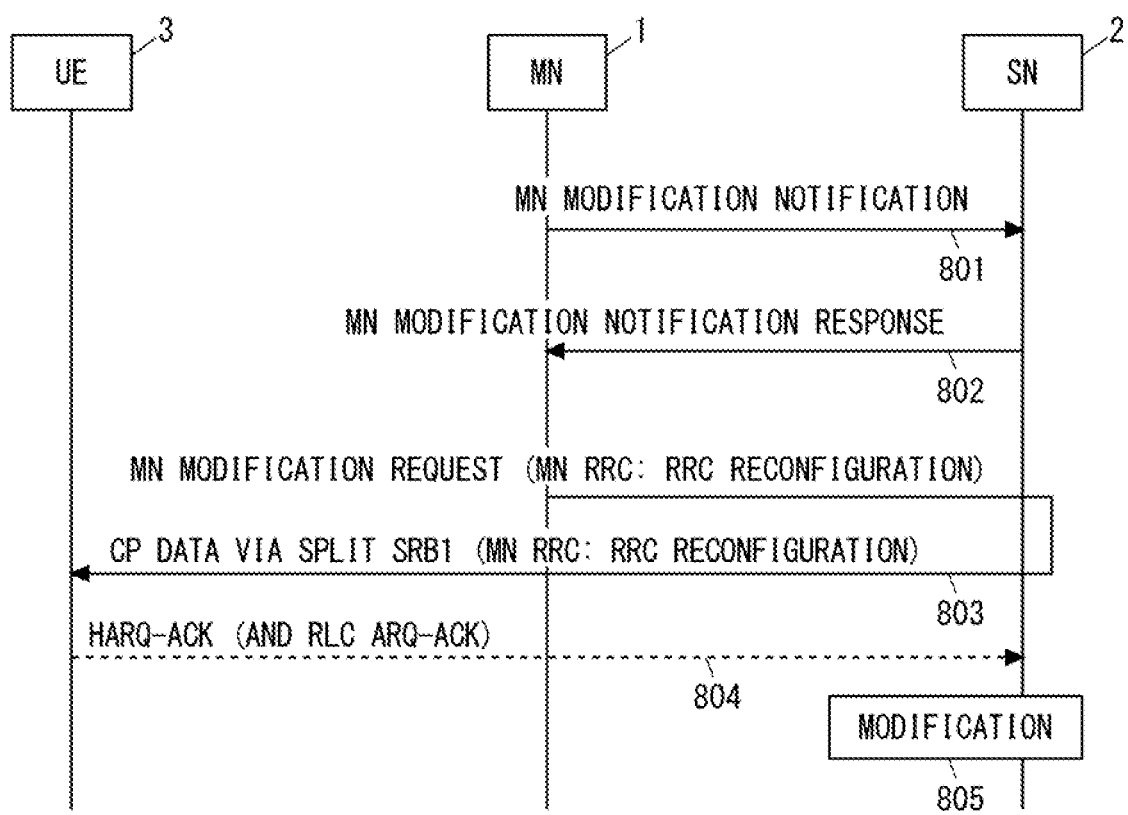
FIG. 8 is a sequence diagram showing an example of operations of an MN and an SN according to an embodiment.

FIG. 8 shows another modified example of the procedure shown in FIG. 5. As already explained, instead of SN MODIFICATION REQUEST/ACKNOWLEDGE messages, new XnAP/X2AP messages (messages) may be used. In the example of FIG. 8, the MN 1 sends an MN MODIFICATION NOTIFICATION message to the SN 2 (step 801). The MN MODIFICATION NOTIFICATION message indicates to the SN 2 that an SCG modification (or reconfiguration) associated with an MCG modification (or change or reconfiguration) is required. Similar to the SN MODIFICATION REQUEST message, the MN MODIFICATION NOTIFICATION message requests the SN 2 to modify (or update) the configuration or resources for the UE 3 in the SN 2. The MN MODIFICATION NOTIFICATION message may include an indication to indicate to the SN 2 that the message is associated with an MCG failure or its recovery. Alternatively, the transmission of the MN MODIFICATION NOTIFICATION message itself may be associated with an MCG failure or its recovery (that is, it may imply an MCG failure or its recovery). In other words, the MN MODIFICATION NOTIFICATION message is sent to recover from an MCG failure, and the SN 2, by receiving (in response to receiving) the message, may be aware that the MN 1 is attempting to recover from the MCG failure.

In step 802, the SN 2 sends an MN MODIFICATION NOTIFICATION RESPONSE message to the MN 1 to confirm the request from the MN 1 for SN (SCG) resource modification for the UE 3. This message may contain a CG-Config message generated by SN 2 in the same way as the SN MODIFICATION REQUEST ACKNOWLEDGE message.

In step 803, as in step 503, the MN 1 sends an MN RRC message (e.g., RRC Reconfiguration including reconfigurationWithSync) to the UE 3 via the SCG leg of a split SRB1. However, in step 803, a new XnAP/X2AP message (e.g., MN MODIFICATION REQUEST message) is used instead of the RRC TRANSFER message. The MN MODIFICATION REQUEST message indicates to the SN 2 that the MN RRC message associated with the MCG modification needs to be forwarded to the UE 3.

In step 804, the SN 2 receives an HARQ-ACK (and RLC ARQ-ACK) from the UE 3. The HARQ-ACK (and RLC ARQ-ACK) transmission in step 804 may be omitted.

In step 805, after sending the PDCP PDU (encapsulating the MN RRC message) to the UE 3, the SN 2 performs the modification (or update) of the SN (SCG) resources for the UE 3 that was requested by the MN MODIFICATION NOTIFICATION message in step 801. The SN 2 may modify (or update) the SN (SCG) resources in response to sending the PDCP PDU to the UE 3. Alternatively, the SN 2 may modify (or update) the SN (SCG) resource for the UE 3 after receiving the HARQ-ACK (and RLC ARQ-ACK) from the UE 3. The SN 2 may modify (or update) the SN (SCG) resource in response to receiving the HARQ-ACK (and RLC ARQ-ACK) from the UE 3.

Similar to the procedure in FIG. 7, in FIG. 8, the SN 2 may modify (or update) the SN (SCG) resources for the UE 3 that was requested by the MN MODIFICATION NOTIFICATION message of step 801, after receiving the SN RECONFIGURATION COMPLETE message from the MN 1.

The MN MODIFICATION NOTIFICATION, MN MODIFICATION NOTIFICATION RESPONSE and MN MODIFICATION REQUEST messages in steps 801, 802 and 803 may be specified as a single (combined) procedure. In this procedure, these actions may be performed as a series of actions (i.e., in conjunction with each other). The procedure may be called, for example, an MN MODIFICATION preparation procedure or an MN RECOVERY preparation procedure.

Figure 9:
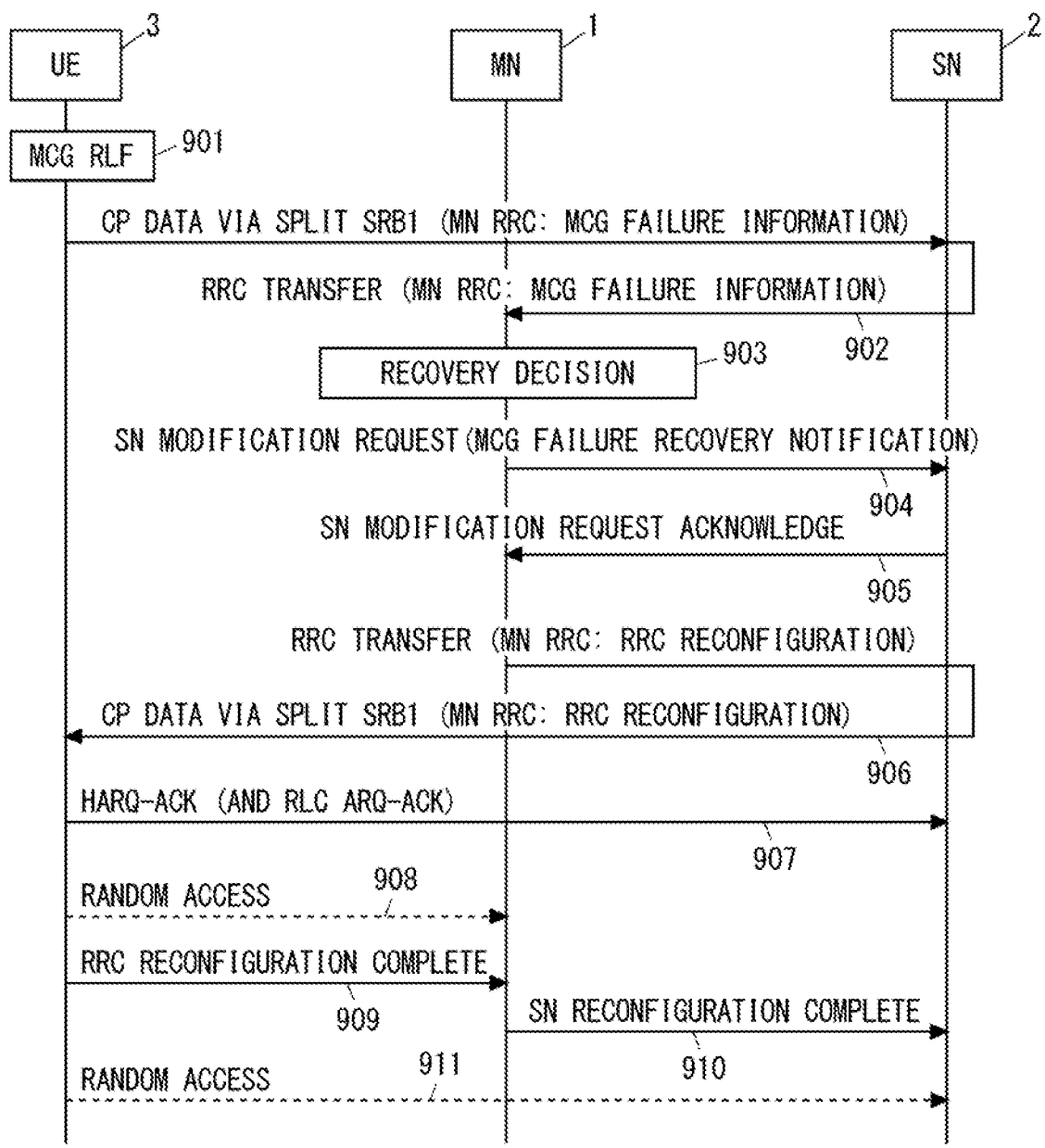
FIG. 9 is a sequence diagram showing an example of operations of an MN and an SN according to an embodiment.

FIG. 9 shows a specific example of the procedures shown in FIGS. 5 to 7. Steps 904 to 906 of FIG. 9 correspond to steps 501 to 503 of FIG. 5, steps 601 to 603 of FIG. 6, and steps 701 to 703 of FIG. 7. Step 907 of FIG. 9 corresponds to step 604 of FIG. 6 and step 704 of FIG. 7. Steps 909 and 910 of FIG. 9 correspond to steps 705 and 706 of FIG. 7.

In step 901 of FIG. 9, the UE 3 detects an MCG failure (e.g., MCG RLF). In step 902, the UE 3 transmits MCG failure information to the MN 1 via the SCG leg of Split SRB1. An RRC TRANSFER message may be used to transfer the MCG failure information from the SN 2 to the MN 1. In step 903, the MN 1 determines an MCG failure recovery procedure in response to receiving the MCG failure information. This MCG failure recovery procedure includes an intra-MN handover procedure without SN change (i.e., steps 904-911).

Figure 10:
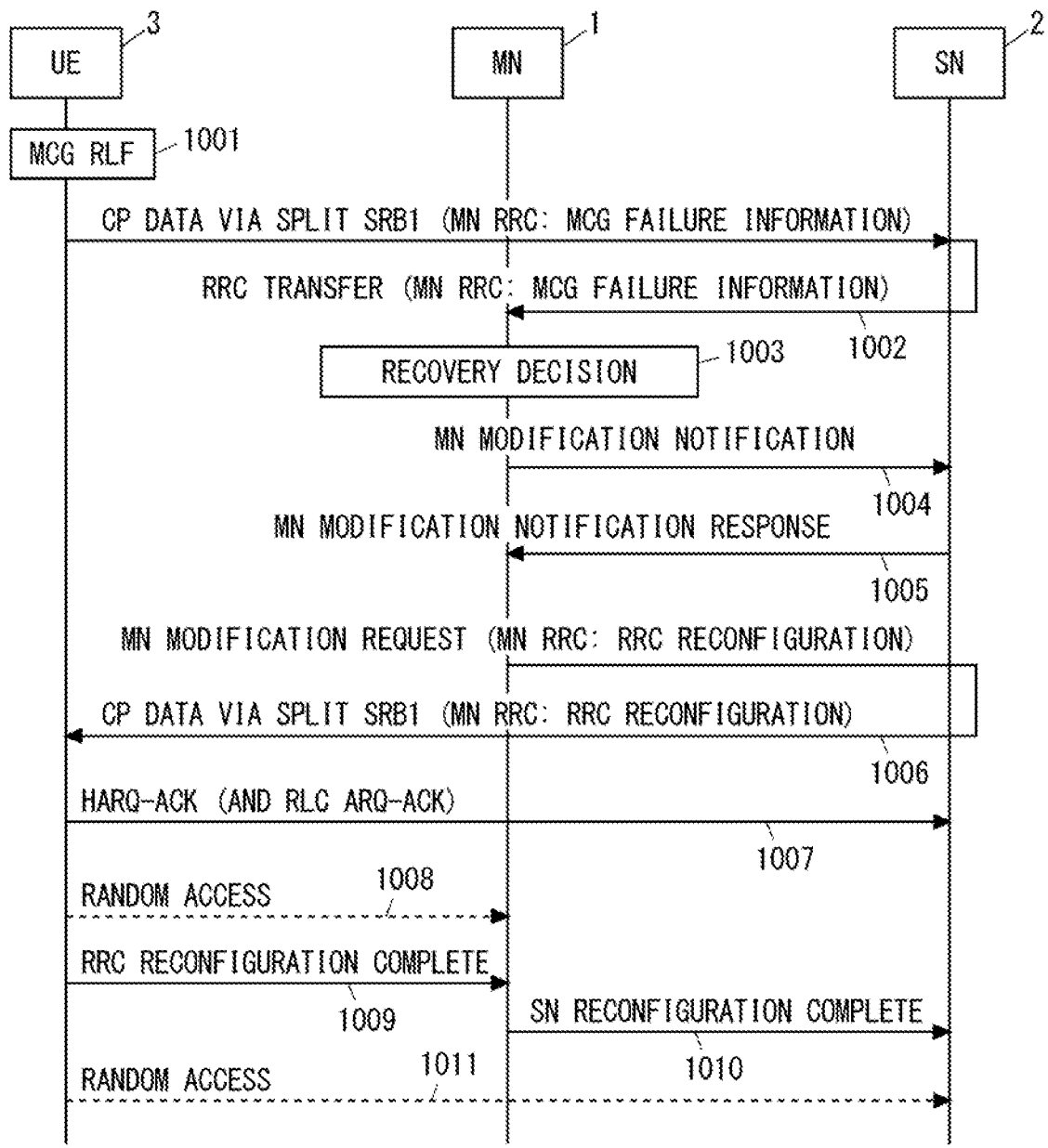
FIG. 10 is a sequence diagram showing an example of operations of an MN and an SN according to an embodiment.

FIG. 10 shows a specific example of the procedure shown in FIG. 8. Steps 1004 to 1007 in FIG. 10 correspond to steps 801 to 804 in FIG. 8. Steps 1001 to 1003 in FIG. 10 are similar to steps 901 to 903 in FIG. 9. Steps 1008 to 1011 in FIG. 10 are similar to steps 908 to 911 in FIG. 9.

Third Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a split SRB (e.g., split SRB1) has been configured between the MN 1 and the UE 3, the MN 1 performs an inter-MN handover without SN change to recover from the MCG failure.

Figure 11:
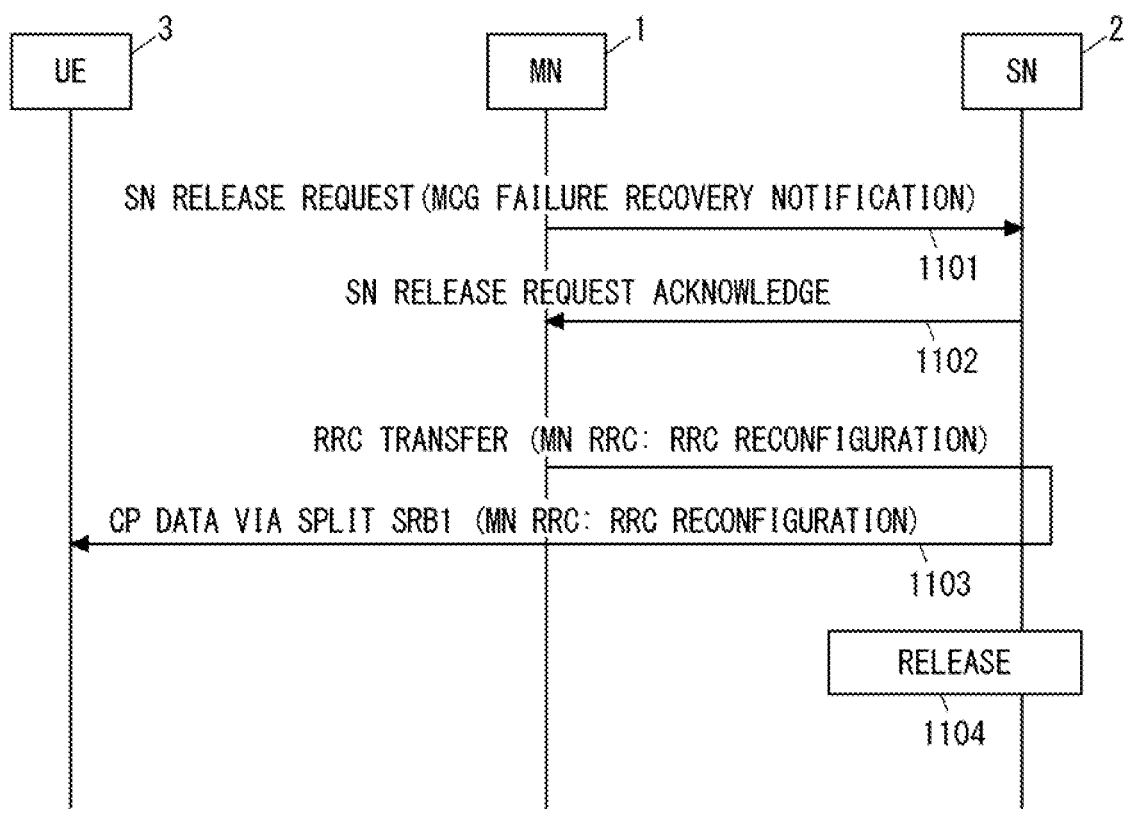
FIG. 11 is a sequence diagram showing an example of operations of an MN and an SN according to an embodiment.

FIG. 11 shows an example of signaling of the MN 1 and the SN 2 performed in an inter-MN handover procedure without SN change. In step 1101, the MN 1 sends an SN RELEASE REQUEST message to the SN 2. The MN 1 includes in the SN RELEASE REQUEST message a UE Context Kept Indicator IE set to "True" to indicate to the SN 2 that the UE context in the SN 2 is to be maintained (kept).

The SN RELEASE REQUEST message in step 1101 further includes an additional indication to indicate to the SN 2 that the message is associated with an MCG failure or its recovery. The additional indication may be referred to as, for example, MCG failure recovery notification, MCG link recovery notification, or MCG failure notification. The indication may be an IE or Cause value that is contained in the message. In response to receiving the additional indication, the SN 2 postpones the release of a configuration (or resources) within the SN 2. Specifically, the SN 2 may postpone the release of resources for a signaling connection associated with the UE 3 between the MN 1 and the SN 2. Additionally, or alternatively, the SN 2 may defer the release of radio resources allocated to the UE 3.

In step 1102, the SN 2 sends an SN RELEASE REQUEST ACKNOWLEDGE message to the MN 1 in order to confirm the request from the MN 1 for releasing the SN (SCG) resources for the UE 3.

In step 1103, the MN 1 transmits an MN RRC message (e.g., RRC Reconfiguration including reconfigurationWithSync) to the UE 3 via the SCG leg of split SRB1. Step 1103 is similar to step 503 of FIG. 5.

In step 1104, the SN 2 performs the release of the SN (SCG) resources for the UE 3 requested by the SN RELEASE REQUEST message in step 501 after sending the PDCP PDU (encapsulating the MN RRC message) to the UE 3. The SN 2 may release the SN (SCG) resources in response to sending the PDCP PDU to the UE 3. That is, in the example in FIG. 11, the MN-initiated SN Release procedure interacts with the RRC Transfer procedure (or MN RRC reconfiguration procedure). In other words, the MN-initiated SN Release procedure is associated with the RRC Transfer procedure (or MN RRC reconfiguration procedure). In some implementations, if the SN 2 further receives an RRC TRANSFER message after (e.g., right after) receiving an SN RELEASE REQUEST message from the MN 1, and it contains an SN RRC container (e.g., PDCP-C PDU) to be sent via a Split SRB, the SN 2 sends the SN RRC container to the UE 3 in priority to the SN Release procedure.

Figure 12:
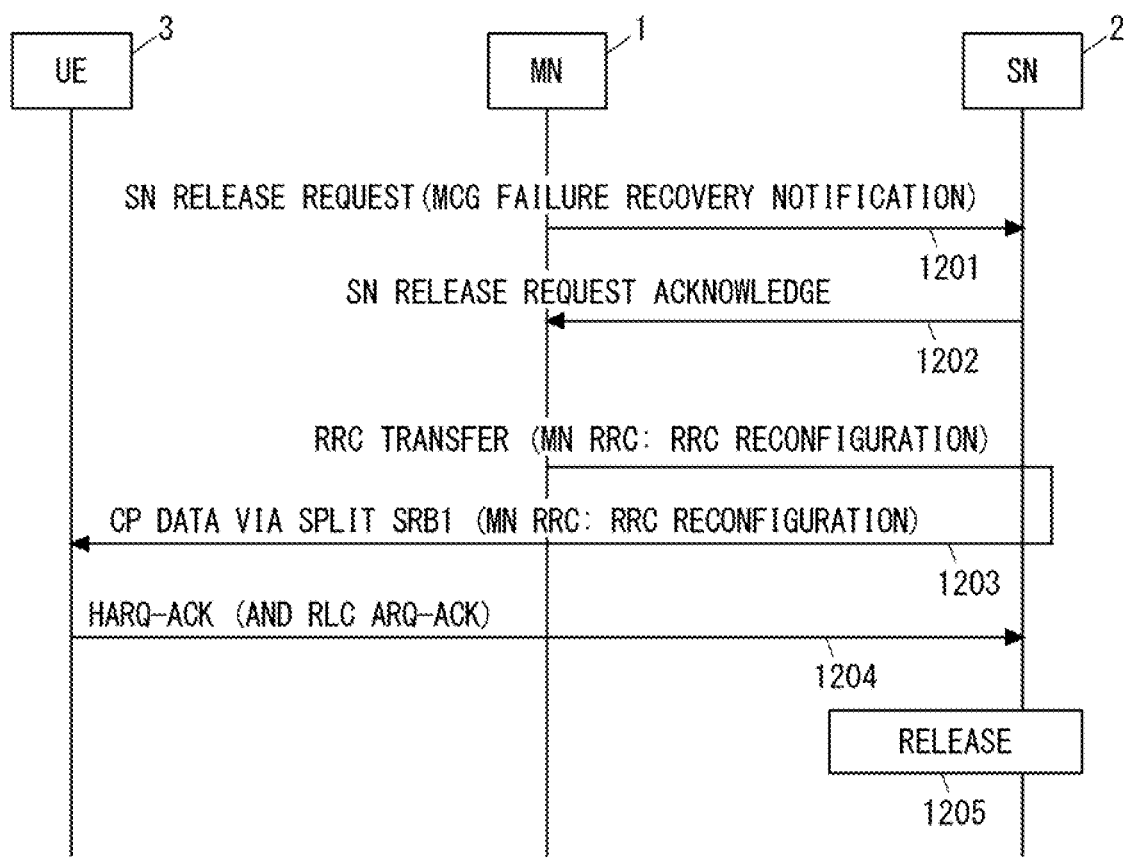
FIG. 12 is a sequence diagram showing an example of operations of an MN and an SN according to an embodiment.

FIG. 12 shows a modified example of the procedure shown in FIG. 11. The operations of the MN 1 and the SN 2 in steps 1201 to 1203 are similar to those in steps 1101 to 1103. In step 1204, the SN 2 receives an HARQ-ACK (and RLCARQ-ACK) from the UE 3. The HARQ-ACK (and RLC ARQ-ACK) is transmitted from the UE 3 to the MAC sublayer (and RLC sublayer) of the SN 2, in response to the reception of the MR RRC message in step 1203 via the SCG leg (i.e., SCG RLC bearer).

In step 1205, after receiving the HARQ-ACK (and RLC ARQ-ACK) from the UE 3, the SN 2 performs the release of the SN (SCG) resources for the UE 3 requested by the SN RELEASE REQUEST message of step 1201. The SN 2 may release the SN (SCG) resources in response to receiving the HARQ-ACK (and RLCARQ-ACK) from the UE 3. That is, in the example of FIG. 12, the MN-initiated SN Release procedure interacts with the RRC Transfer procedure (or MN RRC reconfiguration procedure). In other words, the MN-initiated SN Release procedure is associated with the RRC Transfer procedure (or MN RRC reconfiguration procedure). In some implementations, if the SN 2 further receives an RRC TRANSFER message after (e.g., right after) receiving an SN RELEASE REQUEST message from the MN 1, and if it contains an SN RRC container (e.g., PDCP-C PDU) to be sent in a Split SRB, the SN 2 performs the transmission of the SN RRC container to the UE 3 with priority over the SN Release procedure.

Note that in a normal handover, a UE is allowed to omit sending an HARQ-ACK (and RLC ARQ-ACK) on reception of an RRC (Connection) Reconfiguration message that contains a reconfigurationWithSync IE (or mobilityControlInfo IE). However, if the UE 3 receives a reconfigurationWithSync IE (or mobilityControlInfo IE) via the SCG leg of a Split SRB as shown in FIG. 12, the UE 3 may operate to always send an HARQ-ACK (and RLC ARQ-ACK) to the SN 2. The UE 3 may operate to always send an HARQ-ACK (and RLC ARQ-ACK) to the SN 2 only if the UE 3 has reported the detection of an MCG failure to the MN 1 via the SCG and the SN 2. Specifically, for example, the UE 3 may operate in this way if the UE 3 transmitted MCG Failure Information. Alternatively, the UE 3 may operate in this manner if a predetermined time has not elapsed since the UE 3 transmitted the MCG Failure Information. Alternatively, the UE 3 may operate in this way if the UE 3 has been permitted to transmit the MCG Failure Information. Alternatively, the UE 3 may operate in this way if the UE 3 has received from the MN a configuration information for sending the MCG Failure Information.

Figure 13:
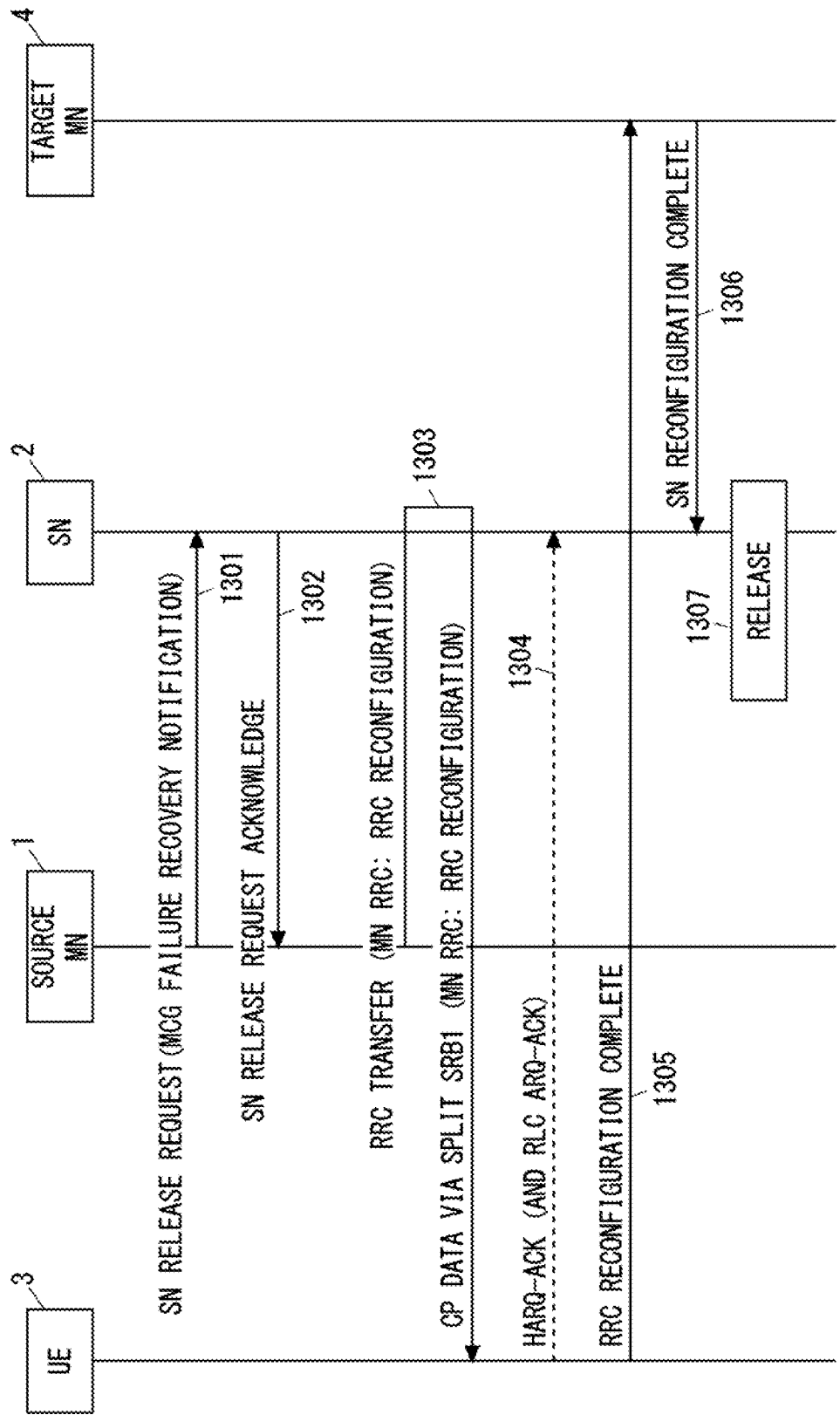
FIG. 13 is a sequence diagram showing an example of operations of an MN and an SN according to an embodiment.

FIG. 13 shows another modified example of the procedure shown in FIG. 11. Steps 1301 to 1304 are similar to steps 1201 to 1204 in FIG. 12. However, the HARQ-ACK (and RLC ARQ-ACK) transmission in step 1304 may be omitted. In step 1305, the UE 3 sends an RRC Reconfiguration Complete message to the target MN 4 via a new PCell indicated by an SpCellConfig IE (servCellIndex of the SpCellConfig IE) that contains a ReconfigurationWithSync IE. If a MobilityControlInfo IE is used instead of ReconfigurationWithSync IE, the new PCell may be specified by a targetPhysCellId included in this IE. In step 1306, the target MN 4 sends an SN RECONFIGURATION COMPLETE message (or MN RECONFIGURATION COMPLETE message) to the SN 2.

In step 1307, after receiving the SN RECONFIGURATION COMPLETE message from the target MN 4, the SN 2 performs the release of the SN (SCG) resources for the UE 3 requested by the SN RELEASE REQUEST message in step 1301. The SN 2 may release the SN (SCG) resources in response to receiving the SN RECONFIGURATION COMPLETE message. That is, in the example of FIG. 13, the MN-initiated SN Release procedure interacts with the SN Reconfiguration Complete procedure. In other words, the MN-initiated SN Release procedure is associated with the SN Reconfiguration Complete procedure. Instead of step 1306, the target MN 4 may send an MN RECONFIGURATION COMPLETE message to the source MN 1 and the source MN 1 may send an SN RECONFIGURATION COMPLETE message to the SN 2.

The procedure in FIG. 11 may be further modified. Instead of the SN RELEASE REQUEST/ACKNOWLEDGE messages, new XnAP/X2AP messages may be used. For example, the MN MODIFICATION NOTIFICATION/ RESPONSE messages may be used similar to the procedure in FIG. 8. Additionally, or alternatively, a new XnAP/X2AP message (e.g., MN MODIFICATION REQUEST message in FIG. 8) may be used in place of the RRC TRANSFER message. As described with respect to FIG. 8, the MN MODIFICATION NOTIFICATION, MN MODIFICATION RESPONSE, and MN MODIFICATION REQUEST messages may be specified together as a single (combined) procedure.

Figure 14:
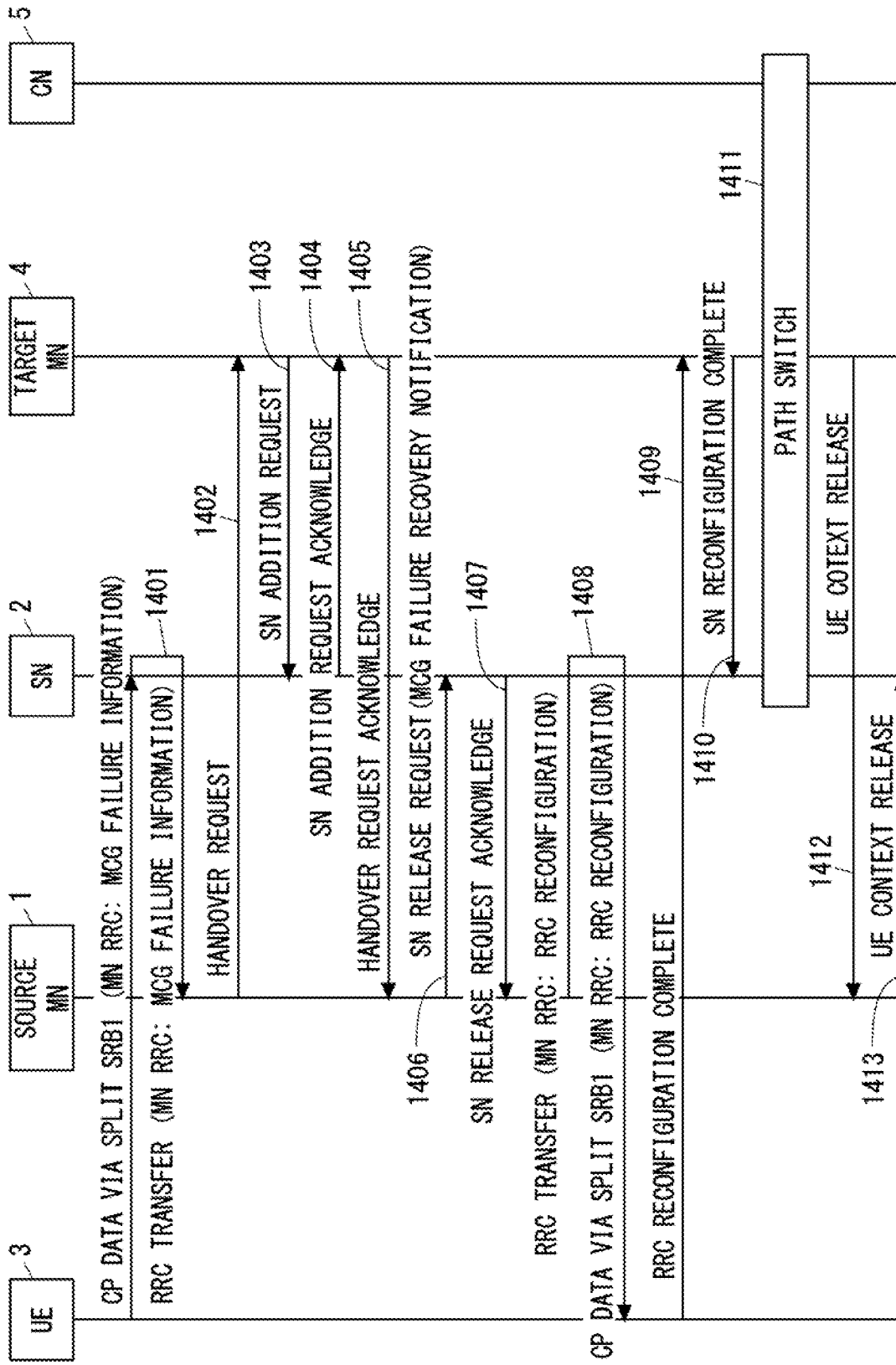
FIG. 14 is a sequence diagram showing an example of operations of an MN and an SN according to an embodiment.

FIG. 14 shows a specific example of the procedures shown in FIGS. 11 to 13. Steps 1406 to 1408 of FIG. 14 correspond to steps 1101 through 1103 of FIG. 11, steps 1201 to 1203 of FIG. 12, and steps 1301 to 1303 of FIG. 13. Steps 1409 and 1410 of FIG. 14 correspond to steps 1305 and 1306 of FIG. 13. In FIG. 14, upon reception of an SN RECONFIGURATION COMPLETE message (or MN RECONFIGURATION COMPLETE message) from the target MN 4 (step 1410), the SN 2 may release the SN (SCG) resources for the UE 3 requested by the SN RELEASE REQUEST message of step 1406, except for the terminal information (e.g., UE context) of the UE 3. For example, the SN 2 may release radio resources (e.g., source SCG lower layer configuration (e.g., CellGroupConfig)) associated with the UE 3 for MR-DC with the source MN 1.

In step 1401 of FIG. 14, the UE 3 transmits MCG failure information to the MN 1 via the SCG leg of Split SRB1. The MN 1 determines an MCG failure recovery procedure in response to the reception of the MCG failure information. The MCG failure recovery procedure includes an inter-MN handover procedure without SN change (i.e., step 1402 to 1413). The inter-MN handover procedure without SN change includes signalling with a core network (CN) 5 for the path switch (step 1411). When the SN 2 receives a UE CONTEXT RELEASE message from the source MN 1 (step 1413), the SN 2 releases the terminal-related resources (e.g., C-plane resources with the source MN 1 related to the UE context) of the UE 3 held for MR-DC with the source MN 1.

Fourth Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a split SRB (e.g., split SRB1) has been configured between the MN 1 and the UE 3, the MN 1 performs an MN to gNB change procedure involving SN release to recover from the MCG failure.

Figure 15:
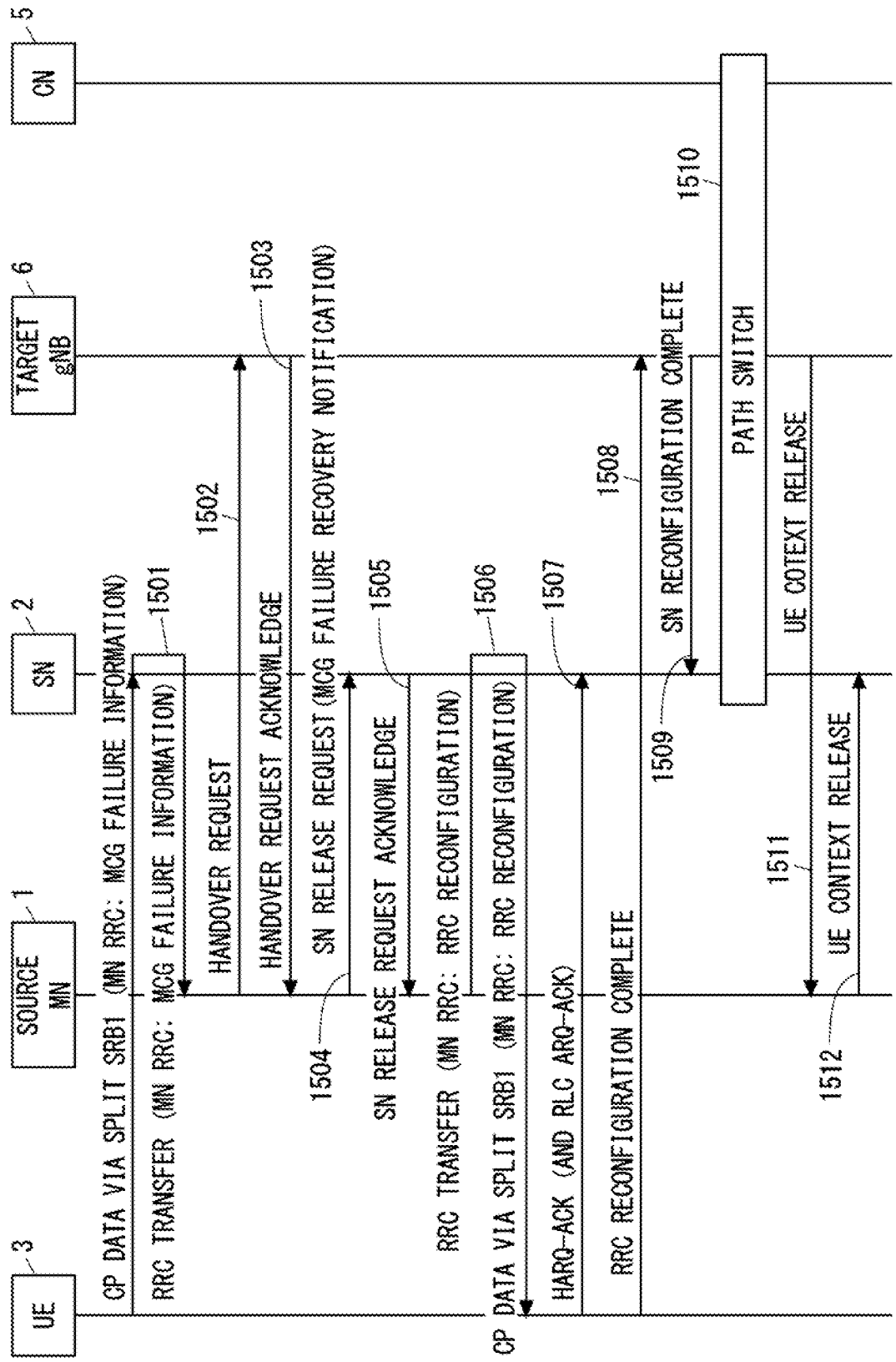
FIG. 15 is a sequence diagram showing an example of operations of an MN and an SN according to an embodiment.

FIG. 15 shows a specific example of the MN to gNB change procedure involving SN release. In step 1501 of FIG. 15, the UE 3 sends MCG failure information to the MN 1 via the SCG leg of Split SRB1. The MN 1 determines an MCG failure recovery procedure according to the reception of the MCG failure information. This MCG failure recovery procedure includes the MN to gNB change procedure involving SN release (i.e., steps 1502 to 1513).

In step 1504, the MN 1 (i.e., the source MN) sends an SN RELEASE REQUEST message to the SN 2. The SN RELEASE REQUEST message of step 1504 further includes an indication to the SN 2 that the message is associated with an MCG failure or its recovery. The indication may be referred to as, for example, MCG failure recovery notification, MCG link recovery notification, or MCG failure notification. The indication may be an IE or Cause value included in the message. In response to the receipt of the indication, the SN 2 defers the release of the configuration (or resources) in the SN 2. Specifically, the SN 2 may postpone the release of resources for a signalling connection associated with the UE 3 between the MN 1 and the SN 2. In addition, the SN 2 may defer the release of terminal information (e.g., UE context) associated with the UE 3. In addition, the SN 2 may defer the release of radio resources (e.g., SCG configuration) associated with the UE 3.

In step 1505, the SN 2 sends an SN RELEASE REQUEST ACKNOWLEDGE message to the MN 1 to confirm the request from the MN 1 for the release of SN (SCG) resources for the UE 3.

In step 1506, the MN 1 transmits an MN RRC message (e.g., RRC Reconfiguration including reconfigurationWithSync) to the UE 3 via the SCG leg of split SRB1. Step 1506 is similar to, for example, step 503 of FIG. 5 and step 1103 of FIG. 11.

In some implementations, the SN 2 may release the SN (SCG) resources for the UE 3 as requested by the SN RELEASE REQUEST message in step 1504, in response to sending the PDCP PDU (encapsulating the MN RRC message) to the UE 3 (step 1506). Alternatively, the SN 2 may release the SN (SCG) resources in response to receiving a HARQ-ACK (and RLC ARQ-ACK) from the UE 3 (step 1507). Alternatively, the SN 2 may release the SN (SCG) resources in response to receiving an SN RECONFIGURATION COMPLETE message (or MN RECONFIGURATION COMPLETE message) from a target gNB 6 (step 1509). For example, the SN 2 may perform the release of the SN (SCG) resources for the UE 3 as requested by the SN RELEASE REQUEST message in step 1504, except for the terminal information (e.g., UE context) of the UE 3.

Fifth Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a split SRB (e.g., split SRB1) has been configured between the MN 1 and the UE 3, the MN 1 performs an SN to gNB change (role change) procedure to recover from the MCG failure.

Figure 16:
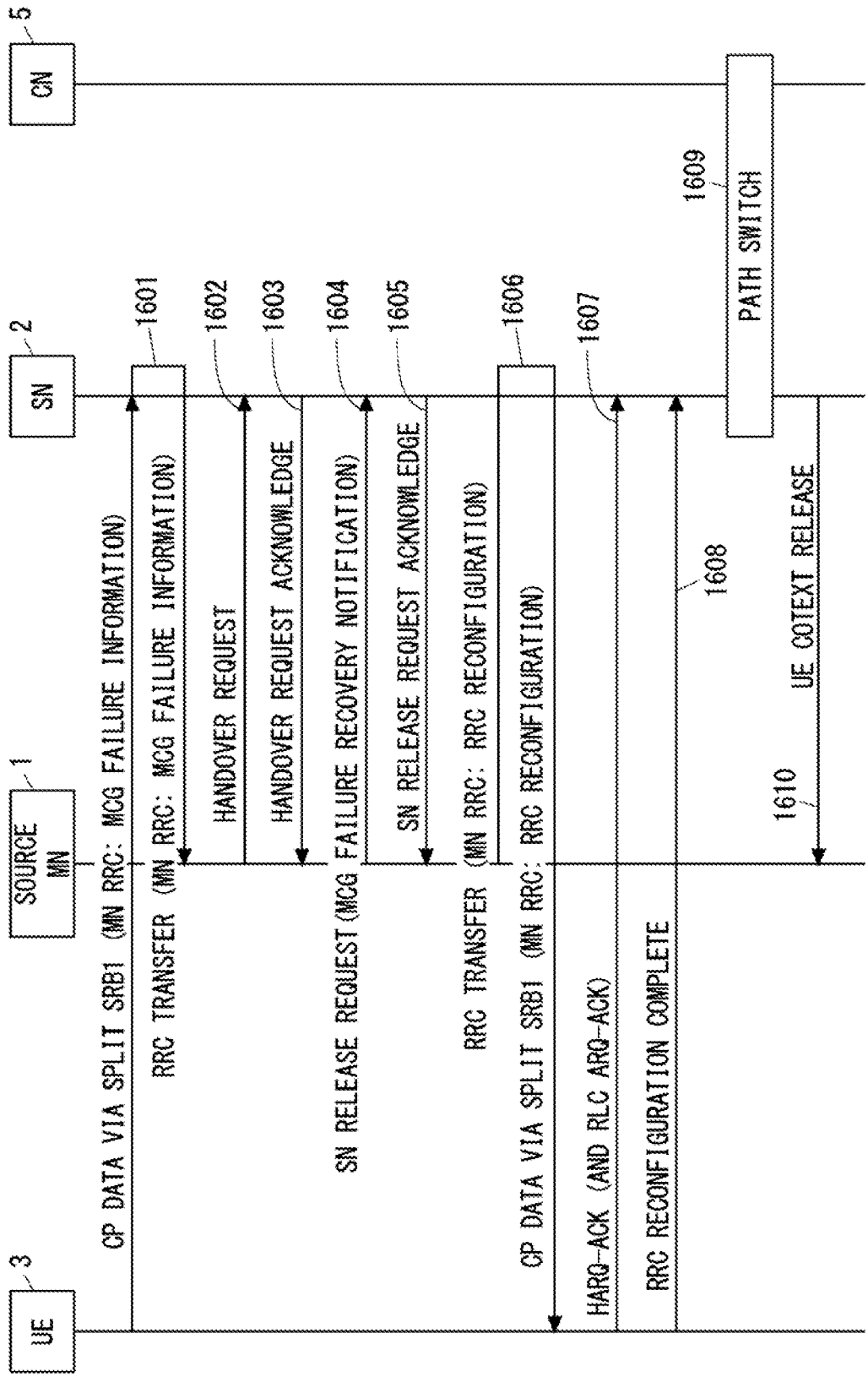
FIG. 16 is a sequence diagram showing an example of operations of an MN and an SN according to an embodiment.

FIG. 16 shows a specific example of the SN to gNB change procedure. In step 1601 of FIG. 16, the UE 3 transmits MCG failure information to the MN 1 via the SCG leg of Split SRB1. This MCG failure recovery procedure includes the SN to gNB change procedure (i.e., steps 1602 to 1610).

In step 1602, the MN 1 (i.e., the source MN) sends a HANDOVER REQUEST message to the SN 2. The HANDOVER REQUEST message in step 1602 may contain information that explicitly or implicitly indicates that the SN 2 is expected to manage the UE 3 as an MN (or in Standalone (SA)) after the handover. For example, the MN 1 may indicate this by including a UE Context Reference at the SgNB IE in the message. When the SN 2 receives this information (e.g., UE Context Reference at the SgNB IE), the SN 2 understands (or recognizes) that the SN 2 is expected (or required) to perform a handover of the UE 3 that is performing MR-DC with the MN 1 and to accept the UE 3, as a (target) MN (or in SA).

In step 1603, the SN 2 sends a HANDOVER REQUEST ACKNOWLEDGE message to the MN 1 to indicate that it accepts the handover of the UE 3. The SN 2 may include in the message a UE Context Kept Indicator IE (i.e., set to True), thereby indicating to the MN 1 that the SN 2 will manage the UE 3, as an MN (or in SA).

In step 1604, the MN 1 (i.e., the source MN) sends an SN RELEASE REQUEST message to the SN 2. The SN RELEASE REQUEST message in step 1604 may contain a UE Context Kept Indicator IE. In addition, the SN RELEASE REQUEST message includes an indication to indicate to the SN 2 that the message is associated with an MCG failure or its recovery. The indication may be referred to as, for example, MCG failure recovery notification, MCG link recovery notification, or MCG failure notification. The indication may be an IE or Cause value included in the message. In response to the receipt of the indication, the SN 2 defers the release of the configuration (or resources) in the SN 2. Specifically, the SN 2 may postpone the release of resources for a signalling connection associated with the UE 3 between the MN 1 and the SN 2. In addition, the SN 2 may defer the release of terminal information (e.g., UE context) associated with the UE 3. In addition, the SN 2 may defer the release of radio resources (e.g., SCG lower layer configuration) associated with the UE 3 for MR-DC with the source MN 1.

In step 1605, the SN 2 sends an SN RELEASE REQUEST ACKNOWLEDGE message to the MN 1 to confirm the request from the MN 1 for the SN (SCG) resource release for the UE 3.

In step 1606, the MN 1 transmits an MN RRC message (e.g., RRC Reconfiguration including reconfigurationWithSync) to the UE 3 via the SCG leg of split SRB1. Step 1606 is similar to, for example, step 503 of FIG. 5 and step 1103 of FIG. 11. Specifically, although the SN 2 is the target RAN node (MN or SA gNB) for the handover, it acts as the source SN at least until the transmission of this MN RRC message.

In some implementations, the SN 2 may release the SN (SCG) resources for the UE 3 as requested by the SN RELEASE REQUEST message in step 1604, in response to sending the PDCP PDU (encapsulating the MN RRC message) to the UE 3 (step 1606). Alternatively, the SN 2 may release the SN (SCG) resources for MR-DC with source MN 1 in response to receiving an HARQ-ACK (and RLC ARQ-ACK) from the UE 3 (step 1607).

Sixth Embodiment

A configuration example of a radio communication network according to the present embodiment is the same as the example shown in FIG. 1. This embodiment provides an improvement of an RRC TRANSFER message sent from the MN 1 to the SN 2 to transfer an MN RRC message.

Figure 17:
FIG. 17 is a sequence diagram showing an example of operations of an MN and an SN according to an embodiment.

FIG. 17 shows an example of the operations of the MN 1 and the SN 2. In step 1701, the MN 1 sends an RRC TRANSFER message to the SN 2. The MN 1 may also include, in the RRC TRANSFER message, information (e.g., Delivery Requirement IE, or Delivery Priority or Delivery Priority IE) about an MN RRC message contained in this RRC TRANSFER message. The Delivery Requirement IE indicates whether the MN RRC message should be delivered to the UE 3 or not. The Delivery Priority IE indicates whether or not the MN RRC message should be delivered to the UE 3 in priority over other messages or information.

FIG. 18 shows a specific example of the format of the RRC TRANSFER message containing the Delivery Requirement IE. In the example of FIG. 18, if the value of the Delivery Requirement IE is set to "essential", this means that the PDCP PDU (encapsulating the MN RRC message) shall be delivered to the UE 3.

Figure 19:
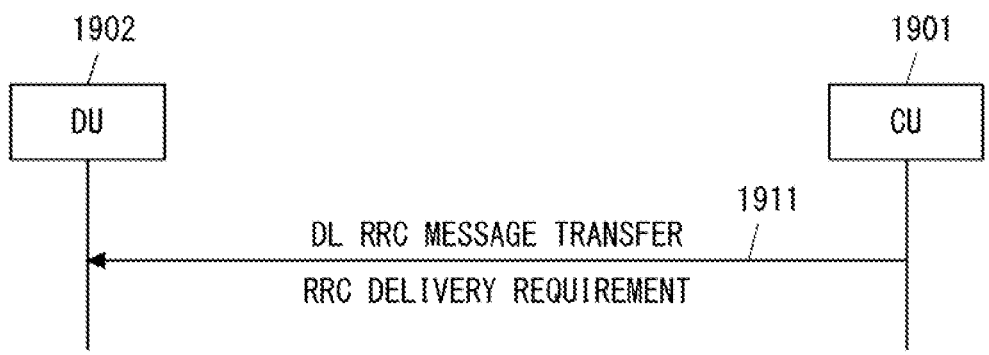
FIG. 19 is a sequence diagram showing an example of operations of a CU and a DU according to an embodiment.

The SN 2 may include a Central Unit (CU) (e.g., gNB-CU) and one or more Distributed Units (DUs) (e.g., gNB-DUs). In addition, the CU may include a Control Plane (CP) Unit (e.g., gNB-CU-CP) and one or more User Plane (UP) Units (e.g., gNB-CU-UPs). In this case, as shown in FIG. 19, the CU (or CU-CP) 1901 may include the Delivery Requirement IE into the message (F1AP: DL RRC MESSAGE TRANSFER message) to be sent to the DU 1902 to forward the RRC message to the UE 3 (step 1911).

FIG. 20 shows a specific example of the format of the DL RRC MESSAGE TRANSFER message containing a Delivery Requirement IE. In the example of FIG. 20, when the value of the Delivery Requirement IE is set to "essential", this means that the PDCP PDU (encapsulating the RRC message) shall be delivered to the UE 3.

Figure 21:
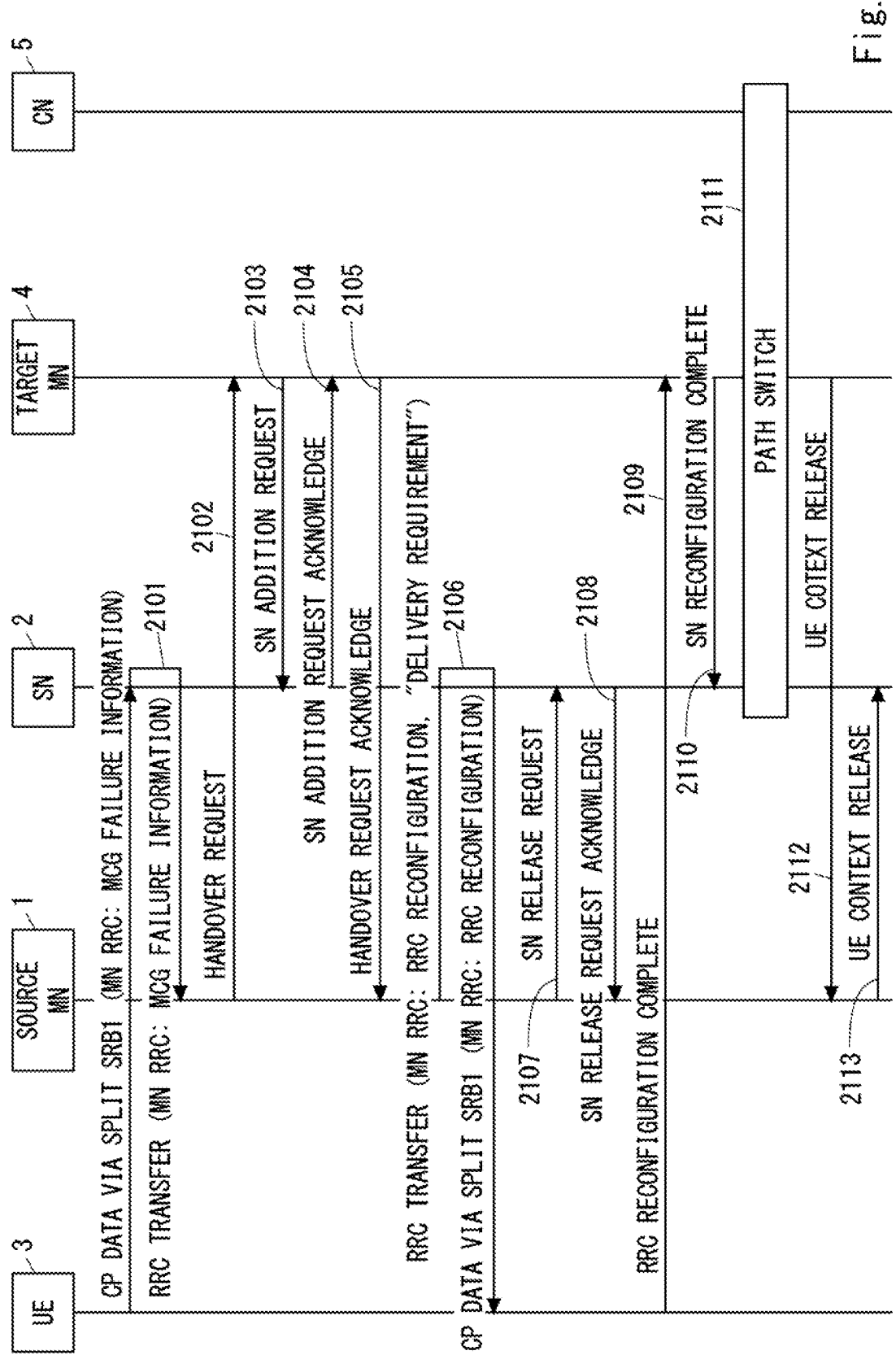
FIG. 21 is a sequence diagram showing an example of operations of an MN and an SN according to an embodiment.

FIG. 21 shows an example of the MCG recovery procedure. In the example in FIG. 21, upon detection of an MCG failure when split SRB (e.g., split SRB1) has been configured between the MN 1 and the UE 3, the MN 1 performs an inter-MN handover without SN change to recover from the MCG failure.

The procedure in FIG. 21 is similar to that in FIG. 14. However, in the procedure of FIG. 21, the RRC Transfer procedure (step 2106) takes place before the SN Release procedure (steps 2107 and 2108). In step 2106, the MN 1 transmits an MN RRC message (e.g., RRC Reconfiguration including reconfigurationWithSync) to the UE 3 via the SCG leg of split SRB1. Specifically, the MN 1 sends to the SN 2 an RRC TRANSFER message that contains a PDCP PDU encapsulating the MN RRC message. The RRC TRANSFER message indicates that the PDCP PDU shall be delivered to the UE 3. The RRC TRANSFER message may contain the Delivery Requirement IE set to "essential". On the other hand, in step 2107, the MN 1 does not have to include any indication in the SN RELEASE REQUEST message to associate it with the MCG failure or its recovery.

The procedure in FIG. 21 allows the SN 2 to, if the SN 2 has received an RRC TRANSFER message (step 2106) containing a Delivery Requirement IE set to "essential", postpone (or defer) the release of resources for the UE 3 requested by the SN RELEASE REQUEST message (step 2107) until delivery of the PDCP PDU (encapsulating the MN RRC message) to the UE 3 has been completed. If the Delivery Priority IE is used instead of the Delivery Requirement IE and the value of the IE is set to "high", the SN 2 may operate in the same manner as described above.

The procedure of FIG. 21 may be modified as follows. For example, the SN Release procedure (equivalent to steps 2107 and 2108 in FIG. 21) may be performed before the RRC Transfer procedure (equivalent to step 2106 in FIG. 21). In this case, the SN RELEASE REQUEST message does not have to contain any indication that it is associated with an MCG failure or its recovery. If the SN 2 receives the RRC TRANSFER message containing the Delivery Requirement IE after receiving the SN RELEASE REQUEST message, and the value of the IE is set to "essential", it defers the release of the configuration (or resources) in the SN 2. This allows the SN 2 to postpone (or defer) the release of resources for the UE 3 requested by the SN RELEASE REQUEST message until the delivery of the PDCP PDU (encapsulating the MN RRC message) to the UE 3 is completed.

Seventh Embodiment

A configuration example of a radio communication network according to the present embodiment is the same as the example shown in FIG. 1. This embodiment provides an improvement of inter-node messages (i.e., XnAP/X2AP messages) sent from the MN 1 to the SN 2.

As previously described, an XnAP/X2AP message requesting the SN 2 to modify or change a configuration (or resources) in the SN 2 for the UE 3 may contain an indication related to an MCG failure. This indication may be an indication of an MCG failure or an indication of recovery from an MCG failure (or recovery of an MCG link). The indication may be referred to as, for example, MCG failure recovery notification, MCG link recovery notification, or MCG failure notification. The indication may be an IE or Cause value contained in the XnAP/X2AP message. The XnAP/X2AP message may be, for example, an SN MODIFICATION REQUEST message or an SN RELEASE REQUEST message.

Additionally, or alternatively, in this embodiment, any other XnAP/X2AP message (e.g., RRC TRANSFER message or HANDOVER REQUEST message) may contain an indication related to an MCG failure. The indication may be an indication of an MCG failure or an indication of recovery from an MCG failure (or recovery of an MCG link).

Figure 22:
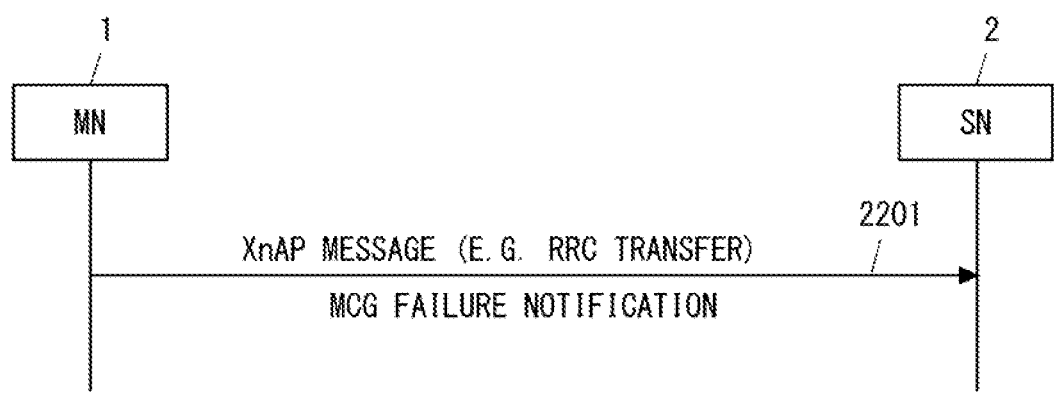
FIG. 22 is a sequence diagram showing an example of operations of an MN and an SN according to an embodiment.

In the example in FIG. 22, the MN 1 includes an indication of MCG failure (e.g., MCG Failure Notification) into an XnAP/X2AP message (e.g., RRC TRANSFER message) sent to the SN 2 (step 2201). This allows the SN 2 to know that the received XnAP/X2AP message is related to (or due to) an MCG failure or its recovery. In other words, the SN 2 can know that the received XnAP/X2AP message is associated with an MCG failure or its recovery.

Eighth Embodiment

A configuration example of a radio communication network according to the present embodiment is the same as the example shown in FIG. 1. This embodiment provides an improvement to enable notification of an MCG failure from the UE 3 to the SN 2.

In fast MCG recovery using Split SRB1, the UE 3 transmits an MN RRC message (e.g., MCG Failure Information message) indicating an MCG failure to the MN 1 via the SCG leg of Split SRB1. The RLC sublayer of the SN 2 receives a PDCP PDU encapsulating the MCG Failure Information message from the SCG RLC sublayer of the UE 3, and sends it to the PDCP sublayer of the MN 1. The RRC layer of SN 2, therefore, cannot know the occurrence of the MCG failure.

To address this issue, the UE 3 of the present embodiment works as follows. The UE 3 sends the MCG failure information to the MN 1 via the SCG leg of split SRB1. In addition, the UE 3 transmits a notification of the MCG failure to the SN 2 via direct control signalling between the SN 2 and the UE 3. This direct control signalling may be a MAC Control Element (CE) or SRB3.

Figure 23:
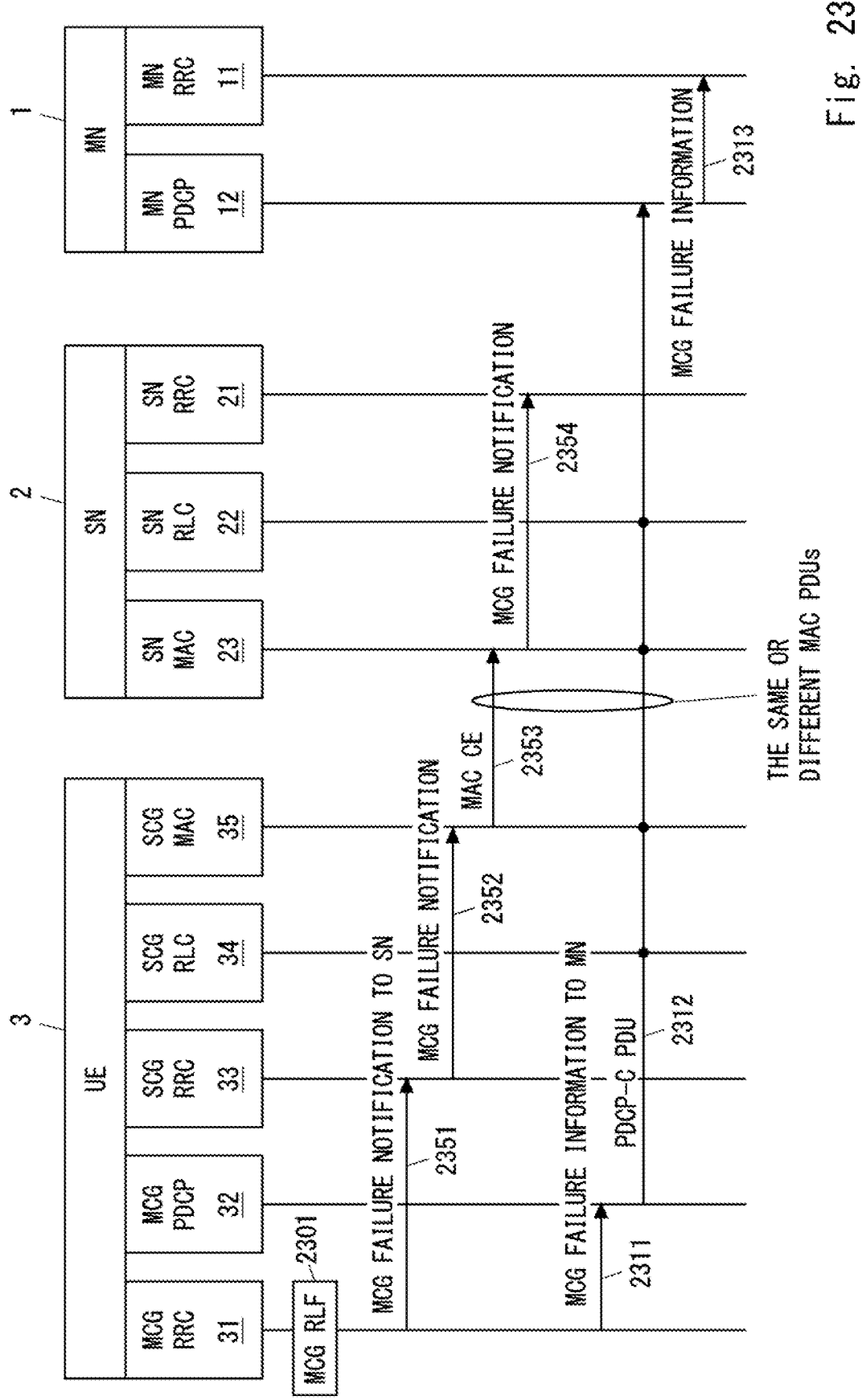
FIG. 23 is a sequence diagram showing an example of operations of a UE according to an embodiment.

FIG. 23 shows an example of the operation of the UE 3. In step 2301, the MCG RRC 31 of the UE 3 detects an MCG failure (e.g., MCG RLF). In steps 2311-2313, in response to the detection of the MCG failure, the UE 3 sends the MCG failure information to the MN 1 via the SCG leg of split SRB1. In step 2311, the MCG RRC 31 of the UE 3 generates an MN RRC: MCG Failure Information message and passes it to the MCG PDCP 32. In step 2312, the MCG PDCP 32 generates a PDCP PDU (PDCP-C PDU) encapsulating the MCG Failure Information message and sends it to the MN PDCP 12 of the MN 1 through the SCG RLC 34 of the UE 3, the SCG MAC 35 of the UE 3, the SN MAC 23 of the SN 2, and the SN RLC 22 of the SN 2. In step 2313, the MN RRC 11 of the MN 1 receives the MCG Failure Information message from the MN PDCP 12.

In addition to these, in steps 2351-2354, in response to the detection of an MCG failure, the UE 3 sends a notification of the MCG failure to the SN 2. In step 2351, the MCG RRC 31 of the UE 3 generates an MCG failure notification destined to the SN 2 and passes it to the SCG RRC 33 of the UE 3. In step 2352, the SCG RRC 33 passes the MCG failure notification to the SCG MAC 35 of the UE 3. In step 2353, the SCG MAC 35 generates a MAC CE indicating the MCG failure notification and sends it to the SN MAC 23 of the SN 2. The MAC CE may be included in the same MAC PDU as the PDCP-C PDU in step 2312, or it may be included in a MAC PDU different than that of the PDCP-C PDU. In step 2354, in response to the reception of this MAC CE, the SN MAC 23 of the SN 2 passes the MCG failure notification to the SN RRC 21 of the SN 2. This allows the UE 3 to inform the SN 2 of the MCG failure as well, even if the MCG failure information is sent to the MN 1 via the SCG leg of a split SRB. This thus allows the SN 2 to learn about the MCG failure.

In FIG. 23, for the sake of illustration, the direct control signalling procedure from the UE 3 to the SN 2 (steps 2351-2354) is illustrated as taking place before the procedure for sending the MCG failure information via the SCG leg of the Split SRB (steps 2311-2313). However, the order in which these two procedures are performed is not limited. It is sufficient that the steps within each procedure are as shown in FIG. 23, and these two procedures can be executed independently of each other. For example, steps 2351-2354 may be performed after steps 2311-2313, or in parallel with steps 2311-2313.

Ninth Embodiment

A configuration example of a radio communication network according to the present embodiment is the same as the example shown in FIG. 1. The MN 1 in this embodiment notifies the UE 3 that the primary path of uplink is the MCG (e.g., CellGroup of primaryPath is set to the MCG) when it configures a split SRB (e.g., SRB1) to the UE 3. Furthermore, the MN 1 explicitly or implicitly transmits a permission to the UE 3 in advance to switch the uplink primary path of the split SRB from the MCG to the SCG. In response to the detection of an MCG failure (e.g., MCG RLF) when the split SRB has been set and the UE has received the permission, the UE sends MCG failure information to the MN 1 via the SCG leg of the split SRB. The transmission of this MCG failure information from the UE 3 to the MN 1 corresponds to step 902 in FIG. 9, for example. After the transmission of the MCG failure information, the procedure for recovering from the MCG failure described in FIG. 5-8, etc. may be performed. On the other hand, if the UE 3 has not received the permission, it may perform an RRC (connection) re-establishment procedure. This allows the MN 1 to control the behavior of the UE 3 (i.e., transmission of MCG failure information or RRC re-establishment) when an MCG failure occurs. The permission may further specify the type of MCG failure. That is, the MN 1 may allow the UE 3 to switch the uplink primary path of the split SRB from the MCG to the SCG if the UE 3 detects one or more specific types of MCG failures. Depending on the type of MCG failure detected, the UE 3 may choose to send MCG failure information to the MN 1 via the SCG leg of the split SRB.

The switching of the uplink primary path from the MCG to the SCG may mean that the UE 3 (autonomously) switches the configuration of the uplink primary path (i.e., RRC configuration) from one for the MCG to another for the SCG. Alternatively, the switching of the uplink primary path from the MCG to the SCG may mean that the UE 3 uses the SCG uplink (i.e., SCG leg) instead of the MCG uplink (i.e., MCG leg). In other words, the UE 3 may additionally use the SCG uplink without changing the configuration of the uplink primary path.

Tenth Embodiment

A configuration example of a radio communication network according to the present embodiment is the same as the example shown in FIG. 1. In the present embodiment, the MN 1 transmits in advance to the UE 3, which is setting (or has already set) a split SRB, an instruction (or RRC configuration information) that indicates which of the RRC reconnection process (RRC (connection) re-establishment procedure) or the MCG recovery process (MCG (link) recovery procedure) should be performed when the UE 3 detects an MCG failure (e.g., MCG RLF). The MCG recovery process includes that the UE 3 transmits MCG failure information (e.g., MCG Failure Information) to the MN 1 via the SN 2 in a split SRB. This allows the MN 1 to control the behavior of the UE 3 (i.e., transmission of MCG failure information or RRC reconnection) when an MCG failure occurs.

The MN 1 may transmit information explicitly indicating the process (procedure) to be performed by the UE 3. For example, when the MN 1 transmits RRC information (e.g., MCG-FailureRecovery IE) indicating a method for restoring an MCG failure (e.g., MCG RLF) to the UE 3, the MN 1 may inform the UE 3 which process (i.e., RRC reconnection process (e.g., rr-Reestablishment) or MCG failure information transmission via the SCG leg of the split SRB (e.g., fast-MCG-recovery or MCG-failure-indication)) should be performed. When the UE 3 has been notified to transmit MCG failure information, the UE 3 transmits the MCG failure information to the MN 1 via the SCG leg of the split SRB in response to the detection of the MCG failure. The transmission of the MCG failure information from the UE 3 to the MN 1 corresponds to, for example, step 902 in FIG. 9. After the transmission of the MCG failure information, the procedure for recovery from the MCG failure described in FIGS. 5 to 8 or the like may be performed. On the other hand, when the UE 3 has been notified to perform the RRC reconnection process, it performs the RRC (connection) re-establishment procedure.

Eleventh Embodiment

A configuration example of a radio communication network according to the present embodiment is the same as the example shown in FIG. 1. The UE 3 in this embodiment switches its uplink primary path from the MCG to the SCG in response to detecting an MCG failure (e.g., MCG RLF) and sends MCG failure information (e.g., MCG Failure Information) to the MN 1 via the SCG leg of the split SRB (e.g., SRB1). At this time, the UE 3 may operate as follows. The UE 3 may trigger in the SCG a report (Buffer Status Report (BSR)) of an uplink transmission buffer status in response to the uplink primary path being switched from the MCG to the SCG. For example, when the MCG RRC entity of the UE 3 detects an MCG failure, it sends an indication to the MCG PDCP entity to switch the uplink primary path from the MCG to the SCG. The MCG MAC entity obtains the buffer amount (data volume) of the MCG failure information (and other pending transmission data), from the SCG PDCP entity and the SCG RLC entity, in order to transmit the MCG failure information in the SCG. The MCG MAC entity then transmits a report (BSR) of the transmission buffer information to the SN 2 in the SCG via the MCG PHY.

The SN 2 may transmit an uplink (UL) grant to the UE 3 in response to the reception of the BSR. In response to receiving the UL grant, the UE 3 may transmit an MN RRC message containing the MCG fault information to the MN 1 in the SCG leg of split SRB1. The transmission of the MCG failure information from the UE 3 to the MN 1 corresponds to, for example, step 902 in FIG. 9. After the transmission of the MCG failure information to the MN 1, the procedure for recovery from the MCG failure described in FIGS. 5 to 8 or the like may be performed.

Additionally, or alternatively, in response to the detection of an MCG failure (e.g., MCG RLF), the UE 3 may switch the primary path of each of one or more split DRBs (MN terminated bearers), which are terminated by the MN 1 and whose uplink primary paths have been set to the MCG, to the SCG. Additionally, or alternatively, in response to the detection of an MCG failure (e.g., MCG RLF), the UE 3 may switch the primary path of each of one or more split DRBs (SN terminated bearers), that are terminated by the SN 2 and whose primary uplink paths have been set to the MCG, to the SCG. The UE 3 may perform such control over split DRBs in the same manner as the control over split SRBs described above. Specifically, if the UE 3 is instructed (or permitted) to switch the uplink primary path of the split SRB from the MCG to the SCG, the UE 3 may consider that it is also instructed (or permitted) to switch the uplink primary path of the split DRB from the MCG to the SCG. Alternatively, the MN 1 may inform the UE 3 in advance, either explicitly or implicitly, whether or not switching of the primary path for the split DRB is permitted to the UE 3. The MN 1 may inform the UE 3 on a per DRB basis whether or not switching of the primary path is permitted to the UE 3.

Twelfth Embodiment

This embodiment provides a specific example of the operations of the MN 1 and the SN 2 described in the first embodiment. A configuration example of a radio communication network according to the present embodiment is the same as the example shown in FIG. 1. In this embodiment, a direct SRB (i.e., SRB3) is configured between the SN 2 and the UE 3. In this case, upon detection of an MCG failure, the MN 1 performs intra-MN handover without SN change to recover from the MCG failure.

Figure 24:
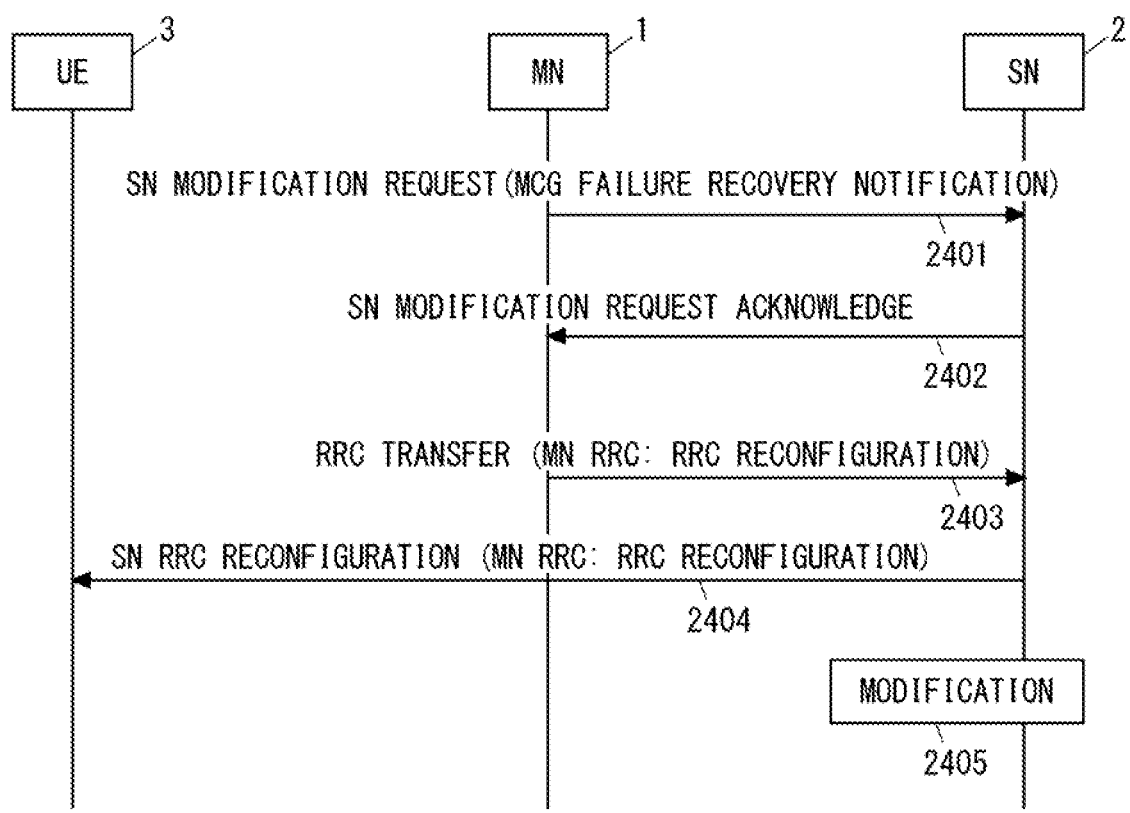
FIG. 24 is a sequence diagram showing an example of operations of an MN and an SN according to an embodiment.

FIG. 24 shows an example of signalling of the MN 1 and the SN 2 performed in an intra-MN handover procedure without SN change. In step 2401, the MN 1 sends an SN MODIFICATION REQUEST message to the SN 2. The SN MODIFICATION REQUEST message requests the SN 2 to modify (or update) a configuration or resources associated with the UE 3 in the SN 2. For example, the message may indicate information about a new security key in order to request a modification (or update) of a security key (e.g., SgNB Security Key) applied to an SN terminated bearer terminated in the SN 2.

The SN MODIFICATION REQUEST message of step 2401 further includes an indication to the SN 2 that the message is associated with an MCG failure or its recovery. This indication may be referred to as, for example, MCG failure recovery notification, MCG link recovery notification, or MCG failure notification. The indication may be an IE or Cause value that is contained in the message. Alternatively, the Cause value may be, for example, MCG Radio Connection With UE Lost, or MCG RLF. In response to the receipt of the indication, the SN 2 defers the modification of the configuration (or resources) in the SN 2.

In step 2402, the SN 2 sends an SN MODIFICATION REQUEST ACKNOWLEDGE message to the MN 1 to confirm the request from the MN 1 for the SN (or SCG) resource modification for the UE 3. The message may contain a CG-Config message generated by the SN 2. The CG-Config message contains the SCG radio configuration (e.g., one or both of scg-CellGroupConfig and scg-RB-Config) generated by the SN 2 based on the SN MODIFICATION REQUEST message of step 501.

In steps 2403 and 2404, the MN 1 transmits an MN RRC message (e.g., RRC Reconfiguration including reconfigurationWithSync) to the UE 3 via SRB3. Specifically, in step 2403, the MN 1 sends an RRC TRANSFER message to the SN 2 containing the MN RRC message (or containing an inter-RAN Node message between the MN 1 and the SN 2 containing the MN RRC message). In step 2404, the SN 2 generates an SN RRC Reconfiguration message containing the MN RRC message (or at least a part of the inter-RAN Node message between the MN 1 and the SN 2 containing the MN RRC message) and transmits it to the UE 3 via SRB3. At this time, the SN 2 encrypts the SN RRC Reconfiguration message with the security key (e.g., S-KgNB) for bearers of the SN 2.

The SCG RRC entity of the UE 3 decodes the SN RRC Reconfiguration message, extracts the MN RRC message, and passes it to the MCG RRC entity of the UE 3. When the UE 3 receives the MN RRC message, it performs an intra-MN handover without SN change according to the RRC configuration information (e.g., one or both of securityConfig (HO) and sk-Counter) contained in the MN RRC message. The MN RRC message may contain an SN RRC message (or SN RRC configuration) for the intra-MN handover without SN change. In this case, the MCG RRC entity of the UE 3 passes the SN RRC message to the SCG RRC entity of the UE 3. The UE 3 performs the intra-MN handover without SN change according to the MN RRC message and the SN RRC message.

In step 2405, after transmitting the SN RRC Reconfiguration message to the UE 3, which contains the MN RRC message (or at least a part of the inter-RAN node message between the MN 1 and the SN 2 containing the MN RRC message), the SN 2 performs the SN (SCG) resource (e.g., configuration or resource in SN 2) modification (or update) for the UE 3 requested by the SN MODIFICATION REQUEST message in step 2401. The SN 2 may modify (or update) the SN (SCG) resources in response to transmitting the SN RRC Reconfiguration message to the UE 3. That is, in the example of FIG. 24, the MN-initiated SN Modification Preparation procedure interacts with the RRC Transfer procedure (or SN RRC reconfiguration procedure). In other words, the MN-initiated SN Modification Preparation procedure is associated with the RRC Transfer procedure (or SN RRC reconfiguration procedure). In some implementations, if the SN 2 further receives an RRC TRANSFER message after (e.g., right after) receiving an SN MODIFICATION REQUEST message from the MN 1, and if it contains an MN RRC message to be sent in SRB3 (or an inter-RAN node message between the MN 1 and the SN 2 containing the MN RRC message), the SN 2 performs the transmission of the MN RRC message (or at least a part of the inter-RAN node message between the MN 1 and the SN 2 containing the MN RRC message) to the UE 3 with priority over the SN Modification Preparation procedure.

Figure 25:
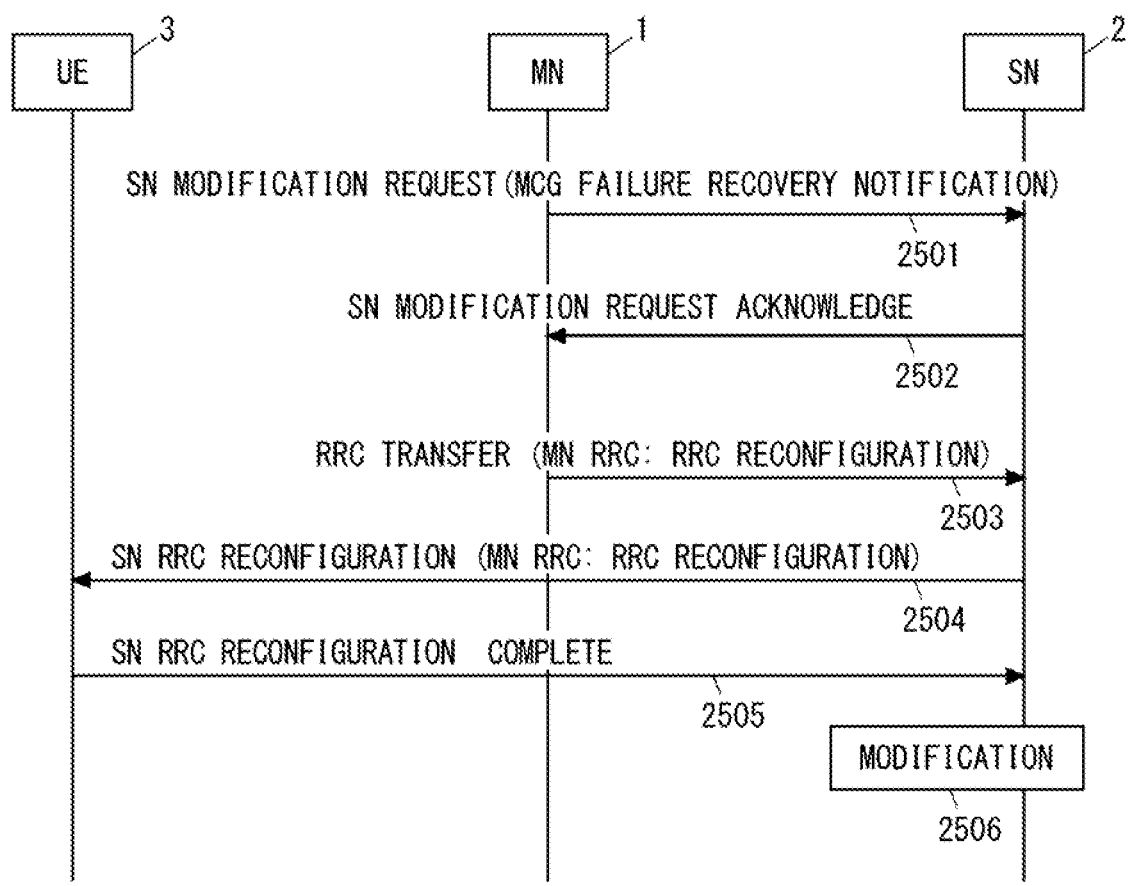
FIG. 25 is a sequence diagram showing an example of operations of an MN and an SN according to an embodiment.

FIG. 25 shows a modified example of the procedure shown in FIG. 24. The operations of the MN 1 and the SN 2 in steps 2501 to 2504 are similar to those in steps 2401 to 2404. In step 2505, the SN 2 receives an SN RRC Reconfiguration Complete message from the UE 3.

In step 2506, after receiving the SN RRC Reconfiguration Complete message from the UE 3, the SN 2 performs the SN (SCG) resource modification (or update) for the UE 3 that was requested by the SN MODIFICATION REQUEST message in step 2501. The SN 2 may modify (update) the SN (SCG) resource in response to receiving the SN RRC Reconfiguration Complete message from the UE 3. That is, in the example of FIG. 25, the MN-initiated SN Modification Preparation procedure interacts with the RRC Transfer procedure (or SN RRC reconfiguration procedure). In other words, the MN-initiated SN Modification Preparation procedure is associated with the RRC Transfer procedure (or SN RRC reconfiguration procedure). In some implementations, if the SN 2 further receives an RRC TRANSFER message after (e.g., right after) receiving an SN MODIFICATION REQUEST message from the MN 1, and if it contains an MN RRC message to be sent in SRB3 (or an inter-RAN node message between the MN 1 and the SN 2 containing the MN RRC message), the SN 2 performs the transmission of the MN RRC message (or at least a part of the inter-RAN node message between the MN 1 and the SN 2 containing the MN RRC message) to the UE 3 in preference to the SN Modification Preparation procedure.

Figure 26:
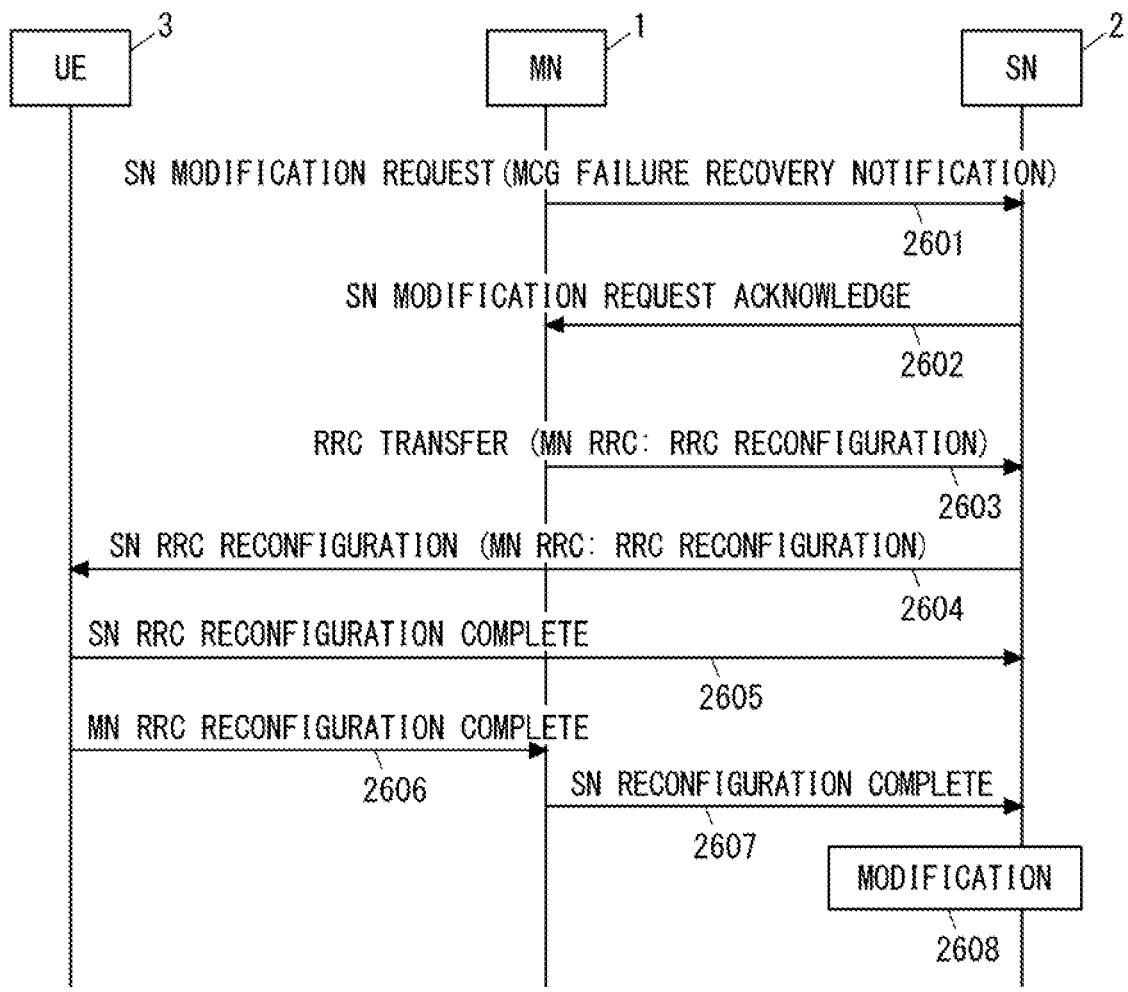
FIG. 26 is a sequence diagram showing an example of operations of an MN and an SN according to an embodiment.

FIG. 26 shows a different modified example of the procedure shown in FIG. 24. Steps 2601 to 2605 are similar to steps 2501 to 2505 in FIG. 25.

In step 2606, the UE 3 transmits an RRC Reconfiguration Complete message to the MN 1 via a new PCell indicated by the SpCellConfig IE (servCellIndex of the SpCellConfig) that contains the ReconfigurationWithSync IE. If a MobilityControlInfo IE is used instead of the ReconfigurationWithSync IE, the new PCell may be specified by a targetPhysCellId that is contained in this IE. In step 2607, the MN 1 sends a SN RECONFIGURATION COMPLETE message to the SN 2. The SN RECONFIGURATION COMPLETE message indicates that the UE 3 has successfully applied the SCG radio configuration (e.g., one or both of scg-CellGroupConfig and scg-RB-Config) that was included in the SN MODIFICATION REQUEST ACKNOWLEDGE message in step 2602.

In step 2608, after receiving the SN RECONFIGURATION COMPLETE message from the MN 1, the SN 2 performs the SN (SCG) resource modification (or update) for the UE 3 requested by the SN MODIFICATION REQUEST message in step 2601. The SN 2 may modify (or update) its SN (SCG) resources in response to the receipt of the SN RECONFIGURATION COMPLETE message. That is, in the example in FIG. 26, the MN-initiated SN Modification Preparation procedure interacts with the SN Reconfiguration Complete procedure. In other words, the MN-initiated SN Modification Preparation procedure is associated with the SN Reconfiguration Complete procedure.

In some implementations, if the SN 2 accepts (or admits) a terminal information (e.g., UE context) modification (i.e., SN MODIFICATION REQUEST) for which the MN 1 needs to be reported on the success of an RRC reconfiguration procedure, the SN 2 may start a timer (e.g., $T_{DCoverall}$, $TXn_{DCoverall}$) when it sends an SN MODIFICATION REQUEST ACKNOWLEDGE message to the MN 1. The SN 2 may then stop the timer upon receiving an SN RECONFIGURATION COMPLETE message. Furthermore, if the SN 2 further receives an RRC TRANSFER message after (e.g., right after) receiving the SN MODIFICATION REQUEST message from the MN 1, and if it contains an MN RRC message to be sent in SRB3 (or an inter-RAN node message between the MN 1 and the SN 2 containing the MN RRC message), the SN 2 prioritizes the transmission of the MN RRC message (or at least a part of the inter-RAN node message between the MN 1 and the SN 2 containing the MN RRC message) to the UE 3 over the SN Modification Preparation procedure. That is, the SN 2 does not modify (or update) the terminal information (i.e., SN (SCG) resources) at least until it receives the SN RECONFIGURATION COMPLETE message.

FIG. 27 shows a specific example of the format of the improved RRC TRANSFER message for sending an MN RRC message over SRB3. The RRC TRANSFER message in FIG. 27 can contain an RRC Container IE that contains the MN RRC message (or an inter-RAN node message between the MN 1 and the SN 2 containing it). The RRC Container IE may be a sub IE of a newly defined IE (e.g., MN SRB IE) in the RRC TRANSFER message. In some implementations, if the SN 2 receives the RRC Container IE in the MN SRB IE, it will definitely send to the UE 3 the MN RRC message (or at least a part of the inter-RAN node message between the MN 1 and SN 2 containing the message) contained in the RRC Container IE. If the RRC TRANSFER message received from the MN 1 contains an MN SRB IE (in response to detecting it), the SN 2 may operate to send the RRC message contained in the MN SRB IE in SRB3.

Similar to the example in FIG. 18, the MN SRB IE shown in FIG. 27 may include a Delivery Requirement IE. The Delivery Requirement IE indicates whether or not the MN RRC message (or at least a part of the inter-RAN node message between the MN 1 and the SN 2 containing the MN RRC message) should definitely be delivered to the UE 3. Alternatively, the Delivery Priority IE indicates whether or not the MN RRC message (or at least a part of the inter-RAN node message between the MN 1 and the SN 2 containing the MN RRC message) should be delivered to the UE 3 in priority over other messages or information. For example, if the value of Delivery Requirement IE is set to "essential", this means that the MN RRC message (or at least a part of the inter-RAN node message between the MN 1 and the SN 2 that contains the MN RRC message) must be delivered to the UE 3.

Figure 28:
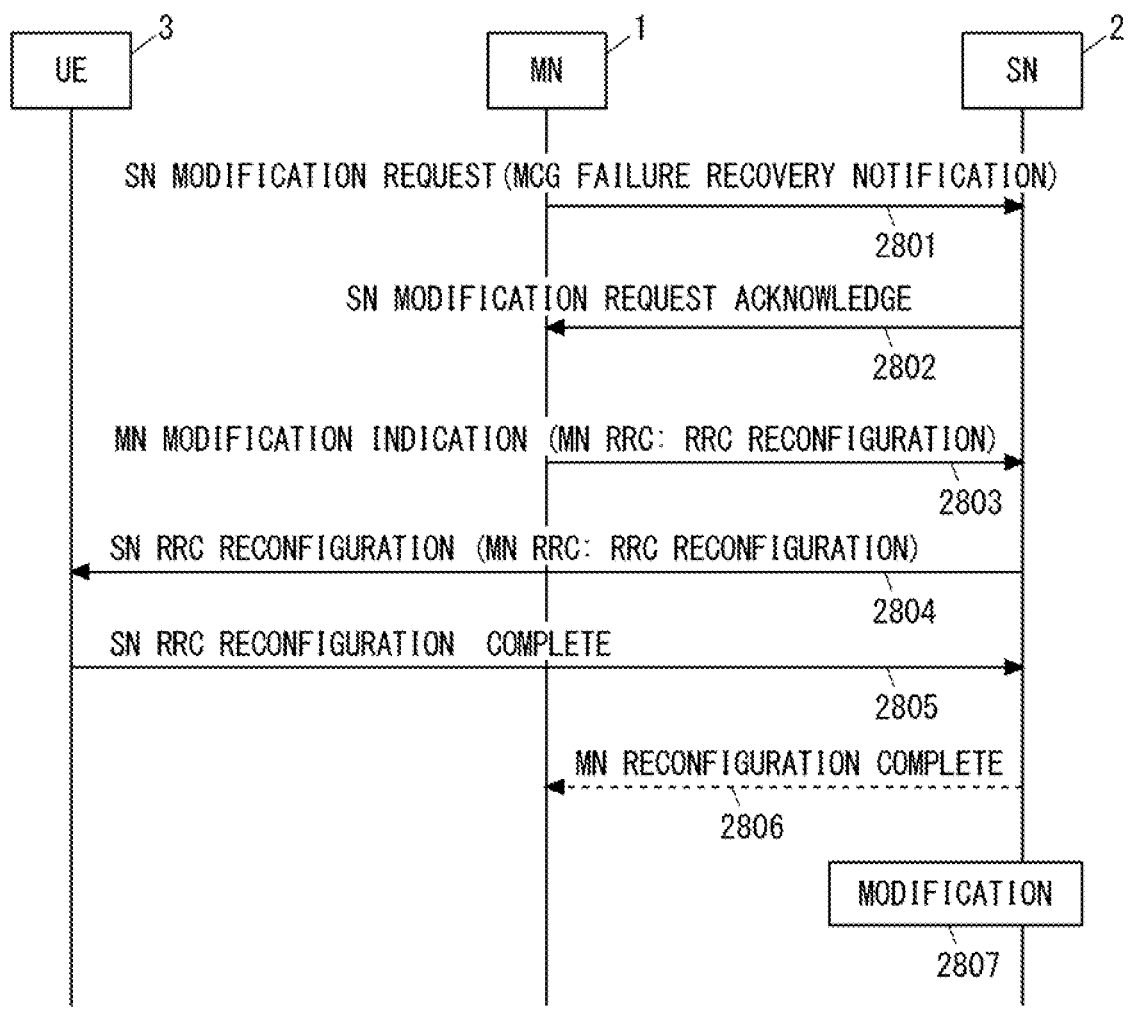
FIG. 28 is a sequence diagram showing an example of operations of an MN and an SN according to an embodiment.

A new XnAP/X2AP message, which is different from the RRC TRANSFER message, may be defined for transmitting an MN RRC message via SRB3. FIG. 28 shows another variation of the procedure shown in FIG. 24. Steps 2801 and 2802 are similar to steps 2401 and 2402 in FIG. 24.

In the example in FIG. 28, the MN 1 sends an MN MODIFICATION INDICATION message to the SN 2 to send an MN RRC message to the UE 3 via SRB3 (step 2803). The SN 2 transmits an SN RRC message (e.g., RRC Reconfiguration) containing the requested MN RRC message to the UE 3 (step 2804) and receives an SN RRC Reconfiguration Complete message from the UE 3 (step 2805). The SN 2 may send a reply message (e.g., MN RECONFIGURATION COMPLETE message or MN MODIFICATION COMPLETE message) to the MN 1 (step 2806) in response to the MN MODIFICATION INDICATION message. For example, the SN 2 may send an MN RECONFIGURATION COMPLETE message to the MN 1 in response to receiving the SN RRC Reconfiguration Complete message from the UE 3.

In step 2807, after receiving the SN RRC Reconfiguration Complete message from the UE 3, the SN 2 performs the SN (SCG) resource modification (or update) for the UE 3 that was requested by the SN MODIFICATION REQUEST message in step 2801. The SN 2 may modify (or update) the SN (SCG) resources after sending the MN RECONFIGURATION COMPLETE message to the MN 1.

FIG. 29 shows a specific example of the format of the MN MODIFICATION INDICATION message. In the example of FIG. 29, the MN MODIFICATION INDICATION message contains an M-NG-RAN node to S-NG-RAN node Container IE. The IE contains a CG-ConfigInfo message.

This CG-ConfigInfo message indicates an MN RRC message (e.g., RRC (Connection) Reconfiguration message). The CG-ConfigInfo message shown in FIG. 30 can include a sourceConfigMCG field 3001, where the sourceConfigMCG field 3001 contains the MN RRC message (e.g., RRC (Connection) Reconfiguration message). If the MN 1 and the SN 2 use different radio access technologies (RATs) (e.g., in the case of EN-DC), the sourceConfigMCG field 3001 may transparently contain the RRC message of the source RAT (i.e., the MN RRC message). In other words, the SN 2 may forward the information in the sourceConfigMCG field 3001 to the UE 3 without parsing or recognizing it. On the other hand, if the MN 1 and the SN 2 use the same RAT or the same kind of PDCP (e.g., NR PDCP) (e.g., in the case of NR-DC or NGEN-DC), the sourceConfigMCG field 3001 may explicitly include the RRC message of the source RAT.

Figure 31:
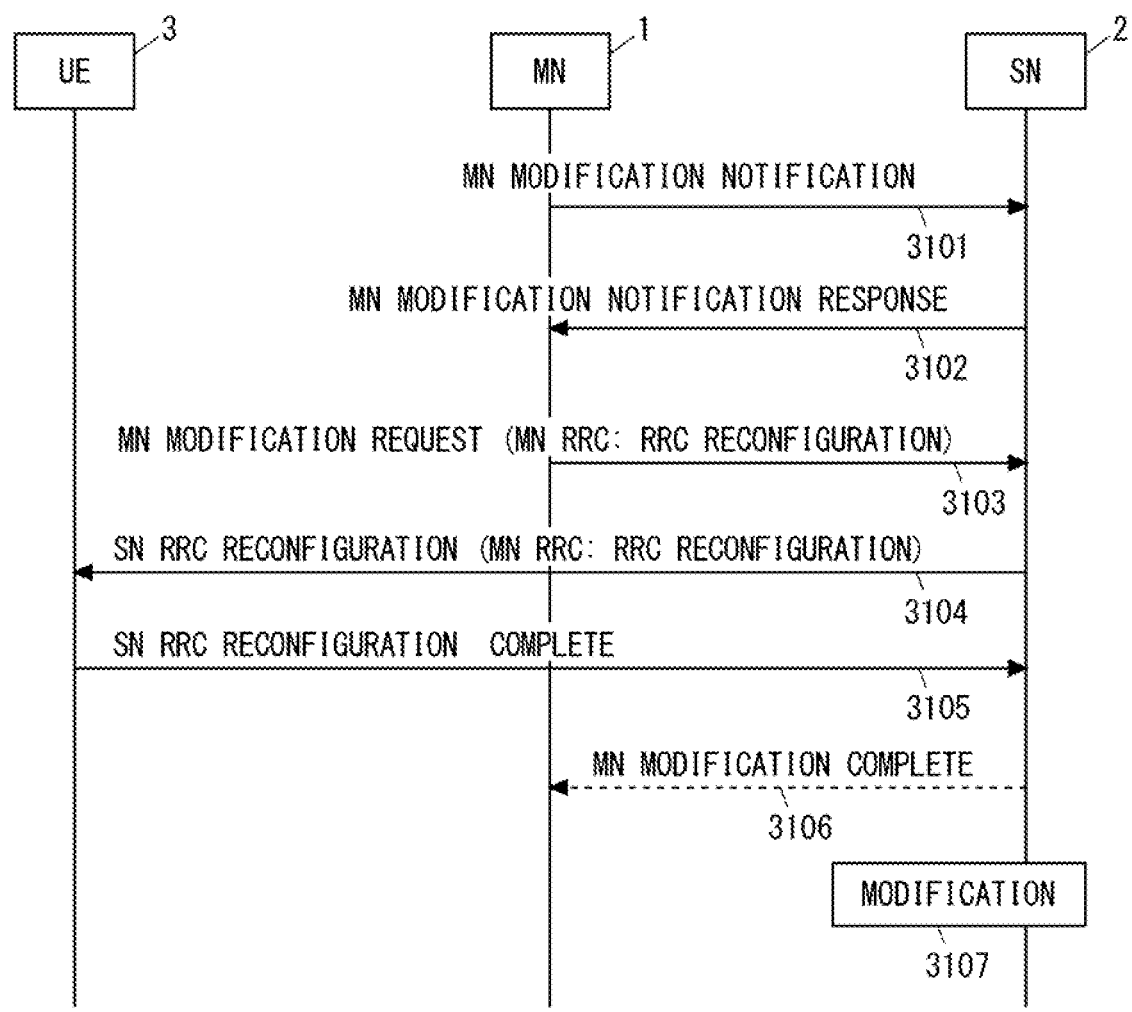
FIG. 31 is a sequence diagram showing an example of operations of an MN and an SN according to an embodiment.

FIG. 31 shows a modified example of the procedure shown in FIG. 28. In the example in FIG. 31, MN MODIFICATION NOTIFICATION/RESPONSE messages (steps 3101 and 3102) are used instead of the SN MODIFICATION REQUEST/ACKNOWLEDGE messages. In the example in FIG. 31, the MN 1 sends an MN MODIFICATION NOTIFICATION message to the SN 2 (step 3101). The MN MODIFICATION NOTIFICATION message indicates to the SN 2 that a modification (or change or reconfiguration) of the SCG associated with the MCG modification (or change or reconfiguration) is required. Similar to the SN MODIFICATION REQUEST message, the MN MODIFICATION NOTIFICATION message requests the SN 2 to modify (or update) the configuration or resources for the UE 3 in the SN 2. The MN MODIFICATION NOTIFICATION message may include an indication to the SN 2 that the message is associated with an MCG failure or its recovery. Alternatively, the transmission of the MN MODIFICATION NOTIFICATION message itself may be associated with an MCG failure or its recovery (i.e., it may imply an MCG failure or its recovery). In other words, the MN MODIFICATION NOTIFICATION message is sent to recover from an MCG failure, and the SN 2 may recognize by receiving (in response to receiving) the message that the MN 1 is trying to recover from an MCG failure.

In step 3102, the SN 2 sends an MN MODIFICATION NOTIFICATION RESPONSE message to the MN 1 to confirm the request from the MN 1 for the SN (SCG) resource modification for the UE 3. This message may contain a CG-Config message generated by the SN 2 in the same way as the SN MODIFICATION REQUEST ACKNOWLEDGE message.

In step 3103, the MN 1 sends an MN MODIFICATION INDICATION message to the SN 2 in order to send an MN RRC message (e.g., RRC Reconfiguration including reconfigurationWithSync) to the UE 3 via SRB3.

Steps 3104 to 3105 are similar to steps 2804 to 2805 of FIG. 28. Upon receiving an SN RRC Reconfiguration Complete message from the UE 3, the SN 2 may send an MN MODIFICATION COMPLETE message to the MN 1 (step 3106). The MN MODIFICATION COMPLETE message may be called an MN RECONFIGURATION COMPLETE message. In step 3107, similar to step 2807 in FIG. 28, the SN 2 performs the modification (or update) of the SN (SCG) resources for the UE 3 as requested by the MN MODIFICATION NOTIFICATION message in step 3101.

The MN MODIFICATION NOTIFICATION, MN MODIFICATION NOTIFICATION RESPONSE and MN MODIFICATION REQUEST messages in steps 3101, 3102 and 3103 (and the MN MODIFICATION COMPLETE message in step 3106) may be specified as a single (combined) procedure. In this procedure, these actions may be performed as a series of actions (i.e., in conjunction with each other). The procedure may be called, for example, an MN MODIFICATION preparation procedure or an MN RECOVERY preparation procedure.

Figure 32:
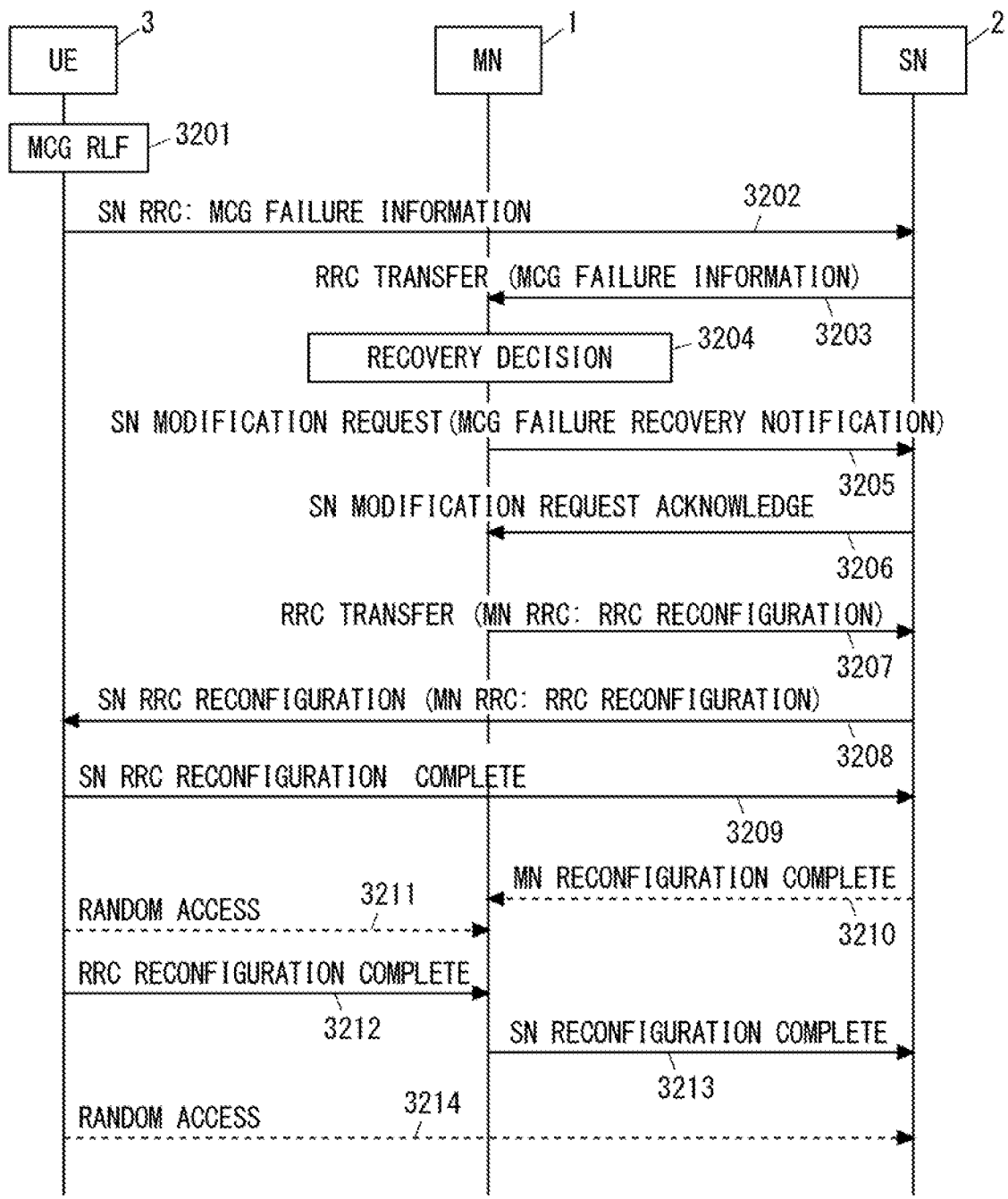
FIG. 32 is a sequence diagram showing an example of operations of an MN and an SN according to an embodiment.

FIG. 32 shows a specific example of the procedures shown in FIGS. 24 to 26. Steps 3205 to 3208 of FIG. 32 correspond to steps 2401 to 2404 of FIG. 24, steps 2501 to 2504 of FIG. 25, and steps 2601 to 2604 of FIG. 26. Step 3209 of FIG. 32 corresponds to step 2505 of FIG. 25 and step 2605 of FIG. 26. Steps 3212 and 3213 of FIG. 32 correspond to steps 2606 and 2607 of FIG. 26.

In step 3201 of FIG. 32, the UE 3 detects an MCG failure (e.g., MCG RLF). In step 3202, the UE 3 transmits MCG failure information to the SN 2 via SRB3. In step 3203, the SN 2 forwards the MCG failure information to the MN 1. An RRC TRANSFER message may be used to transfer the MCG failure information from the SN 2 to the MN 1. In step 3204, the MN 1 determines an MCG failure recovery procedure in response to receiving the MCG failure information. This MCG failure recovery procedure includes an intra-MN handover procedure without SN change (i.e., steps 3205-3214).

In the example of FIG. 32, the RRC TRANSFER message (step 3207) may be replaced by an MN MODIFICATION INDICATION message (step 2803) or an MN MODIFICATION REQUEST message (step 3103). In this case, the SN 2 may send an MN RECONFIGURATION COMPLETE message (or an MN MODIFICATION COMPLETE message) to the MN 1 (step 3210).

Thirteenth Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a direct SRB (e.g., SRB3) has been configured between the SN 2 and the UE 3, the MN 1 performs an inter-MN handover without SN change to recover from the MCG failure.

Figure 33:
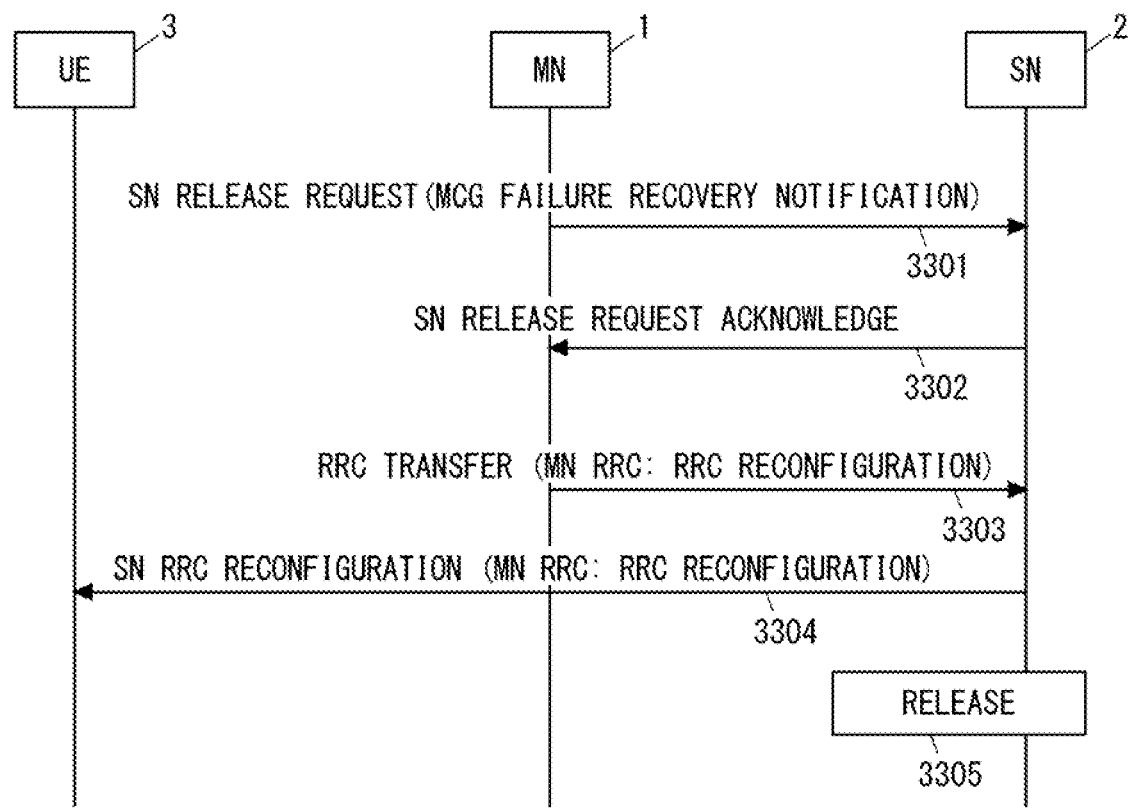
FIG. 33 is a sequence diagram showing an example of operations of an MN and an SN according to an embodiment.

FIG. 33 shows an example of signaling of the MN 1 and the SN 2 performed in an inter-MN handover procedure without SN change. Steps 3301 and 3302 are similar to steps 1101 and 1102 of FIG. 11. Specifically, in step 3301, the MN 1 sends an SN RELEASE REQUEST message to the SN 2. The MN 1 includes in the SN RELEASE REQUEST message a UE Context Kept Indicator IE set to "True" to indicate to the SN 2 that the UE context in the SN 2 is to be maintained (kept).

The SN RELEASE REQUEST message in step 3301 further includes an additional indication to indicate to the SN 2 that the message is associated with an MCG failure or its recovery. The additional indication may be referred to as, for example, MCG failure recovery notification, MCG link recovery notification, or MCG failure notification. The indication may be an IE or Cause value that is contained in the message. In response to receiving the additional indication, the SN 2 defers the release of a configuration (or resources) within the SN 2. Specifically, the SN 2 may postpone the release of resources for a signaling connection associated with the UE 3 between the MN 1 and the SN 2. Additionally, or alternatively, the SN 2 may defer the release of radio resources allocated to the UE 3.

In step 3302, the SN 2 sends an SN RELEASE REQUEST ACKNOWLEDGE message to the MN 1 in order to confirm the request from the MN 1 for releasing the SN (SCG) resources for the UE 3.

In steps 3303 and 3304, the MN 1 transmits an MN RRC message (e.g., RRC Reconfiguration including reconfigurationWithSync) to the UE 3 via SRB3. Steps 3303 and 3304 are similar to steps 2403 and 2404 in FIG. 24.

In step 3305, after transmitting the MN RRC message (or at least a part of the inter-RAN node message between the MN 1 and the SN 2 containing it) to the UE 3, the SN 2 performs the release of the SN (SCG) resources for the UE 3 as requested by the SN RELEASE REQUEST message in step 3301. The SN 2 may release the SN (SCG) resources in response to transmitting the MN RRC message (or at least a part of the inter-RAN node message between the MN 1 and the SN 2 containing it) to the UE 3. That is, in the example of FIG. 33, the MN-initiated SN Release procedure interacts with the RRC Transfer procedure (or SN RRC reconfiguration procedure). In other words, the MN-initiated SN Release procedure is associated with the RRC Transfer procedure (or SN RRC reconfiguration procedure). In some implementations, if the SN 2 further receives an RRC TRANSFER message after (e.g., right after) receiving an SN RELEASE REQUEST message from the MN 1, and it contains an MN RRC message to be sent to the UE 3 (or an inter-RAN node message between the MN 1 and the SN 2 containing the MN RRC message), the SN 2 performs the transmission of the MN RRC message (or at least a part of the inter-RAN node message between the MN 1 and the SN 2 that contains it) to the UE 3 in priority to the SN Release procedure.

Figure 34:
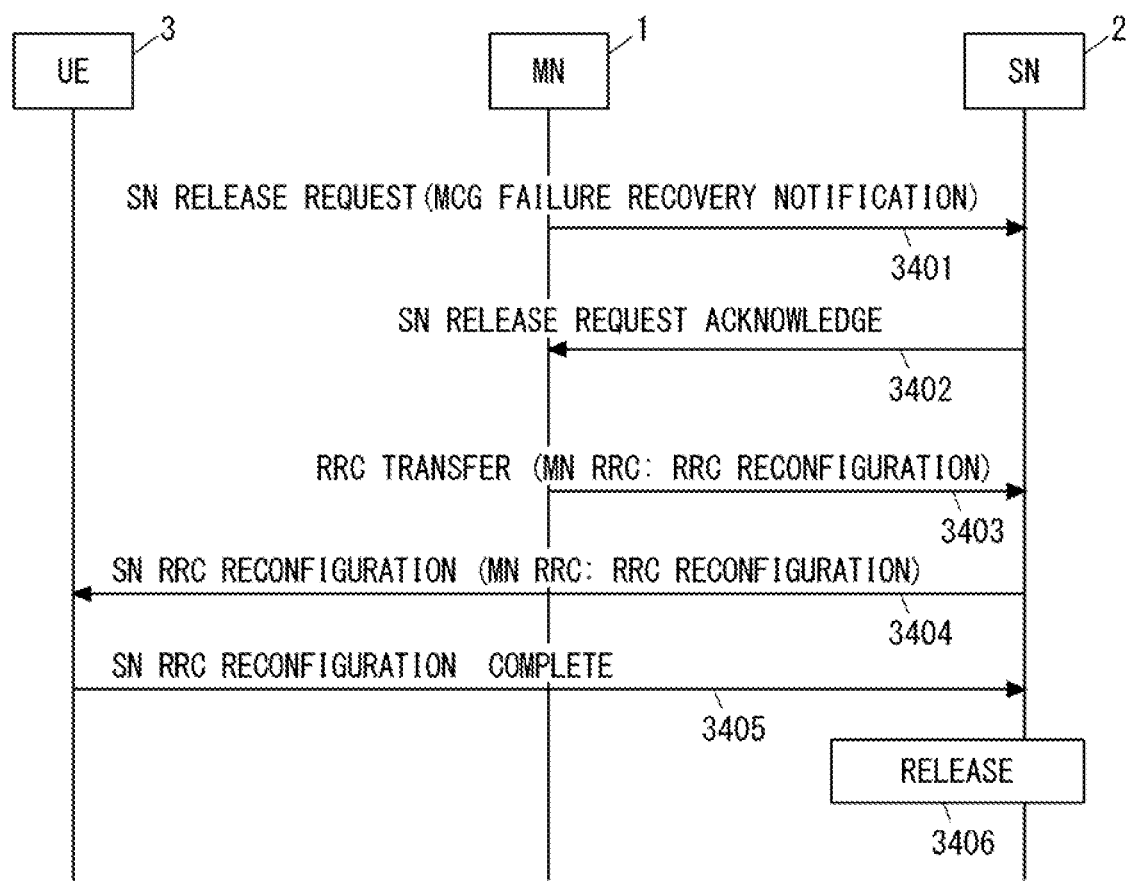
FIG. 34 is a sequence diagram showing an example of operations of an MN and an SN according to an embodiment.

FIG. 34 shows a variant of the procedure shown in FIG. 33. The operations of the MN 1 and the SN 2 in steps 3401 to 3404 are similar to those in steps 3301 to 3304. In step 3405, the SN 2 receives the SN RRC Reconfiguration Complete message from the UE 3.

In step 3406, after receiving the SN RRC Reconfiguration Complete message from the UE 3, the SN 2 performs the release of the SN (SCG) resources for the UE 3 as requested by the SN RELEASE REQUEST message in step 3501. The SN 2 may release the SN (SCG) resources in response to receiving the SN RRC Reconfiguration Complete message from the UE 3. That is, in the example of FIG. 34, the MN-initiated SN Release procedure interacts with the RRC Transfer procedure (or SN RRC reconfiguration procedure). In other words, the MN-initiated SN Release procedure is associated with the RRC Transfer procedure (or SN RRC reconfiguration procedure). In some implementations, if the SN 2 further receives an RRC TRANSFER message after (e.g., right after) receiving an SN RELEASE REQUEST message from the MN 1, and it contains an MN RRC message to be sent to the UE 3 (or an inter-RAN node message between the MN 1 and the SN 2 containing the MN RRC message), the SN 2 performs the transmission of the MN RRC message (or at least a part of the inter-RAN node message between the MN 1 and the SN 2 that contains it) to the UE 3 in priority to the SN Release procedure.

Figure 35:
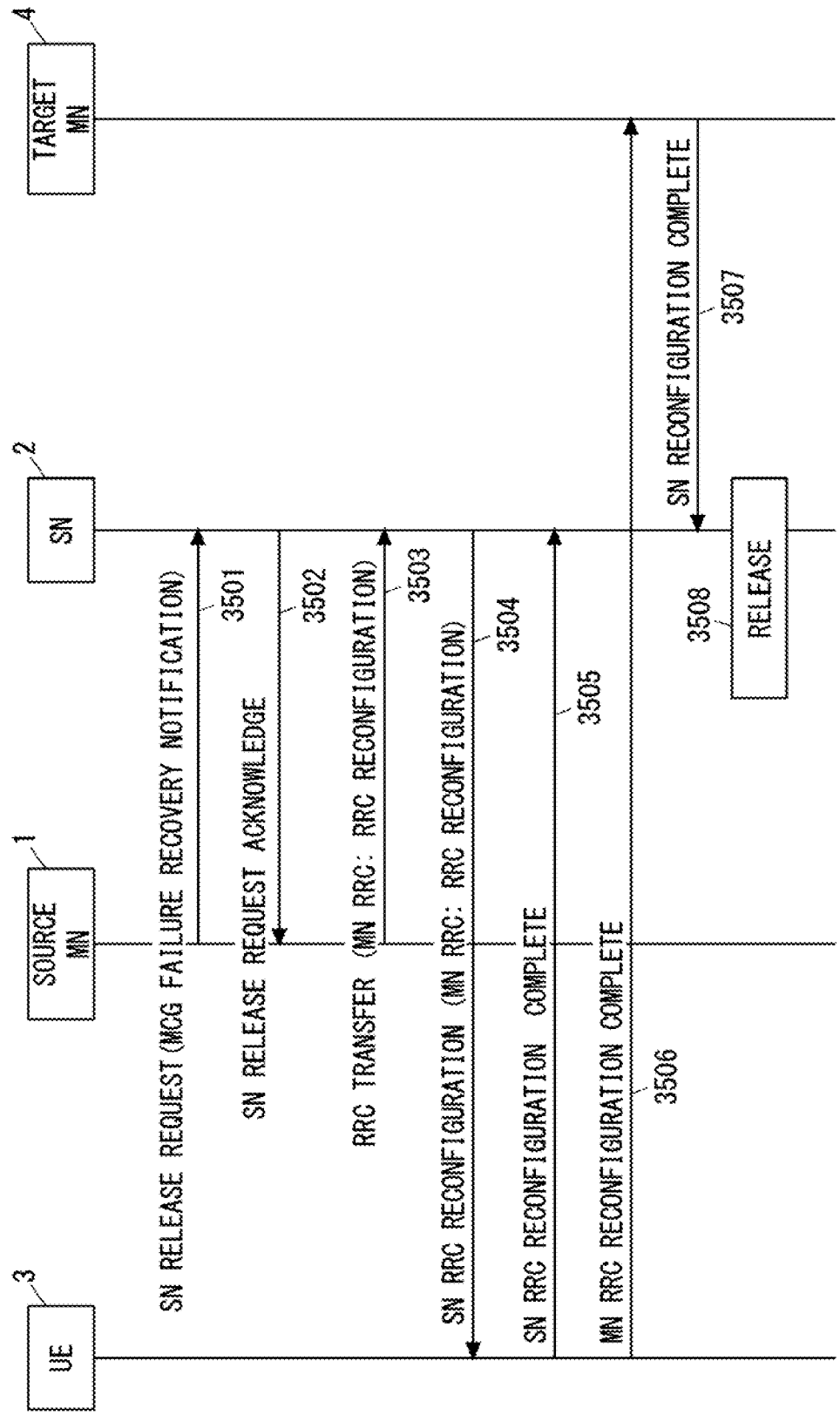
FIG. 35 is a sequence diagram showing an example of operations of an MN and an SN according to an embodiment.

FIG. 35 shows a modified version of the procedure shown in FIG. 33. Steps 3501 to 3505 are similar to steps 3401 to 3405 of FIG. 34. In step 3506, the UE 3 transmits an RRC Reconfiguration Complete message to the target MN 4 via a new PCell indicated by an SpCellConfig IE (servCellIndex of the SpCellConfig) containing a ReconfigurationWithSync IE. In step 3507, the target MN 4 sends an SN RECONFIGURATION COMPLETE message to the SN 2.

In step 3508, after receiving the SN RECONFIGURATION COMPLETE message from the target MN 4, the SN 2 performs the release of the SN (SCG) resources for the UE 3 that were requested by the SN RELEASE REQUEST message in step 3501. The SN 2 may release the SN (SCG) resources in response to the receipt of the SN RECONFIGURATION COMPLETE message. That is, in the example in FIG. 35, the MN-initiated SN Release procedure interacts with the SN Reconfiguration Complete procedure. In other words, the MN-initiated SN Release procedure is associated with the SN Reconfiguration Complete procedure.

The procedure in FIG. 33 may be further modified. Instead of the SN RELEASE REQUEST/ACKNOWLEDGE messages, new XnAP/X2AP messages may be used. For example, the MN MODIFICATION NOTIFICATION/RESPONSE messages may be used similar to the procedure in FIG. 31. Additionally, or alternatively, a new XnAP/X2AP message (e.g., MN MODIFICATION REQUEST message in FIG. 31) may be used in place of the RRC TRANSFER message. As described with respect to FIG. 31, the MN MODIFICATION NOTIFICATION, MN MODIFICATION RESPONSE, and MN MODIFICATION REQUEST messages may be specified together as a single (combined) procedure.

Figure 36:
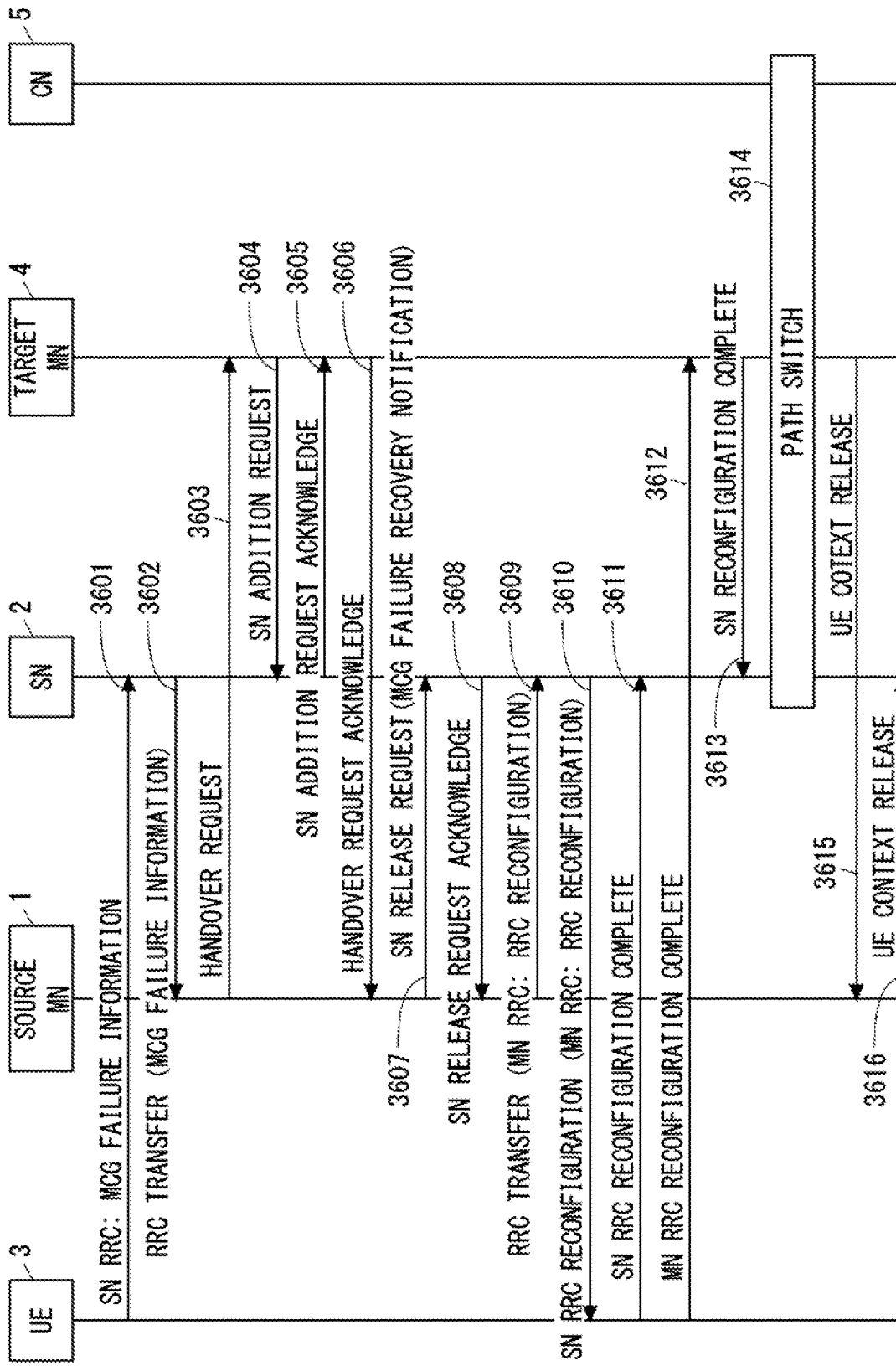
FIG. 36 is a sequence diagram showing an example of operations of an MN and an SN according to an embodiment.

FIG. 36 shows a specific example of the procedures shown in FIGS. 33 to 35. Steps 3607 to 3610 of FIG. 36 correspond to steps 3301 to 3304 of FIG. 33, steps 3401 to 3404 of FIG. 34, and steps 3501 to 3504 of FIG. 35. Step 3611 of FIG. 36 corresponds to step 3405 of FIG. 34 and step 3505 of FIG. 35. Steps 3612 and 3613 of FIG. 36 correspond to steps 3506 and 3507 of FIG. 35. In FIG. 36, upon reception of an SN RECONFIGURATION COMPLETE message (or MN RECONFIGURATION COMPLETE message) from the target MN 4 (step 3613), the SN 2 may release the SN (SCG) resources for the UE 3 requested by the SN RELEASE REQUEST message of step 3607, except for the terminal information (e.g., UE context) of the UE 3. For example, the SN 2 may release radio resources (e.g., source SCG lower layer configuration (e.g., CellGroupConfig)) associated with the UE 3 for MR-DC with the source MN 1.

In step 3601 of FIG. 36, the UE 3 transmits MCG failure information to the SN 2 via the SRB3. In step 3602, the SN 2 forwards the MCG failure information to the MN 1. The MN 1 determines an MCG failure recovery procedure according to the receipt of the MCG failure information. The MCG failure recovery procedure includes an inter-MN handover procedure without SN change (i.e., step 3603 to 3616). The inter-MN handover procedure without SN change includes signalling with a core network (CN) 5 for the path switch (step 3614). When the SN 2 receives a UE CONTEXT RELEASE message from the source MN 1 (step 3616), the SN 2 releases the terminal-related resources (e.g., C-plane resources with the source MN 1 related to the UE context) of the UE 3 held for MR-DC with the source MN 1.

Fourteenth Embodiment

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a direct SRB (e.g., SRB3) has been configured between the SN 2 and the UE 3, the MN 1 performs an MN to gNB change procedure with SN release to recover from the MCG failure.

Figure 37:
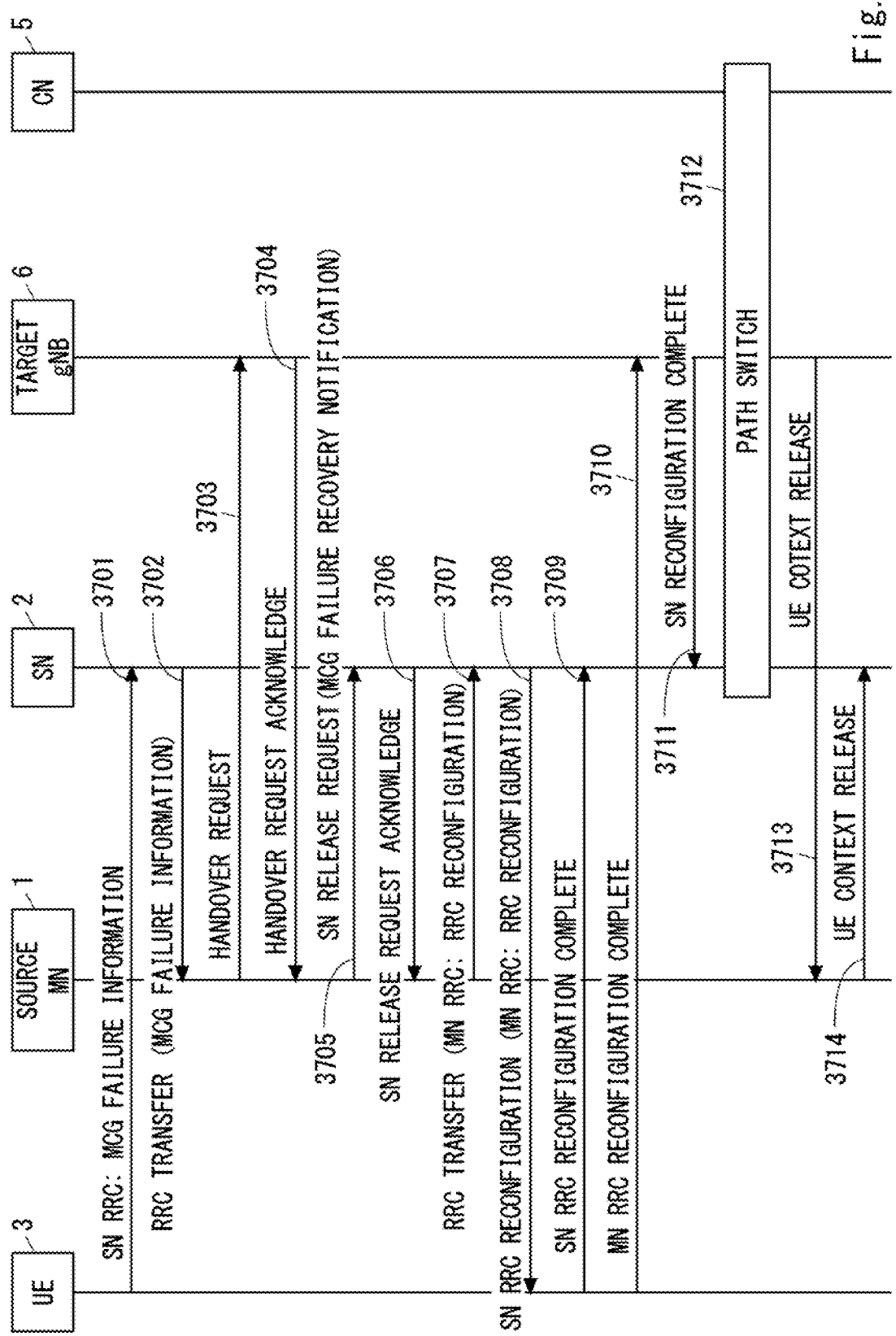
FIG. 37 is a sequence diagram showing an example of operations of an MN and an SN according to an embodiment.

FIG. 37 shows a specific example of the MN to gNB change procedure involving SN release. In step 3701 of FIG.

37, the UE 3 transmits MCG failure information to the SN 2 via SRB3. In step 3702, the SN 2 forwards the MCG failure information to the MN 1. The MN 1 determines an MCG failure recovery procedure in response to receiving the MCG failure information. This MCG failure recovery procedure includes the MN to gNB change procedure involving SN release (i.e., steps 3703 to 3714).

In step 3705, the MN 1 (i.e., the source MN) sends an SN RELEASE REQUEST message to the SN 2. The SN RELEASE REQUEST message of step 3705 further includes an indication to the SN 2 that the message is associated with an MCG failure or its recovery. The indication may be referred to as, for example, MCG failure recovery notification, MCG link recovery notification, or MCG failure notification. The indication may be an IE or Cause value included in the message. In response to the receipt of the indication, the SN 2 defers the release of the configuration (or resources) in the SN 2. Specifically, the SN 2 may postpone the release of resources for a signalling connection associated with the UE 3 between the MN 1 and the SN 2. In addition, the SN 2 may defer the release of terminal information (e.g., UE context) associated with the UE 3. In addition, the SN 2 may defer the release of radio resources (e.g., SCG configuration) associated with the UE 3.

In step 3706, the SN 2 sends an SN RELEASE REQUEST ACKNOWLEDGE message to the MN 1 to confirm the request from the MN 1 for the release of SN (SCG) resources for the UE 3.

In steps 3707 and 3708, the MN 1 transmits an MN RRC message (e.g., RRC Reconfiguration including reconfigurationWithSync) to the UE 3 via SRB3. Steps 3707 and 3708 are similar to, for example, steps 2403 and 204 of FIG. 24 and steps 3303 and 3304 of FIG. 33.

In some implementations, in response to sending (step 3708) the MN RRC message (or at least part of the inter-RAN node message between the MN 1 and the SN 2 containing it) to the UE 3, the SN 2 may release the SN (SCG) resources for the UE 3 as requested by the SN RELEASE REQUEST message in step 3705. Alternatively, the SN 2 may release the SN (SCG) resources in response to receiving an SN RRC Reconfiguration Complete message from the UE 3 (step 3709). Alternatively, the SN 2 may release the SN (SCG) resources in response to receiving an SN RECONFIGURATION COMPLETE message from a target gNB 6 (step 3711). For example, the SN 2 may perform the release of the SN (SCG) resources for the UE 3 that was requested by the SN RELEASE REQUEST message in step 3705, except for the terminal information (e.g., UE context) of the UE 3.

This embodiment provides a specific example of the operations of the MN 1 and the SN 2 described in the first embodiment. A configuration example of a radio communication network according to the present embodiment is the same as the example shown in FIG. 1. In the embodiment, upon detection of an MCG failure when a direct SRB (e.g., SRB3) has been configured between the SN 2 and the UE 3, the MN 1 performs an SN to gNB change (role change) procedure to recover from the MCG failure.

Figure 38:
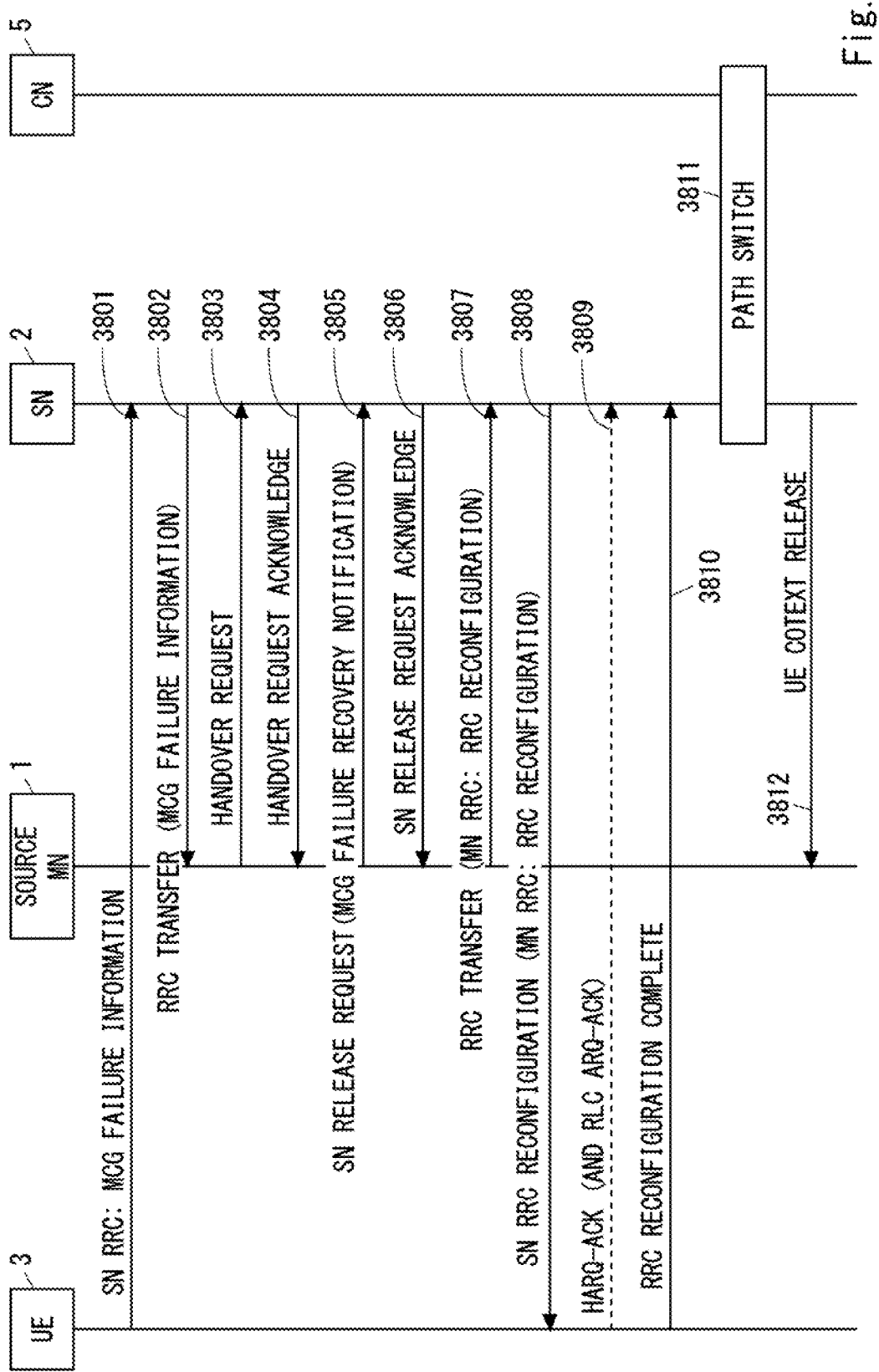
FIG. 38 is a sequence diagram showing an example of operations of an MN and an SN according to an embodiment.

FIG. 38 shows a specific example of the SN to gNB change procedure. In step 3801 of FIG. 38, the UE 3 transmits MCG failure information to the SN 2 via SRB3. In step 3802, the SN 2 forwards the MCG failure information to the MN 1. The MN 1 determines an MCG failure recovery procedure in response to receiving the MCG failure information. This MCG failure recovery procedure includes the SN to gNB change procedure (i.e., steps 3803 to 3812).

In step 3803, the MN 1 (i.e., the source MN) sends a HANDOVER REQUEST message to the SN 2. The HANDOVER REQUEST message in step 3803 may contain information that explicitly or implicitly indicates that the SN 2 is expected to manage the UE 3 as an MN (or in Standalone (SA)) after the handover. For example, the MN 1 may indicate this by including a UE Context Reference at the SgNB IE in the message. When the SN 2 receives this information (e.g., UE Context Reference at the SgNB IE), the SN 2 understands (or recognizes) that the SN 2 is expected (or required) to perform a handover of the UE 3 that is performing MR-DC with the MN 1 and to accept the UE 3, as a (target) MN (or in SA).

In step 3804, the SN 2 sends a HANDOVER REQUEST ACKNOWLEDGE message to the MN 1 to indicate that it accepts the handover of the UE 3. The SN 2 may include in the message a UE Context Kept Indicator IE (i.e., set to True), thereby indicating to the MN 1 that the SN 2 will manage the UE 3, as an MN (or in SA).

In step 3805, the MN 1 (i.e., the source MN) sends an SN RELEASE REQUEST message to the SN 2. The SN RELEASE REQUEST message in step 3805 may contain a UE Context Kept Indicator IE. In addition, the SN RELEASE REQUEST message includes an indication to indicate to the SN 2 that the message is associated with an MCG failure or its recovery. The indication may be referred to as, for example, MCG failure recovery notification, MCG link recovery notification, or MCG failure notification. The indication may be an IE or Cause value included in the message. In response to the receipt of the indication, the SN 2 defers the release of the configuration (or resources) in the SN 2. Specifically, the SN 2 may postpone the release of resources for a signalling connection associated with the UE 3 between the MN 1 and the SN 2. In addition, the SN 2 may defer the release of terminal information (e.g., UE context) associated with the UE 3. In addition, the SN 2 may defer the release of radio resources (e.g., SCG lower layer configuration) associated with the UE 3 for MR-DC with the source MN 1.

In step 3806, the SN 2 sends an SN RELEASE REQUEST ACKNOWLEDGE message to the MN 1 to confirm the request from the MN 1 for the SN (SCG) resource release for the UE 3.

In steps 3807 and 3808, the MN 1 transmits an MN RRC message (e.g., RRC Reconfiguration including reconfigurationWithSync) to the UE 3 via SRB3. Steps 3807 and 3808 are similar to, for example, steps 2403 and 2404 of FIG. 24 and steps 3403 and 3404 of FIG. 34. Specifically, although the SN 2 is the target RAN node (MN or SA gNB) for the handover, it acts as the source SN at least until the transmission of this MN RRC message.

In some implementations, the SN 2 may release the SN (SCG) resources for the UE 3 as requested by the SN RELEASE REQUEST message in step 3805, in response to transmitting (step 3808) the MN RRC message (or at least part of the inter-RAN node message between the MN 1 and the SN 2 containing it) to the UE 3. Alternatively, the SN 2 may release SN (SCG) resources for MR-DC with the source MN 1 in response to receiving an HARQ-ACK (and RLC ARQ-ACK) from the UE 3 (step 3809) or an RRC Reconfiguration Complete message from the UE 3 (step 3810).

Sixteenth Embodiment

A configuration example of a radio communication network according to the present embodiment is the same as the example shown in FIG. 1. This embodiment provides an improvement of an RRC TRANSFER message sent from the MN 1 to the SN 2 to transfer an MN RRC message.

Figure 39:
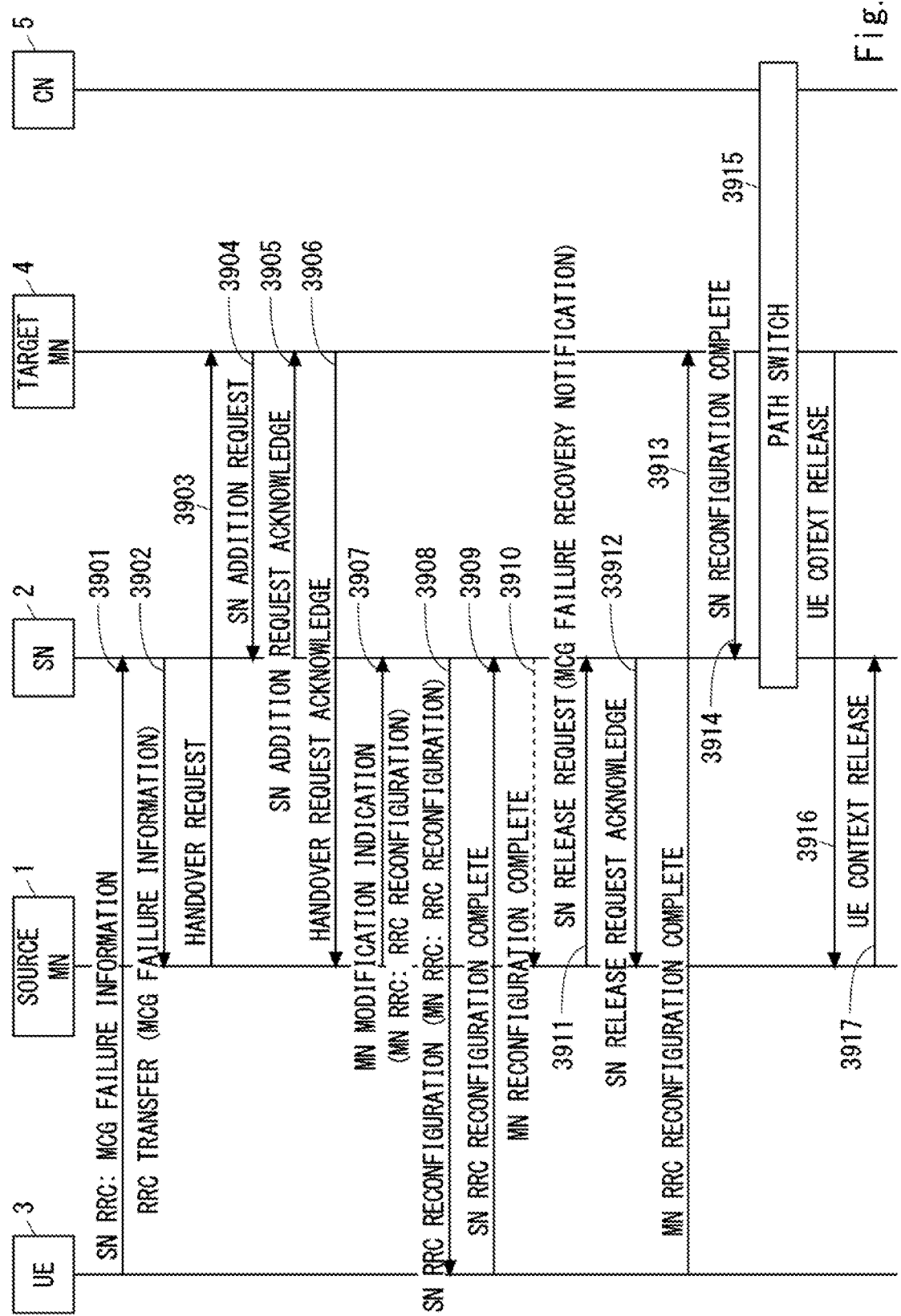
FIG. 39 is a sequence diagram showing an example of operations of an MN and an SN according to an embodiment.

FIG. 39 shows an example of an MCG recovery procedure. In the example of FIG. 39, upon detection of an MCG failure when a direct SRB (i.e., SRB3) has been configured between the SN 2 and the UE 3, the MN 1 performs an inter-MN handover without SN change to recover from the MCG failure.

The procedure in FIG. 39 is similar to that in FIG. 36. However, in the procedure of FIG. 39, the transmission of an MN RRC message via SRB3 from the MN 1 to the UE 3 (steps 3907 to 3910) takes place before the SN Release procedure (steps 3911 and 3912). Steps 3907 to 3910 are similar to steps 2803 to 2806 in FIG. 28. Upon receiving the MN MODIFICATION INDICATION message in step 3907, the SN 2 recognizes that the MN RRC message must be delivered to the UE 3. On the other hand, in step 3911, the MN 1 does not have to include any indication in the SN RELEASE REQUEST message to associate it with the MCG failure or its recovery.

Instead of the MN MODIFICATION INDICATION message in step 3907, an RRC TRANSFER message may be used. In this case, the RRC TRANSFER message indicates that the PDCP PDU must be delivered to the UE 3. The RRC TRANSFER message may contain a Delivery Requirement IE set to "essential".

Seventeenth Embodiment

A configuration example of a radio communication network according to the present embodiment is the same as the example shown in FIG. 1. In the present embodiment, the MN 1 transmits in advance to the UE 3 an instruction (or RRC configuration information) that indicates which of the RRC reconnection process (RRC (connection) re-establishment procedure) or the MCG recovery process (MCG (link) recovery procedure) should be performed when the UE 3, which has been configured to be able to send RRC messages to the SN 2 via SRB3, detects an MCG failure (e.g., MCG RLF). The MCG recovery process includes that the UE 3 transmits MCG failure information (e.g., MCG Failure Information) to the SN 2 via SRB3. Furthermore, the MCG recovery process may include that the SN 2 receiving the MCG failure information sends the MCG failure information or control information derived therefrom to the MN 1. This allows the MN 1 to control the behavior of the UE 3 (i.e., transmission of MCG failure information or RRC reconnection) when an MCG failure occurs.

The MN 1 may transmit information explicitly indicating the process (procedure) to be performed by the UE 3. The MN 1 may notify the UE 3 of the processing (procedure) via an MN RRC message (e.g., RRC (Connection) Reconfiguration) when (or after) the SN 2 transmits an RRC configuration (e.g., RadioBearerConfig IE) of SRB3 to the UE 3. For example, when the MN 1 transmits RRC information (e.g., MCG-FailureRecovery IE) indicating a method for restoring an MCG failure (e.g., MCG RLF) to the UE 3, the MN 1 may inform the UE 3 which process (i.e., RRC reconnection process (e.g., rr-Reestablishment) or MCG failure information transmission via SRB3 to the SN 2 (e.g., fast-MCG-recovery or MCG-failure-indication)) should be performed. When the UE 3 has been notified to transmit MCG failure information, the UE 3 transmits the MCG failure information to the SN 2 via SRB3 in response to the detection of the MCG failure. The SN 2 may send the received MCG failure information or control information derived therefrom to the MN 1. The transmission of the MCG failure information from the UE 3 to the SN 2 and the MN 1 corresponds, for example, to steps 3202 and 3203 in FIG. 32. After the transmission of the MCG failure information, the procedure for recovery from the MCG failure described in FIGS. 24 to 26 or the like may be performed. On the other hand, when the UE 3 has been notified to perform the RRC reconnection process, it performs the RRC (connection) re-establishment procedure. The notification may further specify the type of MCG failure. In other words, the MN 1 may allow the UE 3 to transmit MCG failure information to the SN 2 via SRB3 when the UE 3 detects one or more specific types of MCG failures out of multiple types of MCG failures. Depending on the type of MCG failure detected, the UE 3 may decide whether to send the MCG failure information to the SN 2 in SRB3 or to perform the RRC reconnection process.

The MN 1 may detect whether SRB3 is established or not based on bearer information (e.g., scg-RB-Config) included in SCG configuration information (e.g., CG-Config message) received from the SN 2. Instead, the SN 2 may explicitly notify the MN 1 of the information indicating whether SRB3 is established or not using an IE of an XnAP/X2AP message.

The SN 2 may determine which process (i.e., RRC reconnection process (e.g., rr-Reestablishment) or sending MCG failure information to the SN 2 in SRB3 (e.g., fast-MCG-recovery or MCG-failure-indication)) to be performed by the UE 3, and notify the MN 1 of this decision. Alternatively, the SN 2 may decide whether to allow the UE 3 to send MCG-failure-indication using SRB3 and inform the MN 1 of the result (allow or disallow). The MN 1 may send information indicating the process (procedure) to be performed by the UE 3 in accordance with or based on the notification from the SN 2.

Eighteenth Embodiment

A configuration example of a radio communication network according to the present embodiment is the same as the example shown in FIG. 1. In the present embodiment, the SN 2 transmits in advance to the UE 3 an instruction (or RRC configuration information) that indicates which of the RRC reconnection process (RRC (connection) re-establishment procedure) or the MCG recovery process (MCG (link) recovery procedure) should be performed when the UE 3, which has been configured to be able to send RRC messages to the SN 2 via SRB3, detects an MCG failure (e.g., MCG RLF). The MCG recovery process includes that the UE 3 transmits MCG failure information (e.g., MCG Failure Information) to the SN 2 via SRB3. Furthermore, the MCG recovery process may include that the SN 2 receiving the MCG failure information sends the MCG failure information or control information derived therefrom to the MN 1. This allows the SN 2 to control the behavior of the UE 3 (i.e., transmission of MCG failure information or RRC reconnection) when an MCG failure occurs.

In some implementations, the SN 2 may transmit to the UE 3, via SRB3 or via the MN 1, an SN RRC message (e.g., RRC (Connection) Reconfiguration) that contains information (e.g., rr-Reestablishment, fast-MCG-recovery, or MCG-failure-indication) explicitly indicating the process (procedure) to be performed by the UE 3. In the case of transmission via the MN 1, this SN RRC message is contained in an MN RRC message sent from the MN 1 to the UE 3.

Alternatively, when (or after) transmitting an RRC configuration for SRB3 (e.g., RadioBearerConfig IE) to the UE 3, the SN 2 may send information to the UE 3 indicating whether (or not) the UE 3 is allowed to transmit MCG failure information in SRB3 (or that the UE 3 is allowed to do so). For example, the SN 2 may include this information into bearer configuration information (e.g., RadioBearerConfig) or SCG configuration information (e.g., CellGroupConfig) within an SN RRC message (e.g., RRC (Connection) Reconfiguration) to be sent to the UE 3. This SN RRC message may be sent by SRB3 or via the MN 1. Alternatively, the SN 2 may send this information to the MN 1 via an inter-RAN Node message (e.g., CG-Config), and the MN 1 may include this information into SCG configuration information (e.g., scg-RB-Config or nr-RadioBearerConfig) within an MN RRC message to be sent to the UE 3. The permission may further specify the type of MCG failure. In other words, the SN 2 may allow the UE 3 to send MCG failure information to the SN 2 in SRB3 if the UE 3 detects a specific one or more of multiple MCG failure types. Depending on the type of MCG failure detected, the UE 3 may decide whether to send the MCG failure information to the SN 2 in SRB3 or to perform the RRC reconnection process.

In some implementations, the SN 2 transmits the RRC configuration for SRB3 (e.g., RadioBearerConfig IE) to the UE 3 (i.e., instructs the UE 3 to establish SRB3), which may implicitly indicate to the UE 3 that the UE 3 is allowed to transmit MCG failure information on SRB3. When the UE 3 receives the RRC configuration for establishing SRB3, it may consider that it is instructed (or allowed) to send MCG failure information to the SN 2 in SRB3 when it detects an MCG failure after establishing SRB3.

If the UE 3 is instructed, configured, or allowed to send MCG failure information, the UE 3 sends MCG failure information to the SN 2 via SRB3 in response to the detection of an MCG failure. In this case, the SN 2 may send the received MCG failure information or control information derived therefrom to the MN 1. The transmission of the MCG failure information from the UE 3 to the SN 2 and the MN 1 corresponds to for example steps 3202 and 3203 of FIG. 32. After the transmission of the MCG failure information, the procedure for recovery of the MCG failure described in FIGS. 24 to 26, or the like, may be performed. On the other hand, if the UE 3 is instructed or configured to perform the RRC re-establishment procedure, or if the UE 3 is not allowed to transmit the MCG failure information in SRB3, the UE 3 performs the RRC (connection) re-establishment procedure.

The SN 2 may explicitly send to the MN 1, in an IE included in an XnAP/X2AP message, information indicating which process (i.e., RRC reconnection process or MCG recovery process) the UE 3 should perform. Alternatively, the MN 1 may recognize which process (i.e., RRC reconnection process or MCG recovery process) is performed by the UE 3, based on SCG configuration information (e.g., CG-Config message) received from the SN 2. The MN 1 may detect whether SRB3 is established or not based on bearer information (e.g., scg-RB-Config) included in the SCG configuration information (e.g., CG-Config message) received from the SN 2. Instead, the SN 2 may explicitly notify the MN 1 of the information indicating whether SRB3 is established or not using an IE of the XnAP/X2AP message.

Figure 40:
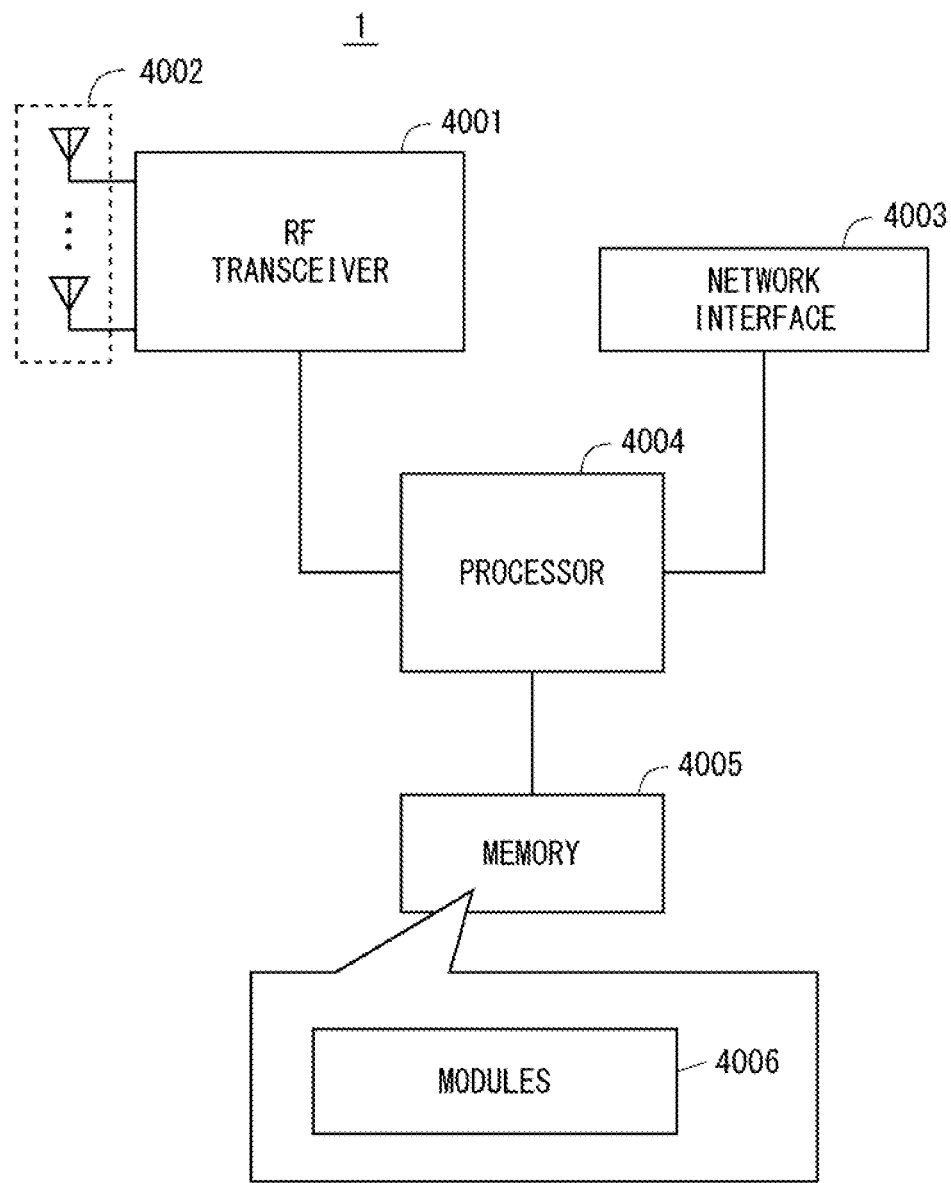
FIG. 40 is a block diagram showing a configuration example of an MN according to an embodiment.

The following provides configuration examples of the MN 1, the SN 2, and the UE 3 according to the above-described embodiments. FIG. 40 is a block diagram showing a configuration example of the MN 1 according to the above-described embodiments. The SN 2 may have a configuration similar to that shown in FIG. 40. Referring to FIG. 40, the MN 1 includes a Radio Frequency transceiver 4001, a network interface 4003, a processor 4004, and a memory 4005. The RF transceiver 4001 performs analog RF signal processing to communicate with UEs. The RF transceiver 4001 may include a plurality of transceivers. The RF transceiver 4001 is coupled to an antenna array 4002 and the processor 4004. The RF transceiver 4001 receives modulated symbol data from the processor 4004, generates a transmission RF signal, and supplies the transmission RF signal to the antenna array 4002. Further, the RF transceiver 4001 generates a baseband reception signal based on a reception RF signal received by the antenna array 4002 and supplies the baseband reception signal to the processor 4004. The RF transceiver 4001 may include an analog beamformer circuit for beam forming. The analog beamformer circuit includes, for example, a plurality of phase shifters and a plurality of power amplifiers.

The network interface 4003 is used to communicate with network nodes (e.g., MN 1 and control and transfer nodes in the core network). The network interface 4003 may include, for example, a network interface card (NIC) conforming to the IEEE 802.3 series.

The processor 4004 performs digital baseband signal processing (i.e., data-plane processing) and control-plane processing for radio communication. The processor 4004 may include a plurality of processors. The processor 4004 may include, for example, a modem processor (e.g., Digital Signal Processor (DSP)) that performs digital baseband signal processing and a protocol stack processor (e.g., Central Processing Unit (CPU) or Micro Processing Unit (MPU)) that performs the control-plane processing. The processor 4004 may include a digital beamformer module for beam forming. The digital beamformer module may include a Multiple Input Multiple Output (MIMO) encoder and a pre-coder.

The memory 4005 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 4005 may include a storage located apart from the processor 4004. In this case, the processor 4004 may access the memory 4005 via the network interface 4003 or an I/O interface (not illustrated).

The memory 4005 may store one or more software modules (computer programs) 4006 including instructions and data to perform processing by the MN 1 described in the above embodiments. In some implementations, the processor 4004 may be configured to load the software modules 4006 from the memory 4005 and execute the loaded software modules, thereby performing processing of the MN 1 described in the above embodiments.

When the MN 1 is a Central Unit (e.g., eNB-CU or gNB-CU) in the C-RAN deployment, the MN 1 does not need to include the RF transceiver 4001 (and the antenna array 4002).

Figure 41:
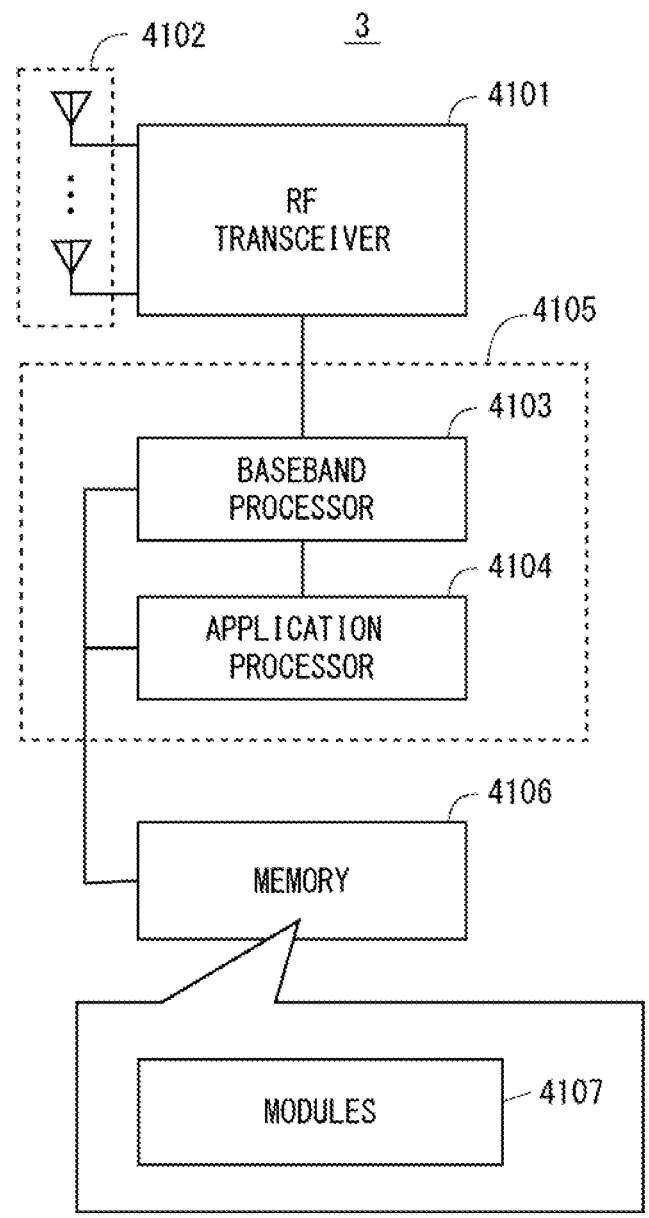
FIG. 41 is a block diagram showing a configuration example of a UE according to an embodiment.

FIG. 41 is a block diagram showing a configuration example of the UE 3. A Radio Frequency (RF) transceiver 4101 performs analog RF signal processing to communicate with the MN 1 and the SN 2. The RF transceiver 4101 may include a plurality of transceivers. The analog RF signal processing performed by the RF transceiver 4101 includes frequency up-conversion, frequency down-conversion, and amplification. The RF transceiver 4101 is coupled to an antenna array 4102 and a baseband processor 4103. The RF transceiver 4101 receives modulated symbol data (or OFDM symbol data) from the baseband processor 4103, generates a transmission RF signal, and supplies the transmission RF signal to the antenna array 4102. Further, the RF transceiver 4101 generates a baseband reception signal based on a reception RF signal received by the antenna array 4102 and supplies the baseband reception signal to the baseband processor 4103. The RF transceiver 4101 may include an analog beamformer circuit for beam forming. The analog beamformer circuit includes, for example, a plurality of phase shifters and a plurality of power amplifiers.

The baseband processor 4103 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

The digital baseband signal processing by the baseband processor 4103 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 4103 may include processing of Non-Access Stratum (NAS) protocols, RRC protocols, and MAC CEs.

The baseband processor 4103 may perform MIMO encoding and pre-coding for beam forming.

The baseband processor 4103 may include a modem processor (e.g., DSP) that performs the digital baseband signal processing and a protocol stack processor (e.g., CPU or MPU) that performs the control-plane processing. In this case, the protocol stack processor, which performs the control-plane processing, may be integrated with an application processor 4104 described in the following.

The application processor 4104 is also referred to as a CPU, an MPU, a microprocessor, or a processor core. The application processor 4104 may include a plurality of processors (or processor cores). The application processor 4104 loads a system software program (Operating System (OS)) and various application programs (e.g., a call application, a WEB browser, a mailer, a camera operation application, and a music player application) from a memory 4106 or from another memory and executes these programs, thereby providing various functions of the UE 3.

In some implementations, as represented by a dashed line (4105) in FIG. 41, the baseband processor 4103 and the application processor 4104 may be integrated on a single chip. In other words, the baseband processor 4103 and the application processor 4104 may be implemented in a single System on Chip (SoC) device 4105. An SoC device may be referred to as a Large-Scale Integration (LSI) or a chipset.

The memory 4106 is a volatile memory, a non-volatile memory, or a combination thereof. The memory 4106 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 4106 may include, for example, an external memory device that can be accessed from the baseband processor 4103, the application processor 4104, and the SoC 4105. The memory 4106 may include an internal memory device that is integrated in the baseband processor 4103, the application processor 4104, or the SoC 4105. Further, the memory 4106 may include a memory in a Universal Integrated Circuit Card (UICC).

The memory 4106 may store one or more software modules (computer programs) 4107 including instructions and data to perform the processing by the UE 3 described in the above embodiments. In some implementations, the baseband processor 4103 or the application processor 4104 may load these software modules 4107 from the memory 4106 and execute the loaded software modules, thereby performing the processing of the UE 3 described in the above embodiments with reference to the drawings.

The control-plane processing and operations performed by the UE 3 described in the above embodiments can be achieved by elements other than the RF transceiver 4101 and the antenna array 4102, i.e., achieved by the memory 4106, which stores the software modules 4107, and one or both of the baseband processor 4103 and the application processor 4104.

As described above with reference to FIGS. 40 and 41, each of the processors included in the MN 1, the SN 2, and the UE 3 according to the above embodiments executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

OTHER EMBODIMENTS

In the embodiments described above, Split SRB2 may be used instead of Split SRB1.

The above embodiments provided an example where the SN 2 uses the RRC TRANSFER message to send information on an MCG failure (e.g., MCG Failure Information) received from the UE 3 to the MN 1 (e.g., step 902 and step 3203). Alternatively, the SN 2 may use an SN MODIFICATION REQUIRED message to send the MCG failure information. If the SN 2 recognizes that an RRC message it receives from the UE 3 contains MCG failure information, it may use the SN MODIFICATION REQUIRED message. For example, if the SN 2 receives MCG failure information from the UE 3 via SRB3, it may include the MCG failure information in the SN MODIFICATION REQUIRED message and send the message to the MN 1. Alternatively, when the SN 2 receives an MCG failure notification from the UE 3 via SCG signalling (e.g., MAC CE), it may include the contents of the Split SRB (e.g., PDCP-C PDU) containing the MCG failure information into the SN MODIFICATION REQUIRED message and send the message to the MN 1. Upon receiving the SN MODIFICATION REQUIRED message from the SN 2, the MN 1 may perform (or initiate) the procedure for recovery from the MCG failure in the embodiments described above.

In the embodiments described above, the SN 2 waits (defers) the execution of the modification or release of the configuration or resources in the SN 2 until a predetermined timing in order to perform the process of MCG failure recovery. The predetermined timing may be the reception of a delivery confirmation (e.g., HARQ ACK, RLC ARQ ACK) from the UE 3 for a Split SRB (e.g., PDCP-C PDU) sent by the SN 2, or the reception of a delivery confirmation from the UE 3 for SRB3. In addition, or alternatively, the SN 2 may wait (postpone) for a predetermined period of time to modify or release the configuration or resources in the SN 2. The predetermined period may be set as a timer. The value of this timer may be provided by the MN 1 to the SN 2 in an XnAP/X2AP message (e.g., SN MODIFICATION REQUEST message or SN RELEASE REQUEST message), or may be specified in a specification in advance. For example, the SN 2 may modify or release the configuration or resources in the SN 2 after the expiration of the predetermined period, if the predetermined timing (i.e., the event) has not been detected by the time the predetermined period expires.

The above embodiments basically assume that fast MCG recovery via the SN 2 (SCG) is successful. However, it can also fail. In one example, it may happen that the UE 3 detects an SCG failure after sending the MCG failure information via the SCG. In this case, the UE 3 may perform an RRC reconnection process to re-establish the PCell. In another example, it may happen that the SN 2 detects an SCG failure after it has received an XnAP/X2AP message (or information) from the MN 1 indicating that the SCG needs to be modified (or reconfigured) due to an MCG failure, and after it has sent an MN RRC message from the MN 1 to the UE 3. As already described, the XnAP/X2AP message (or information) may contain an indication of an MCG failure or an indication of recovery from an MCG failure. Alternatively, the XnAP/X2AP message (or information) may indicate that the SCG modification (or reconfiguration) associated with the MCG modification (or change or reconfiguration) is required. In this case, the SN 2 may notify the MN 1 via an XnAP/X2AP message of the detection of an SCG failure or the failure to send an MN RRC message. The XnAP/X2AP message may be, for example, an RRC TRANSFER FAILURE message, an SN MODIFICATION FAILURE message, or an MCG MODIFICATION FAILURE message.

The operations and procedures regarding the MN 1, SN 2, and UE 3 described in the above embodiments may be used to recover from a failure occurring in the SCG (SCG failure). In conventional MR-DC, when a UE detects an SCG failure, it sends SCG Failure Information to the MN via SRB (e.g., SRB1) of the MCG. Based on the SCG failure information, the MN decides whether to release the SN, change the SN to another RAN node (e.g., gNB), or change the PSCell to another cell in the same SN. Instead of these operations, the MN 1, SN 2, and UE 3 may operate as follows, for example.

The SN 2 may establish a direct SRB (i.e., SRB3) between the SN 2 and the UE 3 and establish a Split SRB (e.g., SN Split SRB) to send SN RRC messages transmitted by the SRB3 to the UE 3 via the MN 1 (MCG). The SN Split SRB is an SRB between the SN 2 and the UE 3 for SN RRC messages, and has an RLC bearer in the MCG (i.e., MCG leg) and an RLC bearer in the SCG (i.e., SCG leg). The SN Split SRB supports transmission over the MCG and the SCG and allows duplication of RRC Protocol Data Units (PDUs) generated by the SN. In other words, the SN Split SRB enables the duplication of PDCP PDUs that contain RRC information.

Upon detecting an SCG failure, the UE 3 may transmit SCG failure information (e.g., SCG RLF) to the SN 2 via the MN 1 in the MCG leg of the SN Split SRB (i.e., SN RRC message). The SN 2 may decide, based on the SCG failure information, to release the SN itself, change the SN to another RAN node, or change the PSCell to another cell of the SN itself. The SN 2 may then initiate (or trigger) an SN Modification procedure or an SN Release procedure, for example, by sending an SN MODIFICATION REQUIRED message or an SN RELEASE REQUIRED message to the MN 1. This message may contain an indication of SCG failure or an indication of recovery from SCG failure. Upon receiving a message from the SN 2 that contains the indication, the MN 1 may prioritize the processing related to the message. For example, the MN 1 may suspend or postpone modifying or releasing the configuration or resources in the MN (MCG) for the UE 3, and perform the processing related to the message with priority.

In some implementations, the SN 2 may inform the UE 3 that the primary path of the uplink is the SCG (e.g., the CellGroup of the primaryPath is set to SCG) when configuring the SN split SRB to the UE 3. Furthermore, SN 2 may explicitly or implicitly send to the UE 3 in advance a permission to switch the uplink primary path of the SN split SRB from the SCG to the MCG. The UE 3 may send SCG failure information to the SN 2 via the MCG leg of the SN split SRB in response to the detection of an SCG failure (e.g., SCG RLF) when the SN split SRB has been set and the permission has been received. On the other hand, if the UE 3 has not received the permission, it may send SCG failure information to the MN 1 via the MCG. This allows the SN 2 to control the behavior of the UE 3 when an SCG failure occurs (i.e., sending SCG failure information to the MN or the SN).

In some implementations, the SN 2 may send in advance to the UE 3 that is setting (or has already set) the SN split SRB an indication (or RRC configuration information) indicating whether the UE 3 should send SCG failure information in the MCG or perform SCG recovery (SCG (link) recovery procedure) when the UE 3 detects an SCG failure (e.g., SCG RLF). The SCG recovery process involves the UE 3 sending SCG failure information (e.g., SCG Failure Information) to the SN 2 via the MN 1 in the SN split SRB. This allows the SN 2 to control the behavior of the UE 3 when an SCG failure occurs (i.e., transmission of SCG failure information to the MN or SN or RRC reconnection).

The SN 2 may send information that explicitly indicates the process (procedure) to be performed by the UE 3. For example, when the SN 2 transmits RRC information (e.g., SCG-FailureRecovery IE) to the UE 3 indicating the method for recovery from an SCG failure (e.g., SCG RLF), the SN 2 may explicitly indicate to the UE 3 which process (i.e., sending SCG failure information to the MN or sending SCG failure information via the MCG leg of the SN split SRB (e.g., fast-SCG-Failure-Recovery IE)) is to be performed. If UE 3 has been notified to send SCG failure information in the SN split SRB, it sends the SCG failure information to the SN 2 via the MCG leg of the SN split SRB in response to the detection of an SCG failure. On the other hand, if the UE 3 has been notified to send SCG failure information to the MN, it sends SCG failure information by MN RRC.

In the embodiments described above, the MN 1 may explicitly inform the SN 2 of a configuration (or resources) in the SN 2 that should be modified or released, and the SN 2 may follow accordingly. For example, the MN 1 may use an IE in an XnAP/X2AP message to inform the SN 2 of a new security key (e.g., S-KgNB) to be used by the SN 2. Alternatively, the MN 1 may use an RRC container (e.g., CG-ConfigInfo message) enclosed in an XnAP/X2AP message to inform the SN 2 of a configuration (e.g., configRestrictInfo) to be followed by the SN 2.

Alternatively, in the embodiments described above, the MN 1 may indicate to the SN 2 what configuration (or resources) in the MN 1 is to be modified or released, and the SN 2 may determine based on the indication whether the configuration (or resources) in the SN 2 needs to be modified or released. The SN 2 may modify or release the configuration (or resources) in the SN 2 as needed. For example, the MN 1 may use an IE in an XnAP/X2AP message to indicate to the SN 2 what configuration (or resources) in the MN 1 is modified or released. Alternatively, the MN 1 may use an RRC container (e.g., CG-ConfigInfo message) included in an XnAP/X2AP message to inform the SN 2 of the configuration (e.g., measConfigMN) in the MN 1 that the MN 1 has modified or released.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)
  A master node comprising:
  at least one memory; and
  at least one processor coupled to the at least one memory and configured to:
    support dual connectivity that allows a radio terminal to use a Master Cell Group (MCG) provided by the master node and a Secondary Cell Group (SCG) provided by a secondary node; and
    send to the secondary node a first message related to a modification or release of a configuration or resource in the secondary node regarding the dual connectivity,
    wherein the first message explicitly or implicitly indicates that the modification or release is related to a failure of the MCG or recovery from the failure of the MCG.

(Supplementary Note 2)
  The master node according to Supplementary Note 1, wherein the at least one processor is configured to transmit a Radio Resource Control (RRC) message for recovery from the failure of the MCG to the radio terminal via the secondary node.

(Supplementary Note 3)
  The master node according to Supplementary Note 2, wherein the RRC message is transmitted to the radio terminal via a signalling radio bearer configured directly between the secondary node and the radio terminal.

(Supplementary Note 4)
  The master node according to Supplementary Note 2 or 3, wherein the first message causes the secondary node to postpone the modification or release of the configuration or resource until a predetermined condition associated with transmission of the RRC message via the secondary node is met.

(Supplementary Note 5)
  The master node according to Supplementary Note 4, wherein the predetermined condition includes that the secondary node has completed transmission of the RRC message to the radio terminal.

(Supplementary Note 6)
  The master node according to Supplementary Note 4, wherein the predetermined condition includes that the secondary node receives a response transmitted by the radio terminal in response to reception of the RRC message.

(Supplementary Note 7)
  The master node according to any one of Supplementary Notes 2 to 6, wherein the at least one processor is configured to send to the secondary node a second message carrying the RRC message in order to deliver the RRC message to the radio terminal,
    wherein the second message explicitly or implicitly indicates that delivery of the RRC message is related to the failure of the MCG or recovery from the failure.

(Supplementary Note 8)
  The master node according to any one of Supplementary Notes 2 to 6, wherein the at least one processor is configured to send to the secondary node a second message carrying the RRC message in order to deliver the RRC message to the radio terminal,
    wherein the second message indicates to the secondary node that the delivery of the RRC message shall be performed.

(Supplementary Note 9)
  The master node according to any one of Supplementary Notes 1 to 8, wherein
    the first message requests the modification of the configuration or resource, and
    the configuration or resource includes a security key applied to a direct radio bearer between the secondary node and the radio terminal.

(Supplementary Note 10)
  The master node according to any one of Supplementary Notes 1 to 8, wherein
    the first message requests the release of the configuration or resource, and
    the configuration or resource includes a resource for a signalling connection associated with the radio terminal between the master node and the secondary node.

(Supplementary Note 11)
  The master node according to any one of Supplementary Notes 1 to 10, wherein the at least one processor is configured to instruct the radio terminal whether the radio terminal should perform an RRC connection re-establishment procedure or an MCG recovery procedure if the radio terminal detects the failure of the MCG,
    wherein the MCG recovery procedure includes transmitting information about the failure of the MCG from the radio terminal to the master node through a signalling radio bearer configured directly between the secondary node and the radio terminal.

(Supplementary Note 12)
A secondary node comprising:
at least one memory; and
at least one processor coupled to the at least one memory and configured to:
support dual connectivity that allows a radio terminal to use a Master Cell Group (MCG) provided by a master node and a Secondary Cell Group (SCG) provided by the secondary node;
receive from the master node a first message related to a modification or release of a configuration or resource in the secondary node regarding the dual connectivity; and
transmit a Radio Resource Control (RRC) message that is sent from the master node and related to recovery of a failure of the MCG to the radio terminal, via a signalling radio bearer configured directly between the secondary node and the radio terminal,
wherein the first message explicitly or implicitly indicates that the modification or release is related to the failure of the MCG or recovery from the failure of the MCG.

(Supplementary Note 13)
The secondary node according to Supplementary Note 12, wherein the at least one processor is configured to, in response to the reception of the first message, postpone the modification or release of the configuration or resource until a predetermined condition associated with the transmission of the RRC message to the radio terminal is met.

(Supplementary Note 14)
The secondary node according to Supplementary Note 13, wherein the predetermined condition includes that the secondary node has completed transmission of the RRC message to the radio terminal.

(Supplementary Note 15)
The secondary node according to Supplementary Note 13, wherein the predetermined condition includes that the secondary node receives a response transmitted by the radio terminal in response to reception of the RRC message.

(Supplementary Note 16)
The secondary node according to any one of Supplementary Notes 12 to 15, wherein the at least one processor is configured to receive a second message carrying the RRC message from the master node and transmit the RRC message to the radio terminal via the SCG.

(Supplementary Note 17)
The secondary node according to Supplementary Note 16, wherein the second message explicitly or implicitly indicates that delivery of the RRC message is related to the failure of the MCG or recovery from the failure.

(Supplementary Note 18)
The secondary node according to Supplementary Note 16 or 17, wherein the second message indicates to the secondary node that the delivery of the RRC message shall be performed.

(Supplementary Note 19)
The secondary node according to any one of Supplementary Notes 12 to 18, wherein
the first message requests the modification of the configuration or resource, and
the configuration or resource includes a security key applied to a direct radio bearer between the secondary node and the radio terminal.

(Supplementary Note 20)
The secondary node according to any one of Supplementary Notes 12 to 18, wherein
the first message requests the release of the configuration or resource, and
the configuration or resource includes a resource for a signalling connection associated with the radio terminal between the master node and the secondary node.

(Supplementary Note 21)
The secondary node according to any one of Supplementary Notes 12 to 20, wherein the at least one processor is configured to instruct the radio terminal whether the radio terminal should perform an RRC connection re-establishment procedure or an MCG recovery procedure if the radio terminal detects the failure of the MCG,
wherein the MCG recovery procedure includes transmitting information about the failure of the MCG from the radio terminal to the master node through a signalling radio bearer configured directly between the secondary node and the radio terminal.

(Supplementary Note 22)
A method performed by a master node, the method comprising:
controlling the master node to enable, for a radio terminal, dual connectivity using a Master Cell Group (MCG) provided by the master node and a Secondary Cell Group (SCG) provided by a secondary node; and
sending to the secondary node a first message related to a modification or release of a configuration or resource in the secondary node regarding the dual connectivity,
wherein the first message explicitly or implicitly indicates that the modification or release is related to a failure of the MCG or recovery from the failure of the MCG.

(Supplementary Note 23)
A method performed by a secondary node, the method comprising:
controlling the secondary node to enable, for a radio terminal, dual connectivity using a Master Cell Group (MCG) provided by a master node and a Secondary Cell Group (SCG) provided by the secondary node;
receiving from the master node a first message related to a modification or release of a configuration or resource in the secondary node regarding the dual connectivity; and
transmitting a Radio Resource Control (RRC) message that is sent from the master node and related to recovery of a failure of the MCG to the radio terminal, via a signalling radio bearer configured directly between the secondary node and the radio terminal,
wherein the first message explicitly or implicitly indicates that the modification or release is related to the failure of the MCG or recovery from the failure of the MCG.

(Supplementary Note 24)
A program for causing a computer to perform a method for a master node, the method comprising:
controlling the master node to enable, for a radio terminal, dual connectivity using a Master Cell Group (MCG) provided by the master node and a Secondary Cell Group (SCG) provided by a secondary node; and
controlling the master node to send to the secondary node a first message related to a modification or release of a configuration or resource in the secondary node regarding the dual connectivity,
wherein the first message explicitly or implicitly indicates that the modification or release is related to a failure of the MCG or recovery from the failure of the MCG.

(Supplementary Note 25)
A program for causing a computer to perform a method for a secondary node, the method comprising:
controlling the secondary node to enable, for a radio terminal, dual connectivity using a Master Cell Group (MCG) provided by a master node and a Secondary Cell Group (SCG) provided by the secondary node;
controlling the secondary node to receive from the master node a first message related to a modification or release of a configuration or resource in the secondary node regarding the dual connectivity; and
controlling the secondary node to transmit a Radio Resource Control (RRC) message that is sent from the master node and related to recovery of a failure of the MCG to the radio terminal, via a signalling radio bearer configured directly between the secondary node and the radio terminal,
wherein the first message explicitly or implicitly indicates that the modification or release is related to the failure of the MCG or recovery from the failure of the MCG.

(Supplementary Note B1)

A radio terminal comprising:
at least one memory; and
at least one processor coupled to the at least one memory and configured to:
support dual connectivity using a Master Cell Group (MCG) provided by a master node and a Secondary Cell Group (SCG) provided by a secondary node;
receive, from the master node, a permission to switch an uplink primary path of a split signalling radio bearer that is configured between the master node and the radio terminal and supports transmission via both the MCG and the SCG; and
in response to detection of a failure of the MCG while the radio terminal has received the permission, transmit information about the failure of the MCG to the master node through a SCG part of the split signalling radio bearer.

(Supplementary Note B2)

The radio terminal according to Supplementary Note B1, wherein the at least one processor is configured to perform a Radio Resource Control (RRC) connection re-establishment procedure in response to detection of a failure of the MCG while the radio terminal has not received the permission.

(Supplementary Note B3)

A master node comprising:
at least one memory; and
at least one processor coupled to the at least one memory and configured to:
support dual connectivity that allows a radio terminal to use a Master Cell Group (MCG) provided by the master node and a Secondary Cell Group (SCG) provided by a secondary node; and
transmit, to the radio terminal, a permission to switch an uplink primary path of a split signalling radio bearer that is configured between the master node and the radio terminal and supports transmission via both the MCG and the SCG.

(Supplementary Note C1)

A master node comprising:
at least one memory; and
at least one processor coupled to the at least one memory and configured to:
support dual connectivity that allows a radio terminal to use a Master Cell Group (MCG) provided by the master node and a Secondary Cell Group (SCG) provided by a secondary node; and
instruct the radio terminal whether the radio terminal should perform a Radio Resource Control (RRC) connection re-establishment procedure or an MCG recovery procedure if the radio terminal detects a failure of the MCG while the radio terminal has been set to be able to send an RRC message to the master node via the secondary node,
wherein the MCG recovery procedure includes transmitting information about the failure of the MCG from the radio terminal to the master node via the secondary node.

(Supplementary Note C2)

A radio terminal comprising:
at least one memory; and
at least one processor coupled to the at least one memory and configured to:
support dual connectivity using a Master Cell Group (MCG) provided by a master node and a Secondary Cell Group (SCG) provided by a secondary node; and
receive from the master node an instruction indicating whether the radio terminal should perform a Radio Resource Control (RRC) connection re-establishment procedure or an MCG recovery procedure if the radio terminal detects a failure of the MCG while the radio terminal has been set to be able to send an RRC message to the master node via the secondary node,
wherein the MCG recovery procedure includes transmitting information about the failure of the MCG from the radio terminal to the master node via the secondary node.

This application is based upon and claims the benefit of priority from Japanese Patent Application No. 2019-139251, filed on Jul. 29, 2019, the disclosure of which is incorporated herein in its entirety by reference.

REFERENCE SIGNS LIST

1 Master Node (MN)
2 Secondary Node (SN))
3 User Equipment (UE)
4 Target MN
5 Core Network
6 Target gNB
4004 Processor
4005 Memory
4006 modules
4103 Baseband Processor
4104 Application Processor
4106 Memory
4107 modules

What is claimed is:

1. A method for a Secondary node of a dual connectivity with a Master node, the method comprising:
communicating, with a user terminal, using a Secondary Cell Group (SCG), which is a group of serving cells associated with the Secondary node;
receiving a Radio Resource Control (RRC) Transfer message from the Master node if radio link failure is detected for a Master Cell Group (MCG) which is a group of serving cells associated with the Master node, the RRC Transfer message including a Packet Data Convergence Protocol control-plane (PDCP-C) Protocol Data Unit (PDU) encapsulating a RRC Reconfiguration message, the RRC Transfer message including, in addition to the RRC Reconfiguration message, information indicating to the Secondary node that the RRC Reconfiguration message relates to a recovery of the MCG failure; and
transmitting the RRC Reconfiguration message to the user terminal before a release of resources.

2. The method according to claim 1, further comprising receiving a Release Request message from the Master node.

3. The method according to claim 2, further comprising releasing the resources based on the Release Request message.

4. A method for a Master node of a dual connectivity with a Secondary node, the method comprising:
- communicating, with a user terminal, using an MCG, which is a group of serving cells associated with the Master node; and
- transmitting a RRC Transfer message to the Secondary node if radio link failure is detected for the MCG, the RRC Transfer message including a PDCP-C PDU encapsulating a RRC Reconfiguration message, the RRC Transfer message including, in addition to the RRC Reconfiguration message, information indicating to the Secondary node that the RRC Reconfiguration message relates to a recovery of the MCG failure,
- wherein the RRC Reconfiguration message is transmitted to the user terminal before a release of resources.

5. The method according to claim 4, further comprising transmitting a Release Request message to the Secondary node.

6. The method according to claim 5, wherein the Release Request message causes the Secondary Node to release the resources based on the Release Request message.

7. A Secondary node of a dual connectivity with a Master node, the Secondary node comprising:
- at least one memory; and
- at least one processor coupled to the memory and configured to:
  - communicate, with a user terminal, using an SCG, which is a group of serving cells associated with the Secondary node;
  - receive a RRC Transfer message from the Master node if radio link failure is detected for an MCG which is a group of serving cells associated with the Master node, the RRC Transfer message including a PDCP-C PDU encapsulating a RRC Reconfiguration message, the RRC Transfer message including, in addition to the RRC Reconfiguration message, information indicating to the Secondary node that the RRC Reconfiguration message relates to a recovery of the MCG failure; and
  - transmit the RRC Reconfiguration message to the user terminal before a release of resources.

8. The Secondary node according to claim 7, wherein the at least one processor is further configured to receive a Release Request message from the Master node.

9. The Secondary node according to claim 8, wherein the at least one processor is further configured to release the resources based on the Release Request message.

10. A Master node of a dual connectivity with a Secondary node, the Master node comprising:
- at least one memory; and
- at least one processor coupled to the memory and configured to:
  - communicate, with a user terminal, using an MCG, which is a group of serving cells associated with the Master node; and
  - transmit a RRC Transfer message to the Secondary node if radio link failure is detected for the MCG, the RRC Transfer message including a PDCP-C PDU encapsulating a RRC Reconfiguration message, the RRC Transfer message including, in addition to the RRC Reconfiguration message, information indicating to the Secondary node that the RRC Reconfiguration message relates to a recovery of the MCG failure,
- wherein the RRC Reconfiguration message is transmitted to the user terminal before a release of resources.

11. The Master node according to claim 10, wherein the at least one processor is further configured to transmit a Release Request message to the Secondary node.

12. The Master node according to claim 11, wherein the Release Request message causes the Secondary Node to release the resources based on the Release Request message.

* * * * *